United States Patent
Miyazaki et al.

(10) Patent No.: US 7,583,701 B2
(45) Date of Patent: *Sep. 1, 2009

(54) APPARATUS AND METHOD FOR TRANSMITTING OR RECEIVING AN UNCOMPRESSED PACKET FOLLOWED BY COMPRESSED PACKETS

(75) Inventors: Akihiro Miyazaki, Osaka (JP); Hideaki Fukushima, Osaka (JP); Carsten Burmeister, Darmstadt (DE); Rolf Hakenberg, Darmstadt (DE)

(73) Assignee: Panasonic Corporation, Osaka (JP)

( * ) Notice: Subject to any disclaimer, the term of this patent is extended or adjusted under 35 U.S.C. 154(b) by 438 days.

This patent is subject to a terminal disclaimer.

(21) Appl. No.: 11/100,408

(22) Filed: Apr. 7, 2005

(65) Prior Publication Data
US 2005/0175006 A1 Aug. 11, 2005

Related U.S. Application Data

(62) Division of application No. 09/598,256, filed on Jun. 21, 2000, now Pat. No. 6,914,903.

(30) Foreign Application Priority Data
Aug. 6, 1999 (JP) .................................. 11-223378
Mar. 1, 2000 (JP) ............................. 2000-055267

(51) Int. Cl.
*H04J 3/18* (2006.01)
(52) U.S. Cl. ...................... 370/477; 370/202; 370/468; 709/247
(58) Field of Classification Search ................. 370/252, 370/477, 468, 202; 709/247; 714/748, 750; 375/240.01
See application file for complete search history.

(56) References Cited

U.S. PATENT DOCUMENTS

| 4,602,381 A | 7/1986 | Cugnini et al. ................ 381/13 |
| 4,730,348 A | 3/1988 | MacCrisken |
| 4,803,685 A | 2/1989 | Oget .......................... 714/749 |

(Continued)

FOREIGN PATENT DOCUMENTS

JP 3-6187 1/1991

(Continued)

OTHER PUBLICATIONS

"Compressing IP/UDP/RTP Headers for Low-Speed Serial Links", rfc2508, Feb. 1999.

(Continued)

*Primary Examiner*—Wing F Chan
*Assistant Examiner*—Saba Tsegaye
(74) *Attorney, Agent, or Firm*—Wenderoth, Lind & Ponack, L.L.P.

(57) ABSTRACT

A data transmission apparatus for sequentially transmitting data in units of packets each containing transmission data to the receiving end, comprises: a reception unit for receiving the transmission data as an input signal; a packet formation unit for receiving the transmission data received, and forming an uncompressed packet in which predetermined transmission data is stored as uncompressed data, and a compressed packet in which at least a portion of transmission data that follows the predetermined transmission data is compressed and stored as compressed data.

6 Claims, 33 Drawing Sheets

U.S. PATENT DOCUMENTS

| | | | |
|---|---|---|---|
| 5,049,881 A | 9/1991 | Gibson et al. | 341/95 |
| 5,293,379 A | 3/1994 | Carr | 370/474 |
| 5,579,303 A | 11/1996 | Kiriyama | 370/252 |
| 5,648,773 A | 7/1997 | Guy | |
| 5,701,302 A | 12/1997 | Geiger | 370/521 |
| 5,850,526 A | 12/1998 | Chou | 709/247 |
| 5,884,269 A | 3/1999 | Cellier et al. | |
| 6,032,197 A | 2/2000 | Birdwell et al. | 709/247 |
| 6,198,735 B1 | 3/2001 | Pazhyannur et al. | 370/349 |
| 6,330,695 B1 | 12/2001 | Arai | |
| 6,373,986 B1 | 4/2002 | Fink | |
| 6,456,618 B2 | 9/2002 | Kozdon et al. | 370/352 |
| 6,608,841 B1 * | 8/2003 | Koodli | 370/474 |
| 6,791,944 B1 * | 9/2004 | Demetrescu et al. | 370/235 |
| 2003/0198226 A1 * | 10/2003 | Westberg | 370/393 |

FOREIGN PATENT DOCUMENTS

| | | |
|---|---|---|
| JP | 5-191454 | 7/1993 |
| JP | 8-307455 | 11/1996 |
| JP | 10-174107 | 6/1998 |

OTHER PUBLICATIONS

"Compressing TCP/IP Headers for Low-Speed Serial Links", rfc1144, Feb. 1999.

Casner S et al: "Compressing IP/UDP/RTP Headers for Low-Speed Serial Links" IETF Internet Draft, Jul. 27, 1998, XP002125101 * p. 4, line 3- p. 19, Line 15*.

Degermark M et al: "Low-Loss TCP/IP Header Compression for Wireless Networks" Wireless Networks, US, AMC, vol. 3, No. 5, Oct. 1, 1997, pp. 375-387, right-hand column, paragraph 2- p. 383, left-hand column, paragraph 4.7*.

Perkins S J et al: "Dependency Removal for Transport Protocol Header Compresion Ov Noisy Channels" Montreal, Jun. 8-12, 1997, New York, IEEE, US, Jun. 8, 1997, pp. 1025-1029, XP000742093,ISBN: 0-7803-3926-6, p. 1026, left-hand column, par. 3- p. 1028, left-hand column, par 4.2.1.

U.S. Office Action issued Sep. 6, 2007 in U.S. Appl. No. 10/735,661.

Office Action, including PTO Form-892, dated Nov. 19, 2008 issued in U.S. Appl. No. 10/735,661.

* cited by examiner

Fig.25 (a)
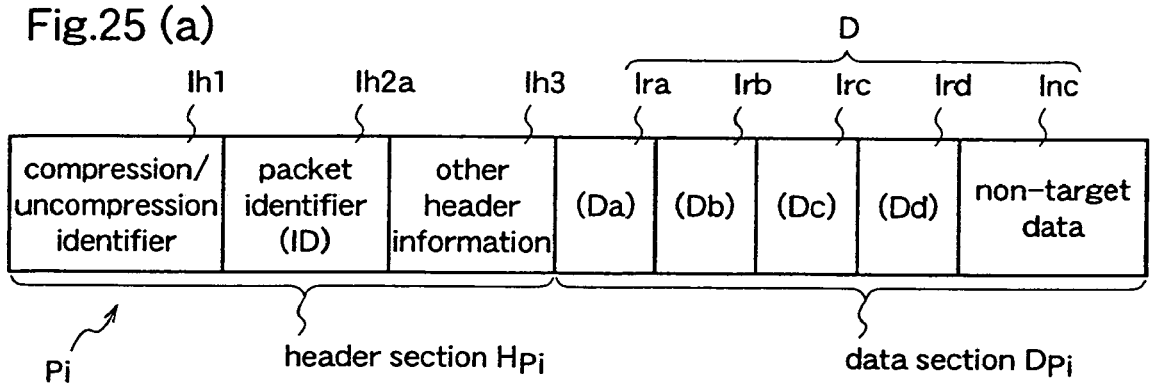
Fig.25 (b)
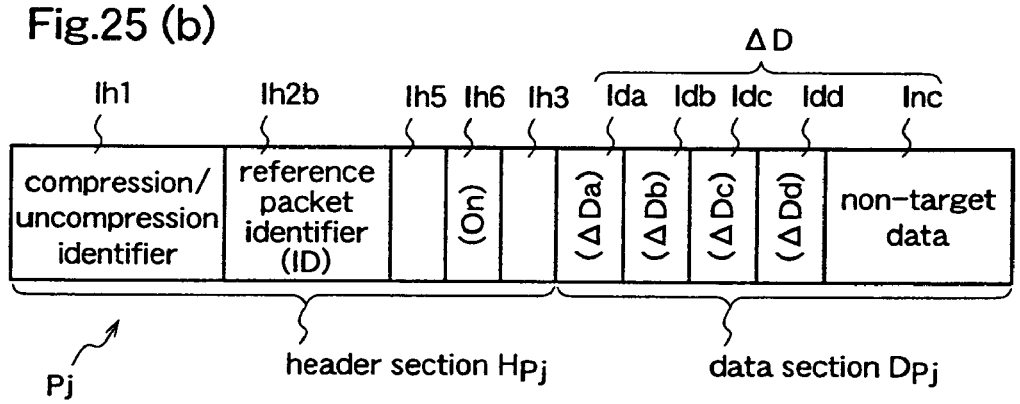
Fig.25 (c)
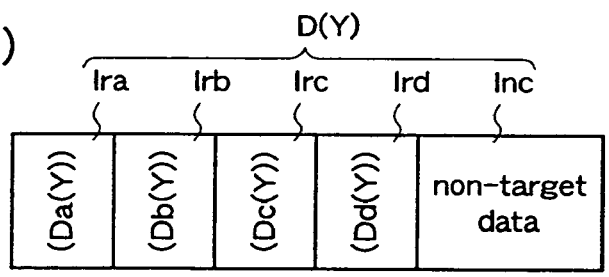
[Contents of Management]
reference packet identifier (ID=X)
reference data : Da(X), Db(X), Dc(X), Dd(X)
$\Delta Da = Da(X) - Da(Y) = 0$
$\Delta Db = Db(X) - Db(Y) \neq 0$
$\Delta Dc = Dc(X) - Dc(Y) \neq 0$
$\Delta Dd = Dd(X) - Dd(Y) = 0$
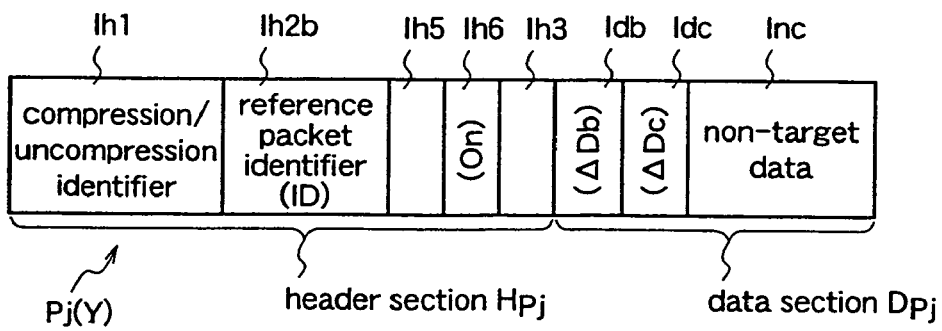

Prior Art

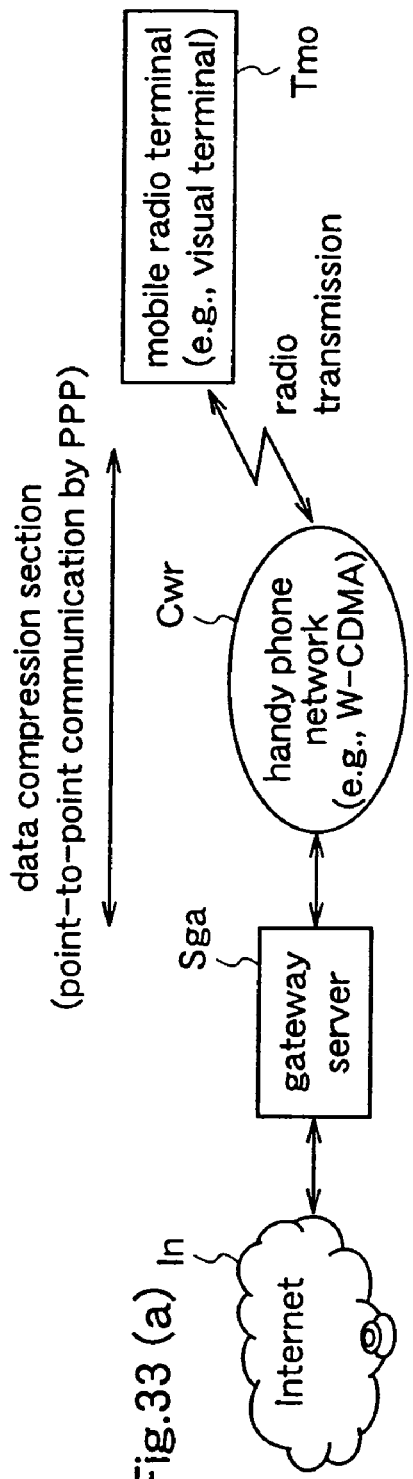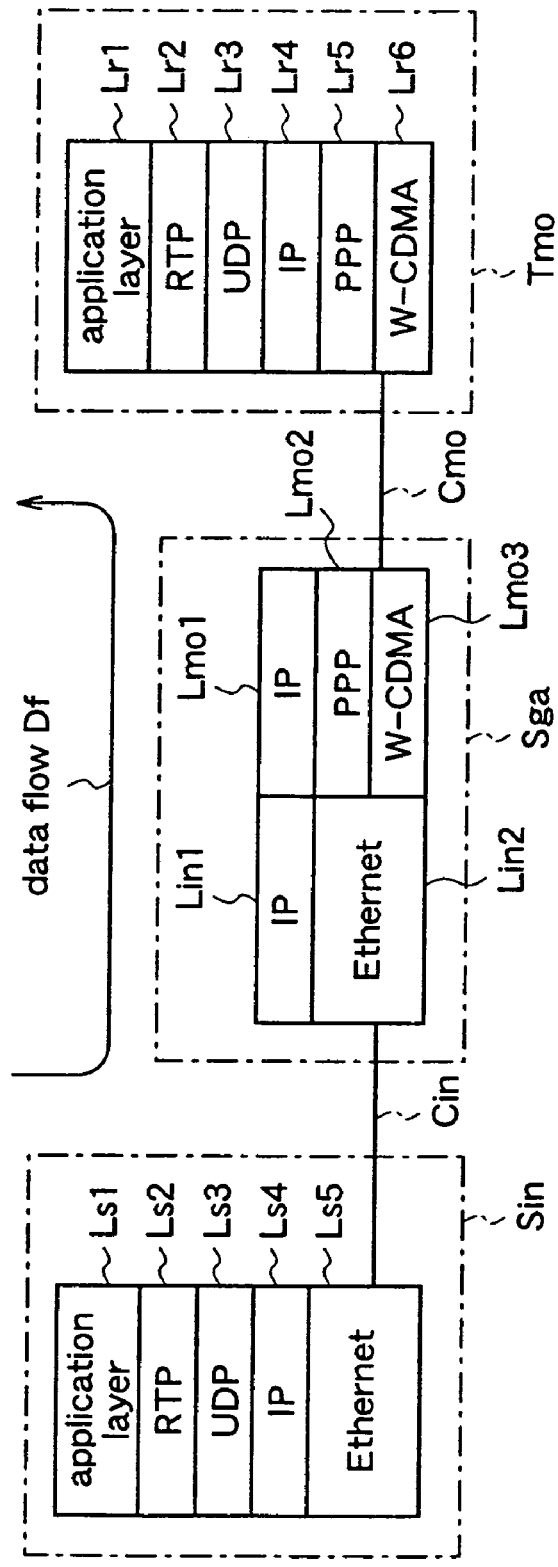
Fig.33 (a) Prior Art
Fig.33 (b)

APPARATUS AND METHOD FOR TRANSMITTING OR RECEIVING AN UNCOMPRESSED PACKET FOLLOWED BY COMPRESSED PACKETS

This application is a divisional application of Ser. No. 09/598,256, filed Jun. 21, 2000 now U.S. Pat. No. 6,914,903.

FIELD OF THE INVENTION

The present invention relates to a data transmission method, a data transmission apparatus, a data reception apparatus, and a packet data structure. More particularly, the invention relates to packet-by-packet data transmission among plural data processing apparatuses, in which data corresponding to predetermined packets are compressed at the transmitting end, and the compressed data corresponding to these packets are restored at the receiving end.

BACKGROUND OF THE INVENTION

As representative transmission protocols for transmitting data on the Internet, TCP/IP (Transmission Control Protocol/Internet Protocol) and UDP/IP (User Datagram Protocol/Internet Protocol) are currently used.

However, when transmitting data in packet units by utilizing these transmission protocols through transmission paths having low~medium bit rates (9600 bps~64 Kbps), each packet includes headers corresponding to the respective transmission protocols (i.e., TCP, UDP, and IP), and these headers result in communication overhead, that is, the data quantity in the header section of the packet becomes significantly larger than the data quantity in the data section.

For example, when transmitting 10-byte data by UDP/IP, although the size of the data section of an UDP/IP packet used for this transmission is only 10 bytes, the total size of the UDP/IP packet becomes 38 bytes. In other words, the total size of the UDP/IP packet is about four times as large as the quantity of data which is actually transmitted. When such communication overhead occurs frequently, the effective transmission rate of data in the transmission path is significantly reduced.

As a method for reducing communication overhead due to use of plural transmission protocols, a header compression method proposed by V. Jacobson, which is defined in RFC (Request For Comments) 1144 and RFC 2508, is currently used.

Hereinafter, this header compression method will be described.

FIG. 28(a) illustrates a data transmission system Cs1 to which the V. Jacobson's header compression method is applied.

In the data transmission system Cs1, a gateway server Sga is connected to the Internet In, and a terminal equipment Teq such as a personal computer is connected to the gateway server Sga through a cable line such as a modem, ISDN (Integrated Service Digital Network), or LAN (Local Area Network). The terminal equipment Teq and the gateway server Sga are directly connected through the cable line by point-to-point connection. On the transmission path between the terminal equipment Teq and the gateway server Sga, packets which have been subjected to data compression by the V. Jacobson's header compression method are transmitted by a transmission protocol such as PPP (Point to Point Protocol).

In the data transmission system Cs1, when data is transmitted from the gateway server Sga to the terminal equipment Teq, the gateway server Sga serves as a transmitter while the terminal equipment Teq serves as a receiver on the contrary, when data is transmitted from the terminal equipment Teq to the gateway server Sg, the gateway server serves as a receiver while the terminal equipment Teq serves as a transmitter.

Hereinafter, a brief description will be given of data transmission using packets in the above-described data transmission system Cs1.

FIG. 28(b) illustrates processes required for data transmission in the data transmission system Cs1, corresponding to a plurality of layers in hierarchy. FIGS. 29(a)~29(e) illustrate data structures of packets to be generated by the processes corresponding to the respective layers.

FIG. 28(b) shows the case where data is transmitted from a server (transmitter) Sin on the Internet In through a gateway server (relay unit) Sga to a terminal equipment (receiver) Teq (refer to data flow Df).

Data stored in the transmitter Sin is subjected to the process of the first layer (application layer) Ls1, followed by the process of the second layer Ls2. Thereby, an RTP packet Prtp corresponding to RTP (Realtime Transport Protocol) is generated. This RTP packet is composed of an RTP header Hrtp containing header information and an RTP payload (data section) Drtp containing the above-described data. The information in the RTP header Hrtp is composed of a sequence number Isn which increments by 1 every time one packet is transmitted, a time stamp Its which is used for processing at the data receiving end, and other header information Ith (refer to FIG. 29(a)). The size of the RTP header Hrtp is generally 12 bytes, and 2 bytes are assigned to the sequence number Isn and 4 bytes are assigned to the time stamp Its.

Next, the RTP packet Prtp is subjected to the process of the third layer Ls3, whereby an UDP packet corresponding to UDP (User Datagram Protocol) is generated. This UDP packet Pudp is composed of an UDP header Hudp containing header information, and a data section Dudp containing the RTP packet Prtp (refer to FIG. 29(b)).

Subsequently, the UDP packet Pudp is subjected to the process of the fourth layer Ls4, whereby an IP packet Pipa corresponding to IP (Internet Protocol) is generated. This IP packet Pipa is composed of an IP header Hipa containing header information, and a data section Dip containing the UDP packet Pudp (refer to FIG. 29(c)).

Then, the IP packet Pipa is sent to the gateway server Sga through the transmission path Cin, according to a predetermined transmission standard (e.g., Ethernet), by the process of the fifth layer Ls5.

In the gateway server Sga, the IP packet Pipa transmitted from the server Sin on the Internet In is received according to the predetermined transmission standard (e.g., Ethernet) by the process of the lower layer Lin2 which corresponds to the process of the fifth layer Ls5 in the transmitter. The received IP packet Pipa is separated into the header Hipa and the data section Dip by the process of the upper layer Lin1 which corresponds to the process of the fourth layer Ls4 in the transmitter. Then, by the process of the upper layer Leq1 which corresponds to a predetermined layer in the receiver (in this case, the fourth layer Lr4), the separated data section Dip is given a header section Hipb which includes information different from the information stored in the header section Hipa, thereby generating an IP packet Pipb (refer to FIG. 29(d)).

Thereafter, the IP packet Pipb is subjected to the process of the lower layer Leq2 which corresponds to a predetermined layer in the receiver (in this case, the fifth layer Lr5), whereby a PPP packet Pppp corresponding to PPP (Point to Point Protocol) is transmitted to the terminal equipment Teq through the cable line Ceq. This PPP packet Pppp is composed of a header section Hppp containing PPP header information Ippp and a CRC code Icrc for checking the received data, and a data section Dppp containing the IP packet Pipb (refer to FIG. 29(e)).

When the PPP packet Pppp is received by the terminal equipment Teq serving as a receiver, the PPP packet Pppp is separated into the header section Hppp and the data section Dppp, by the process of the fifth layer Lr5 which corresponds to the lower layer Leq2 in the gateway server Sga.

Next, the Ip packet Pipb stored in the PPP data section Dppp is separated into the IP header section Hipb and the IP data section Dip, by the process of the fourth layer Lr4 which is upper than the fifth layer Lr5. Subsequently, the UDP packet Pudp stored in the IP data section Dip is separated into the UDP header section Hudp and the UDP data section Dudp, by the process of the third layer Lr3 which is upper than the fourth layer Lr4. Further, the RTP packet Prtp stored in the UDP data section Dudp is separated into the RTP header section Hrtp and the RTP data section Drtp, by the process of the second layer Lr2 which is upper than the third layer Lr3.

Then, the data stored in the RTP payload (RTP data section) Drtp is subjected to the process of the first layer (application layer) Lr1.

When data is transmitted from the terminal equipment Teq to the server Sin on the Internet, the terminal equipment Teq servers as a transmitter and the server Sin serves as a receiver. This case is reverse of the case where data is transmitted from the server Sin on the Internet through the gateway server Sga to the terminal equipment Teq. That is, in the respective layers Lr2~Lr5 of the terminal equipment Teq, packets corresponding to these layers are generated. In the gateway server Sga, the IP packet Pipb is extracted from the PPP packet Pppp supplied from the terminal equipment Teg, and this packet is converted to the IP packet Pipa to be sent to the server Sin on the Internet In on the basis of the Ethernet. In the server Sin, the IP packet Pipa is received by the process of the fifth layer Ls5, and the data stored in the RTP payload Drtp is taken out by the processes of the layers Ls4~Ls2 in the server Sin which correspond to the layers Lr2~Lr4 in the terminal equipment Teq, and this data is subjected to the process of the application layer Ls1.

In the above description, an UDP packet corresponding to UDP is generated in the processes of the third layers Ls3 and Lr3, but a TCP packet corresponding to TCP (Transmission Control Protocol) may be generated in the processes of the third layers.

In the above-described data transmission system Csl, when transmitting data by PPP using the V. Jacobson's header compression method, two types of packets are used as the PPP packets Pppp to be transmitted by this protocol, as shown in FIGS. 30(a) and 30(b). That is, one is a compressed packet Py in which data to be transmitted (hereinafter referred to as transmission data) stored in the data section is compressed (refer to FIG. 30(b)), and the other is an uncompressed packet Px in which transmission data stored in the data section is not compressed (refer to FIG. 30(a)). FIGS. 30(a) and 30(b) show only parts of these PPP packets, which are required for describing the V. Jacobson's header compression method.

That is, the uncompressed packet Px is composed of a header section Hpx containing header information, and a data section Dpx containing transmission data (D) as uncompressed data Ir to be transmitted by PPP. The information in the header section Hpx is composed of a compression/uncompression identifier Ih1 which indicates whether the data in the data section Dpx is compressed, and other header information Ih3. In the uncompressed packet Px, the identifier Ih1 indicates "uncompressed".

Further, the compressed packet Py is composed of a header section Hpy containing header information, and a data section Dpy containing difference data (ΔD) as compressed data Id to be transmitted by PPP. The information in the header section Hpy is composed of a compression/uncompression identifier Ih1 which indicates whether the data stored in the data section Dpy is compressed, and other header information Ih3. In the compressed packet Py, the identifier Ih1 indicates "compressed".

The header information Ih3 includes the CRC code Icrc shown in FIG. 29(e).

In the above-described process of transmitting the PPP packets using the V. Jacobson's header compression method, the uncompressed packet Px is transmitted as the first PPP packet from the transmitting end to the receiving end and, thereafter, the compressed packet Py is transmitted as the subsequent PPP packet.

In the data section Dpy of the compressed packet Py to be transmitted, difference data (ΔD) which is based on the transmission data (reference data) of a PPP packet which has been transmitted just before the compressed packet Py, is stored. To be specific, the difference data (ΔD) is a difference between the transmission data to be transmitted by the compressed packet Py and the transmission data as the reference data.

FIG. 31 is a diagram for conceptually explaining the PPP packet transmission process using the V. Jacobson's header compression method.

In FIG. 31, transmission data (D1)~(D4) corresponding to the respective PPP packets are sequentially transmitted.

Initially, an uncompressed packet Px(1) is transmitted as the first PPP packet from the transmitting end to the receiving end. In the data section Dpx of this uncompressed packet Px(1), transmission data (D1) is stored as uncompressed data Ir.

Thereafter, compressed packets Py(2)~Py(4) are sequentially transmitted as PPP packets from the transmitting end to the receiving end. In the data sections Dpy of these compressed packets Py(2), Py(3), and Py(4), difference data (D1-D2), (D2-D3), and (D3-D4) are stored as compressed data Id, respectively.

The difference data (D1-D2) is a difference between the transmission data (D1) and (D2), the difference data (D2-D3) is a difference between the transmission data (D2) and (D3), and the difference data (D3-D4) is a difference between the transmission data (D3) and (D4). In this way, each compressed packet contains, as compressed data Id, difference data between the transmission data of this compressed packet and the transmission data of the packet which has been transmitted just before the compressed packet.

This transmission of compressed packets is continued until a transmission error occurs.

At the receiving end, the uncompressed packet Px(1) is received as the first PPP packet and, thereafter, the compressed packets Py(2)~Py(4) are sequentially received as PPP packets.

Then, the uncompressed packet Px(1) is processed according to PPP, whereby the transmission data (D1) stored in the data section Dpx is taken out. Further, the compressed packets Py(2), Py(3), and Py(4) are processed according to PPP, whereby the difference data (D1-D2), (D2-D3), and (D3-D4) stored in the data sections Dpy are taken out, and the transmission data (D2), (D3), and (D4) corresponding to the respective compressed packets are restored by the V. Jacobson's header compression method. For example, the transmission data (D2) is restored by adding the difference data (D1-D2) and the transmission data (D1), and the transmission data (D3) and (D4) are restored in like manner.

Next, a description will be given of the case where a transmission error occurs during the PPP transmission process using the V. Jacobson's header compression method.

FIG. 32 illustrates exchange of data between the transmitting end and the receiving end when a transmission error occurs.

When the receiving end detects that a transmission error has occurred in a predetermined PPP packet, since the receiving end cannot restore PPP packets received after the occurrence of the transmission error, it notifies the transmitting end that a restoration error has occurred.

For example, as shown in FIG. 32, in the case where the compressed packet Py(2) is not normally transmitted to the receiving end due to a transmission error, even when the receiving end receives the compressed packet Py(3) which follows the compressed packet Py(2), the transmitting end cannot restore the transmission data (D3) which is the original data of the difference data stored in the compressed packet Py(3), because the transmission data (D2) which is the original data of the difference data stored in the compressed packet Py(2) is not restored. Therefore, the receiving end notifies the transmitting end that a restoration error has occurred.

On receipt of the notification about the restoration error, the transmitting end transmits an uncompressed packet Px(5) as a PPP packet to the receiving end. At the receiving end, all of the compressed packets Py(2)~Py(4) which have been received from when the transmission error occurred to when the uncompressed packet Px(5) is received, are discarded.

By the way, in recent years, applications of the Internet using handy phones, such as mail access to handy phones and services of texts, have proceeded. Further, infrastructure for next generation radio communication (~384 Kbps) has been developed for practical use of third generation mobile communication (W-CDMA: Wideband-Code Division Multiple Access).

FIG. 33(a) is a diagram illustrating a data transmission system Cs2 employing a radio terminal adapted to W-CDMA.

In the data transmission system Cs2, a gateway server Sga is connected to the Internet In, and a mobile radio terminal Tmo (e.g., visual terminal) is connected to the gateway server Sga through a wireless telephone network Cwr such as W-CDMA. Also in this data transmission system Cs2, on the transmission path between the mobile radio terminal Tmo and the gateway server Sga, packets which have been subjected to data compression based on the V. Jacobson's header compression method are transmitted according to a protocol such as PPP (Point to Point Protocol).

FIG. 33(b) shows processes required for data transmission in the data transmission system Cs2, corresponding to a plurality of layers in hierarchy.

In the data transmission system Cs2, since the transmission path between the mobile radio terminal Tmo and the gateway server Sga includes the wireless telephone network Cwr, data transmission between them is different in the following point from data transmission in the data transmission system Cs1 in which the terminal Tmo and the server Sga are connected by the cable line.

That is, when transmitting a PPP packet from the gateway server Sga to the mobile radio terminal Tmo, the gateway server Sga transmits a PPP packet obtained by the process of the second layer Lmo2, through the radio network Cmo, to the mobile radio terminal Tmo, by the process of the third layer Lmo3 which corresponds to the W-CDMA method.

The mobile radio terminal Tmo receives the PPP packet by the process of the sixth layer Lr6 which corresponds to the W-CDMA method. Thereafter, like the data transmission system Cs1, the data stored in the RTP payload Drtp is taken out by the processes of the fifth to second layers Lr5~Lr2, and the data is subjected to the process of the application layer Lr1.

Other processes for communication in the data transmission system Cs2 shown in FIG. 33(b) are identical to those already described for the data transmission system Cs1 shown in FIG. 28(b). For example, the processes of the first layer Lmo1 and the second layer Lmo2 at the terminal end in the gateway server Sga in the data transmission system Cs2 are identical to the processes of the first layer Leq1 and the second layer Leq2 at the terminal end in the gateway server Sga in the data transmission system Cs1.

However, the bit error rate in data transmission in the radio section is about $10^{-3}$ while the bit error rate in data transmission in the cable section is $10^{-5} \sim 10^{-7}$. Therefore, in the PPP data transmission using the V. Jacobson's header compression method (RFC1144, RFC2508), degradation of data quality due to transmission errors in the radio section becomes a problem.

In other words, in the data transmission system Cs2 including the radio section, when data is transmitted by PPP using the V. Jacobson's header compression method, the case shown in FIG. 32, i.e., discarding the received packets at the receiving end due to transmission errors, occurs frequently and, consequently, the number of transmitted packets to be discarded increases considerably.

SUMMARY OF THE INVENTION

The present invention is made to solve the above-described problems and has for its object to provide a data transmission method, a data transmission apparatus, a data reception apparatus, and a packet data structure, which can reduce the number of packets to be discarded at the receiving end due to errors in the radio section, and thereby improve the quality of data transmitted through the data transmission path including the radio section, when performing packet-by-packet data transmission with data (transmission data) stored in the packets being compressed.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a data transmission method for sequentially transmitting data in units of packets each containing transmission data, from the transmitting end to the receiving end. This method comprises a transmission-side process of transmitting an uncompressed packet in which predetermined transmission data is stored as uncompressed data, and then continuously transmitting a compressed packet in which at least a portion of transmission data following the predetermined transmission data is compressed and stored as compressed data; and a reception-side process of receiving the packets transmitted from the transmitting end, and restoring the transmission data of the respective packets on the basis of the uncompressed data and the compressed data stored in the respective packets. The transmission-side process includes a compression process of forming compressed data to be stored in a compressed packet to be transmitted, on the basis of the transmission data of a reference packet that is the uncompressed packet and the transmission data of the compressed packet to be transmitted. The reception-side process includes a restoration process of restoring the transmission data of a compressed packet to be restored, on the basis of the transmission data of the reference packet and the compressed data included in the compressed packet to be restored. Therefore, even when a transmission error occurs in the compressed packet transmitted in the radio section, the receiving end can restore the subsequent compressed packet with reference to the transmission data of the uncompressed packet as the reference packet. Thereby, the number of packets to be discarded at the receiving end due to the transmission error in the radio section is reduced, with the result that the quality of data transmitted in the transmission path including the radio section is improved.

According to a second aspect of the present invention, in the data transmission method of the first aspect, in the transmission-side process, as the uncompressed packet, a packet including the uncompressed data and a packet identifier indicating this packet is transmitted, and as the compressed packet that follows the uncompressed packet, a packet including the compressed data and a reference packet identifier indicating the uncompressed packet as a reference packet is transmitted. In the compression process, as the compressed data, difference data between the transmission data of the reference packet and the transmission data of the compressed packet is formed. Therefore, at the receiving end, the reference packet which is required for restoration of the compressed packet can be specified according to the reference packet identifier. Further, since the difference data between the transmission data of the reference packet and the transmission data of the compressed packet is formed as the compressed data, the compressed packet to be included in the compressed packet can be formed by simple arithmetic processing.

According to a third aspect of the present invention, in the data transmission method of the second aspect, in the transmission-side process, additional information for calculating the difference data on the basis of the transmission data of the reference packet is stored, and in the reception-side process, the difference data in the compressed packet is calculated from the transmission data of the reference packet, on the basis of the additional information stored in the compressed packet. Therefore, the data quantity of the difference data is reduced, and the data compression efficiency is improved, resulting in improved data transmission efficiency.

According to a fourth aspect of the present invention, in the data transmission method of the third aspect, the additional information is a sequence number which indicates how many packets have been transmitted before the compressed packet, after transmission of the uncompressed packet. Therefore, with respect to the transmission data which increases by a predetermined quantity every time one packet is transmitted, the difference data can be set to 0 bit.

According to a fifth aspect of the present invention, in the data transmission method of the third aspect, the additional information is a variable of a calculation formula for calculating the difference data of the compressed packet from the transmission data of the reference packet. Therefore, with respect to the transmission data which varies according to a predetermined function every time one packet is transmitted, the difference data can be reduced significantly.

According to a sixth aspect of the present invention, in the data transmission method of the second aspect, in the transmission-side process, a plurality of uncompressed packets which have been formed so as to be transmitted prior to the compressed packet are used as reference packets, and difference data between the transmission data of each reference packet and the transmission data of the compressed packet is associated with the reference packet identifier corresponding to each reference packet, and plural sets of associated difference data and reference packet identifiers are stored in the compressed packet as the compressed data. In the reception-side process, the transmission data of the compressed packet is restored using any set of different data and packet identifier stored in the compressed packet. Therefore, the reliability of the transmission process for the uncompressed packet which includes information required for restoration of the compressed packet, is improved, whereby the quality of data transmitted by radio is significantly improved.

According to a seventh aspect of the present invention, in the data transmission method of the first aspect, in the transmission-side process, the uncompressed packet is transmitted at regular intervals. Therefore, the data size of the compressed packet is prevented from significantly increasing, whereby the compression efficiency of the transmission data is limited within an approximately constant variation range. As the result, not only the quality of data transmitted by radio but also the data transmission efficiency are improved.

According to an eighth aspect of the present invention, in the data transmission method of the first aspect, in the transmission-side process, the uncompressed packet is transmitted when the size of the compressed data included in the compressed packet to be transmitted to the receiving end exceeds a predetermined value. Therefore, the data size of the compressed packet is minimized, and the compression efficiency of the transmission data is improved, whereby not only the quality of data transmitted by radio but also the data transmission efficiency are improved.

According to a ninth aspect of the present invention, in the data transmission method of the first aspect, in the reception-side process, a request for transmission of the uncompressed packet is output to the transmitting end when the size of the compressed data included in the compressed packet supplied from the transmitting end exceeds a predetermined value. In the transmission-side process, on receipt of the request from the receiving end, the uncompressed packet is transmitted to the receiving end. Therefore, the data size of the compressed packet is minimized, and the compression efficiency of the transmission data is improved, whereby not only the quality of data transmitted by radio but also the data transmission efficiency are improved.

According to a tenth aspect of the present invention, in the data transmission method of the first aspect, in the transmission-side process, the uncompressed packet containing the same transmission data is continuously transmitted by a predetermined number of times to the receiving end. Therefore, the reliability of the transmission process for the uncompressed packet required for restoration of the compressed packet is improved, whereby the quality of data transmitted by radio is significantly improved.

According to an eleventh aspect of the present invention, in the data transmission method of the tenth aspect, in the reception-side process, when a restoration error of the compressed data stored in the compressed packet is detected, this restoration error is notified to the transmitting end. In the transmission-side process, the number of times that the uncompressed packet is transmitted to the receiving end is changed on the basis of the frequency of notification of restoration error from the receiving end. Therefore, continuous transmission of the uncompressed packet is performed with efficiency.

According to a twelfth aspect of the present invention, in the data transmission method of the first aspect, in the transmission-side process, after transmission of the uncompressed packet, an auxiliary transmission packet including the packet identifier and the transmission data stored in the uncompressed packet is transmitted by a predetermined number of times to the receiving end. Therefore, the reliability of the transmission process for the information required for restoration of the compressed packet is improved, whereby the quality of data transmitted by radio is significantly improved.

According to a thirteenth aspect of the present invention, in the data transmission method of the first aspect, in the transmission-side process, the uncompressed packet, to which an error correction code is added, is transmitted to the receiving end, and in the reception-side process, the uncompressed packet is subjected to error correction according to the error correction code. Therefore, the reliability of the transmission process for the uncompressed packet which includes information required for restoration of the compressed packet is improved, whereby the quality of data transmitted by radio is significantly improved.

According to a fourteenth aspect of the present invention, in the data transmission method of the second aspect, in the transmission-side process, error correction codes are added to the packet identifier and the transmission data which are stored in the uncompressed packet, and in the reception-side process, the packet identifier and the transmission data included in the uncompressed packet are subjected to error correction according to the error correction codes. Therefore, the reliability of the transmission process for the information required for restoration of the compressed packet is improved, whereby the quality of data transmitted by radio is significantly improved.

According to a fifteenth aspect of the present invention, in the data transmission method of the first aspect, in the reception-side process, when a restoration error of the compressed data stored in the compressed packet is detected, this restoration error is notified to the transmitting end. In the transmission-side process, according to the frequency of notification of restoration error from the receiving end, one of the following two processes is performed: a process of transmitting the uncompressed packet after attaching an error correction code to this packet, and a process of transmitting the uncompressed packet without attaching an error correction code to this packet. Therefore, assignment of an error correction code to the uncompressed packet, and error correction for the uncompressed packet are performed effectively.

According to a sixteenth aspect of the present invention, in the data transmission method of the first aspect, in the transmission-side process, only the uncompressed packet is stored as data to be retransmitted in a buffer for retransmission. In the reception-side process, when a transmission error of the uncompressed packet is detected, a request for retransmission of the uncompressed packet as the error packet is output to the transmitting end. In the transmission-side process, on receipt of the request for retransmission, the uncompressed packet corresponding to the error packet is retransmitted to the receiving end only when the uncompressed packet is stored in the buffer. Therefore, the reliability of the transmission process for the information required for restoration of the compressed packet is improved, whereby the quality of data transmitted by radio is significantly improved.

According to a seventeenth aspect of the present invention, in the data transmission method of the second aspect, in the transmission-side process, the packet identifier and the transmission data which are included in the uncompressed packet are stored as data to be retransmitted in a buffer for retransmission. In the reception-side process, when a transmission error of the uncompressed packet is detected, a request for retransmission of the packet identifier and the transmission data stored in the uncompressed packet as the error packet is output to the transmitting end. In the transmission-side process, on receipt of the request for retransmission, the packet identifier and the transmission data stored in the uncompressed packet as the error packet are retransmitted to the receiving end only when these are stored in the buffer. Therefore, the reliability of the transmission process for the information required for restoration of the compressed packet is improved, and retransmission of the uncompressed packet is performed with efficiency and, furthermore, the data storage capacity of the buffer for retransmission can be reduced.

According to an eighteenth aspect of the present invention, there is provided a data transmission method for sequentially transmitting data in units of packets each containing transmission data, from the transmitting end to the receiving end, and this method comprises a first data transmission process and a second data transmission process. The first data transmission process includes a transmission-side process of transmitting an uncompressed packet in which predetermined transmission data is stored as uncompressed data, and then continuously transmitting a compressed packet in which at least a portion of transmission data following the predetermined transmission data is compressed and stored as compressed data; and a reception-side process of receiving the packets transmitted from the transmitting end, and restoring the transmission data of the respective packets on the basis of the uncompressed data and the compressed data stored in the respective packets. The transmission-side process includes a compression process of forming compressed data to be stored in a compressed packet to be transmitted, on the basis of the transmission data of a reference packet that is the uncompressed packet, and the transmission data of the compressed packet to be transmitted. The reception-side process includes a restoration process of restoring the transmission data of a compressed packet to be restored, on the basis of the transmission data of the reference packet, and the compressed data included in the compressed packet to be restored. The second data transmission process is for forming, at the transmitting end, compressed data to be stored in the compressed packet by a formation method different from the compressed data formation method employed in the first data transmission process, and restoring, at the receiving end, the compressed data stored in the compressed packet by a restoration method different from the compressed data restoration method employed in the first data transmission process. In this method, when transmitting the transmission data in packet units, the data transmission process is switched between the first process and the second process according to whether a restoration error occurs in the compressed packet at the receiving end. Therefore, the quality of data transmitted by radio is improved when the error frequency is high, and the compression efficiency of transmission data is improved when the error frequency is low.

According to a nineteenth aspect of the present invention, in the data transmission method of the eighteenth aspect, the second data transmission process includes, as a transmission-side process, a compression process of forming compressed data to be stored in a compressed packet to be transmitted, on the basis of the transmission data of a previous packet which has been transmitted immediately before the compressed packet, and the transmission data of the compressed packet to be transmitted; and as a reception-side process, a restoration process of restoring the compressed data included in a compressed packet to be restored, by using the transmission data of the previous packet. Therefore, when the error frequency is low, the compression efficiency of transmission data is significantly improved.

According to a twentieth aspect of the present invention, in the data transmission method of the nineteenth aspect, at the receiving end, when an error occurs in the restoration process of restoring the compressed data included in the compressed packet, the receiving end notifies the transmitting end of this error. At the transmitting end, when the frequency of error notification exceeds a predetermined value, the transmitting end requests the receiving end to change the restoration process at the receiving end to the restoration process in the first data transmission process and, thereafter, the transmitting end performs the compression process in the first data transmission process. On the other hand, when the frequency of error notification becomes equal to or smaller than the predetermined value, the transmitting end requests the receiving end to change the restoration process at the receiving end to the restoration process in the second transmission process and, thereafter, the transmitting end performs the compression process in the second data transmission process. Therefore, it is possible to adaptively switch the transmission method between the transmission method which provides high quality of radio-transmitted data (in the case where the error frequency is high) and the transmission method which provides high compression efficiency of transmission data (in the case where the error frequency is low).

According to a twenty-first aspect of the present invention, in the data transmission method of the nineteenth aspect, at the receiving end, when the frequency of error which occurs in the restoration process of restoring the compressed data included in the compressed packet exceeds a predetermined value, the receiving end requests the transmitting end to change the compression process at the transmitting end to the compression process in the first data transmission process. On the other hand, when the frequency of error in the restoration process becomes equal to or lower than the predetermined value, the receiving end requests the transmitting end to change the compression process at the transmitting end to the compression process in the second data transmission process. The transmitting end performs either the compression process in the first data transmission process or the compression process in the second data transmission process, according to the request from the receiving end. Therefore, it is possible to adaptively switch the transmission method between the transmission method which provides high quality of radio-transmitted data (in the case where the error frequency is high) and the transmission method which provides high compression efficiency of transmission data (in the case where the error frequency is low).

According to a twenty-second aspect of the present invention, there is provided a data transmission method for sequentially transmitting data in units of packets each containing transmission data, from the transmitting end to the receiving end. This method comprises a transmission-side process of transmitting an uncompressed packet in which predetermined transmission data is stored as uncompressed data, and then continuously transmitting a compressed packet in which at least a portion of transmission data following the predetermined transmission data is compressed and stored as compressed data; and a reception-side process of receiving the packets from the transmitting end, and restoring the transmission data of the respective packets on the basis of the uncompressed data and the compressed data stored in the respective packets. The transmission-side process includes a compression process of forming compressed data to be stored in a compressed packet to be transmitted, on the basis of update information relating to a packet which has been transmitted prior to the compressed packet and the transmission data of the compressed packet to be transmitted; and a transmission-side update process of setting information relating to the uncompressed packet as an initial value of the update information, and updating the update information to information relating to a specific compressed packet every time the specific compressed packet is formed. The reception-side process includes a restoration process of restoring the transmission data of a compressed packet to be restored by using update information relating to a packet which has been received prior to the compressed packet; and a reception-side update process of setting information relating to the uncompressed packet as an initial value of the update information and, thereafter, updating the update information to information relating to the specific compressed packet every time the transmission data of the specific compressed packet is restored. Therefore, the quality of data transmitted in the radio section is improved to increase the effective rate of data transmission and, further, the data compression efficiency is improved. As the result, the time and cost required for transmission of unrestorable packets are significantly reduced. Further, since the reference information required for restoration of the compressed packet is updated by transmission of the specific compressed packet, the compression efficiency of transmission data is improved while maintaining high efficiency of data transmission.

According to a twenty-third aspect of the present invention, in the data transmission method of the twenty-second aspect, the update information is composed of a reference packet identifier which indicates, as a reference packet, either the uncompressed packet or the specific compressed packet, and the transmission data corresponding to the reference packet; the compressed packet includes a reference packet identifier which indicate, as a reference packet, either the uncompressed packet or the specific compressed packet, and an information update flag indicating whether the update information is to be updated; the information update flag included in the specific compressed packet is set at a value indicating that the update information is to be updated; and the information update flags included in compressed packets other than the specific compressed packet are set at a value indicating that the update information is not to be updated. Therefore, the receiving end can easily decide whether the update information is to be updated, according to the information update flag.

According to a twenty-fourth aspect of the present invention, in the data transmission method of the twenty-second aspect, in the transmission-side process, the specific compressed packet is transmitted to the receiving end every time a predetermined period of time has passed. Therefore, the quantity of difference data in the compressed packet is prevented from increasing, whereby the quality of data transmitted in the radio section is improved to increase the effective rate of data transmission and, further, the data compression efficiency is improved.

According to a twenty-fifth aspect of the present invention, in the data transmission method of the twenty-second aspect, in the transmission-side process, the specific compressed packet is transmitted to the receiving end every time a predetermined number of compressed packets have been transmitted. Therefore, the quantity of difference data in the compressed packet is prevented from increasing, whereby the quality of data transmitted in the radio section is improved to increase the effective rate of data transmission and, further, the data compression efficiency is improved.

According to a twenty-sixth aspect of the present invention, in the data transmission method of the twenty-second aspect, in the transmission-side process, the specific compressed packet is transmitted to the receiving end when transmission of the specific compressed packet is requested from the receiving end. Therefore, the quality of data transmitted in the radio section is improved, and the effective rate of data transmission is increased. Further, the data compression efficiency is improved.

According to a twenty-seventh aspect of the present invention, in the data transmission method of the twenty-second aspect, in the transmission-side process, the specific compressed packet is transmitted when the size of the compressed data included in the compressed packet to be transmitted to the receiving end exceeds a predetermined value. Therefore, the quantity of difference data in the compressed packet is prevented from increasing.

According to a twenty-eighth aspect of the present invention, in the data transmission method of the twenty-second aspect, in the transmission-side process, the specific compressed packet is transmitted when the average of sizes of the compressed data included in the compressed packets to be transmitted to the receiving end exceeds a predetermined value. Therefore, the quantity of difference data in the compressed packet is prevented from increasing, and control against variation of the difference data is performed with stability. Also in this case, the time and cost required for transmission of unrestorable packets are significantly reduced.

According to a twenty-ninth aspect of the present invention, in the data transmission method of the twenty-second aspect, the transmission data includes plural pieces of item-basis transmission data corresponding to different items; the compressed data includes plural pieces of item-basis compressed data corresponding different items; the item-basis compressed data corresponding to each item in the compressed data included in the compressed packet is obtained by compressing the item-basis compressed data corresponding to each item in the transmission data of the compressed packet by using the item-basis transmission data corresponding to each item in the transmission data of the uncompressed packet or the specific compressed packet; and each of the item-basis compressed data includes an item type flag which specifies the item corresponding to the compressed data. Therefore, the transmission data is compressed for each item, whereby optimum compression effect is realized for each item. Further, the storage area (e.g., RAM) for storing the updated information and the like is reduced. Thereby, the time and cost required for transmission of unrestorable packets are reduced and, further, the cost for fabrication of transmission terminal equipment or reception terminal equipment is reduced.

According to a thirtieth aspect of the present invention, in the data transmission method of the twenty-ninth aspect, each of the item-basis compressed data includes data length information indicating the length of the compressed data. Therefore, the item-basis compressed data is restored with efficiency.

According to a thirty-first aspect of the present invention, in the data transmission method of the twenty-ninth aspect, the respective item-basis compressed data are formed using different compression methods; and each of the item-basis compressed data includes a restoration method information which indicates a restoration method corresponding to the compression method. Therefore, a plurality of item-basis compressed data which have been obtained by different compression processes are restored with efficiency.

According to a thirty-second aspect of the present invention, there is provided a data transmission apparatus for sequentially transmitting data in units of packets each containing transmission data, to the receiving end. This apparatus comprises a reception unit for receiving the transmission data as an input signal; a packet formation unit for receiving the transmission data received, and forming an uncompressed packet in which predetermined transmission data is stored as uncompressed data, and a compressed packet in which at least a portion of transmission data that follows the predetermined transmission data is compressed and stored as compressed data; a reference information management unit for holding and managing, as reference information, information relating to the uncompressed packet formed by the packet formation unit; and a transmission unit for transmitting the respective packets formed by the packet formation unit, as a transmission signal, to the receiving end. The packet formation unit forms compressed data to be stored in a compressed packet to be formed, on the basis of the transmission data of the uncompressed packet and the reference information stored in the reference information management unit. Therefore, even when a transmission error occurs in the compressed packet transmitted in the radio section, the receiving end can restore the subsequent compressed packet with reference to the transmission data of the uncompressed packet as the reference packet. Thereby, the number of packets to be discarded at the receiving end due to the transmission error in the radio section is reduced, with the result that the quality of data transmitted in the transmission path including the radio section is improved.

According to a thirty-third aspect of the present invention, there is provided a data reception apparatus for receiving data which have been transmitted in packet units from the transmitting end as a transmission signal, and sequentially restoring transmission data of the respective packets. This apparatus comprises a packet reception unit for receiving the transmission signal, and outputting an uncompressed packet in which predetermined transmission data is stored as uncompressed data, and a compressed packet in which at least a portion of transmission data following the predetermined transmission data is compressed and stored as compressed data; a packet restoration unit for receiving the output from the packet reception unit, and restoring the respective packets on the basis of the data stored in the respective packets, and outputting the transmission data of the respective packets; and an output unit for outputting the transmission data of the respective packets supplied from the packet restoration unit. The packet restoration unit restores the transmission data of the compressed packet, on the basis of the compressed data included in the compressed packet and the reference information stored in the reference information management unit. Therefore, even when a transmission error occurs in the compressed packet transmitted in the radio section, the subsequent compressed packet are restored with reference to the transmission data of the uncompressed packet as the reference packet, whereby the quality of data transmitted in the transmission path including the radio section is improved.

According to a thirty-fourth aspect of the present invention, there is provided a data transmission apparatus for sequentially transmitting data in units of packets each containing transmission data, to the receiving end. This apparatus comprises a reception unit for receiving the transmission data as an input signal; a packet formation unit for receiving the transmission data, and forming an uncompressed packet in which predetermined transmission data is stored as uncompressed data, and a compressed packet in which at least a portion of transmission data following the predetermined transmission data is compressed and stored as compressed data; an information management unit for managing, as update information, information relating to the uncompressed packet and a specific compressed packet which are formed by the packet formation unit; and a transmission unit for transmitting the packets formed by the packet formation unit as a transmission signal to the receiving end. The information management unit being constructed so that it sets information relating to the uncompressed packet as an initial value of the update information and, thereafter, updates the update information to the information relating to the specific compressed packet every time the specific compressed packet is formed. The packet formation unit is constructed so that it forms the compressed data to be stored in a compressed packet to be formed, on the basis of the transmission data of the compressed packet and the update information stored in the reference information management unit. Therefore, the quality of data transmitted in the radio section is improved to increase the effective rate of data transmission and, moreover, the data compression efficiency is improved. As the result, the time and cost required for transmission of unrestorable packets are significantly reduced. Further, since the reference information required for restoration of the compressed packet is updated by transmission of the specific compressed packet, the number of times the uncompressed packet is transmitted can be minimized.

According to a thirty-fifth aspect of the present invention, there is provided a data reception apparatus for receiving data which have been transmitted in packet units from the transmitting end as a transmission signal, and sequentially restoring transmission data of the respective packets. This apparatus comprises a packet reception unit for receiving the transmission signal, and outputting an uncompressed packet in which predetermined transmission data is stored as uncompressed data, and a compressed packet in which at least a portion of transmission data following the predetermined transmission data is compressed and stored as compressed data; a packet restoration unit for receiving the output from the packet reception unit, and restoring the respective packets on the basis of the data stored in the respective packets, and outputting the transmission data of the respective packets; a reference information management unit for storing and managing, as reference information, information relating to the uncompressed packet and the specific compressed packet which are restored by the packet restoration unit; and an output unit for outputting the transmission data of the respective packets which are restored by the packet restoration unit. The information management unit is constructed so that it sets the information relating to the uncompressed packet as an initial value of the update information and, thereafter, updates the update information to the information relating to the specific compressed packet every time the specific compressed packet is restored. The packet restoration unit is constructed so that it restores the transmission data of the compressed packet, on the basis of the compressed data included in the compressed packet and the reference information stored in the reference information management unit. Therefore, the quality of data transmission in the radio section is improved to increase the effective rate of data transmission, and the data compression efficiency is improved. As the result, the time and cost required for transmission of unrestorable packets are significantly reduced. Further, since the reference information required for restoration of the compressed packet is updated every time the specific compressed packet is restored, it is possible to realize data transmission with high data transmission efficiency and high data compression efficiency while minimizing the number of times the uncompressed packet is transmitted.

According to a thirty-sixth aspect of the present invention, there is provided a data structure of a compressed packet which includes compressed data obtained by compressing at least a portion of transmission data and is to be transmitted after a reference packet which is used for restoration of the compressed data. The compressed packet comprises a data section in which the compressed data is stored, and a header section including a first identifier which indicates whether the data stored in the data section is compressed, and a second identifier which identifies the reference packet. Therefore, even when a transmission error occurs in the compressed packet transmitted in the radio section, the receiving end can restore the subsequent compressed packets with reference to the transmission data of the uncompressed packet as the reference packet.

According to a thirty-seventh aspect of the present invention, in the packet data structure of the thirty-sixth aspect, the transmission data comprises plural pieces of item-basis compression target data corresponding to difference items to be compressed, and non-target data which is not to be compressed; the data section of the compressed packet includes, as the compressed data, item-basis compressed data corresponding to the respective items, and the non-target data; the item-basis compressed data corresponding to each item is restorable on the basis of item-basis uncompressed data corresponding to each item and stored in the reference packet; and the header section of the compressed packet includes additional information for calculating the item-basis compressed data corresponding to a predetermined target item, on the basis of the corresponding item-basis uncompressed data in the reference packet. Therefore, the transmission data is compressed for each item, whereby optimum compression effect is realized for each item. Further, the storage area (e.g., RAM) for storing the information relating to the reference packet and the like is reduced. Thereby, the time and cost required for transmission of unrestorable packets are reduced and, further, the cost for fabrication of transmission terminal equipment or reception terminal equipment is reduced.

According to a thirty-eighth aspect of the present invention, there is provided a data structure of a compressed packet which includes compressed data obtained by compressing at least a portion of transmission data and is to be transmitted after a reference packet which is used for restoration of the compressed data. The compressed packet comprises a data section in which the compressed data is stored, and a header section including a first identifier which indicates whether the data stored in the data section is compressed, a second identifier which identifies the reference packet, and a reference information update flag which indicates whether reference information corresponding to the transmission data of the reference packet is to be updated. Therefore, the quality of data transmitted in the radio section is improved to increase the effective rate of data transmission and, further, the data compression efficiency is improved. As the result, the time and cost required for transmission of unrestorable packets are significantly reduced. Further, since the reference information required for restoration of the compressed packet, the number of times the uncompressed packet is transmitted can be minimized.

According to a thirty-ninth aspect of the present invention, in the packet data structure of the thirty-eighth aspect, the transmission data comprises plural pieces of item-basis compression target data corresponding to difference items to be compressed, and non-target data which is not to be compressed; the data section of the compressed packet includes, as the compressed data, item-basis compressed data corresponding to the respective items, and the non-target data; the item-basis compressed data corresponding to each item is restorable on the basis of item-basis uncompressed data corresponding to each item and stored in the reference packet; and the header section of the compressed packet includes additional information for calculating the item-basis compressed data corresponding to a predetermined target item, on the basis of the corresponding item-basis uncompressed data in the reference packet. Therefore, the transmission data can be compressed for each item, whereby optimum compression effect is realized for each item. Further, the storage area (e.g., RAM) for storing the information relating to the reference packet and the like is reduced. Thereby, the time and cost required for transmission of unrestorable packets are reduced and, furthermore, the cost for fabrication of transmission terminal equipment or reception terminal equipment is reduced.

According to a fortieth aspect of the present invention, in the packet data structure of the thirty-ninth aspect, the header section of the compressed packet includes a data existence flag which indicates whether or not any of the plural item-basis compressed data is included in the data section of the compressed packet. Therefore, it is easily decided in short time whether the compressed packet is to be restored.

BRIEF DESCRIPTION OF THE DRAWINGS

FIGS. 25(a)-25(c) are diagrams for explaining a data transmission method according to a modification of the fifth embodiment, illustrating the data structures of an uncompressed packet (25(a)) and a compressed packet (25(b)) which are used in the data transmission method, and a process of forming a compressed packet Pj(Y) by compressing transmission data D(Y) (25(c)).

FIGS. 33(a) and 33(b) are diagrams for explaining a data transmission system having a radio transmission section to which the V. Jacobson's header compression method is applied, illustrating the whole structure of the data transmission system (33(a)) and processes required for data transmission in the data transmission system.

DETAILED DESCRIPTION OF THE PREFERRED EMBODOMENTS

Figure 1:
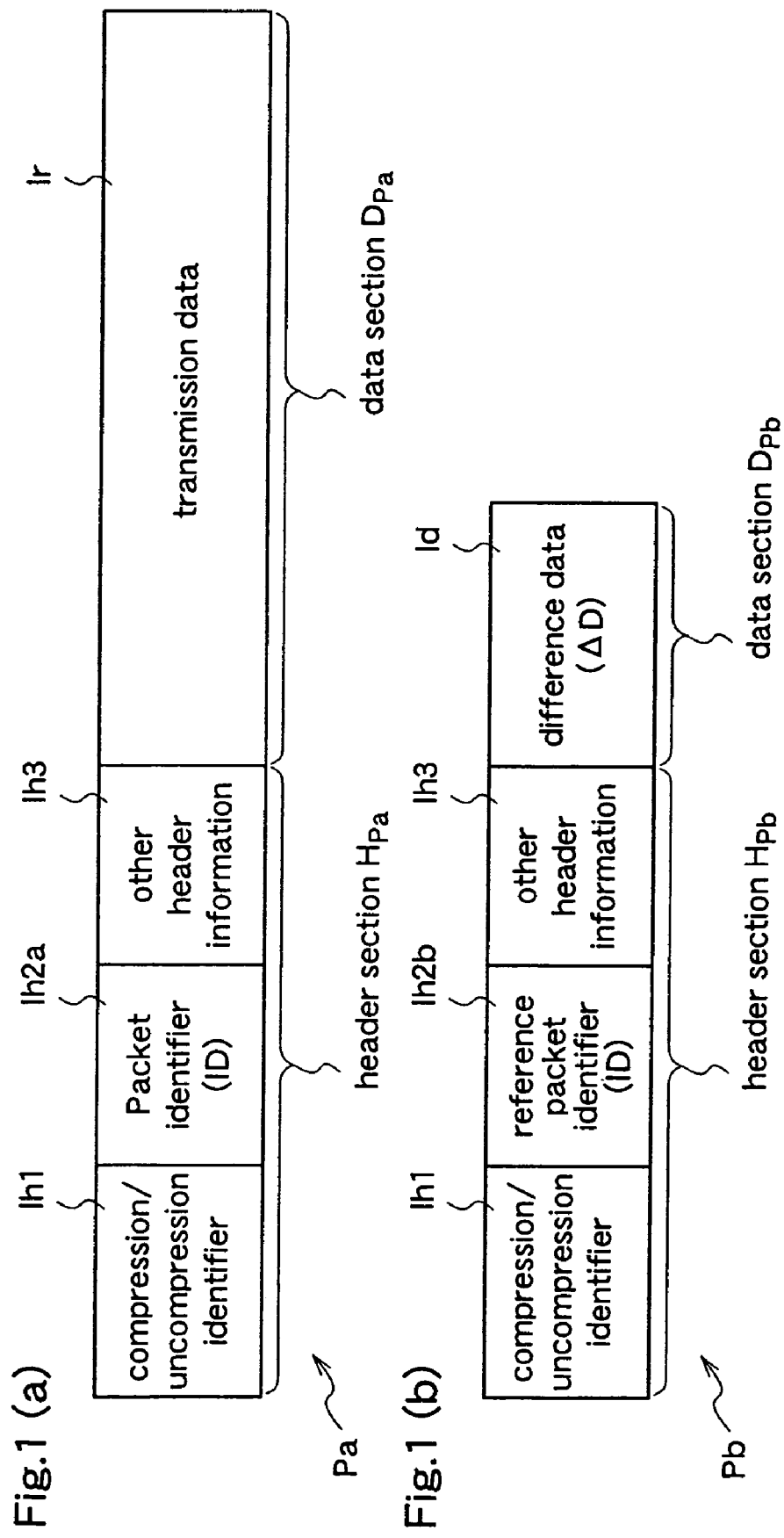
FIGS. 1(a) and 1(b) are diagrams for explaining a data transmission method according to a first embodiment of the present invention, illustrating data structures of an uncompressed packet (1(a)) and a compressed packet (1(b)) which are used in the data transmission method.

Hereinafter, the inventor's viewpoint and the fundamental principle of the present invention will be described.

The inventors of the present invention have earnestly studied a method for improving the quality of data transmitted through a network including a radio transmission path, and finally discovered that the data quality can be improved by using, instead of the existing header compression method (e.g., V. Jacobson's header compression method), a header compression method in which difference data obtained by using transmission data of an uncompressed packet that has been transmitted previously to a compressed packet to be transmitted, is stored in this compressed packet as compressed data to be transmitted.

In the following description for the embodiments of the present invention, as for data communication, only single-direction transmission from a server Sin on the Internet to a mobile radio terminal (e.g., visual terminal) Tmo will be described as shown by data flow Df in FIG. 33. However, by constructing the communication apparatuses such as the server and the terminal unit for data communication so as to have both functions as a transmitter and a receiver, bi-directional and simultaneous data communication is realized. In the above-described data communication from the server Sin on the Internet to the mobile radio terminal Tmo, the gateway server Sga (refer to FIG. 33(b)) performs reception of data from the server Sin as well as transmission of the received data to the terminal Tmo, and the mobile radio terminal Tmo performs reception of the data from the gateway server Sga.

Further, the embodiments of the present invention will be described for the case where an RTP/UDP/IP packet corresponding to an IP packet Pipb (refer to FIG. 29(d)) is transmitted as data to be transmitted (transmission data) including various kinds of header information, with the header information being compressed, by using PPP. However, the transmission data and the transmission protocol are not restricted to the RTP/UDP/IP packet and the PPP.

Embodiment 1

FIGS. 1 to 11 are diagrams for explaining a data transmission method according to a first embodiment of the present invention. This first embodiment corresponds to aspects 1~9, 18~21, 32, 33, 36, and 37.

In the data transmission method of this first embodiment, data transmission from a transmitter to a receiver is performed packet by packet. The transmitter forms uncompressed packets and compressed packets and transmits these packets, and the receiver receives these packets from the transmitter and sequentially restores the received packets. In this method, difference data, which is based on transmission data stored in an uncompressed packet that has been transmitted most-recently, is stored in a compressed packet to be transmitted. To be specific, the difference data stored in the compressed packet to be transmitted is obtained by using the transmission data stored in the uncompressed packet as reference data, and subtracting the transmission data to be transmitted by the compressed packet from the reference data.

In the following description, transmission data stored in an uncompressed packet is also referred to as "transmission data of an uncompressed packet", and transmission data to be transmitted by a compressed packet is also referred to as "transmission data of a compressed packet".

FIGS. 1(a) and 1(b) are diagrams for explaining the data transmission method according to the first embodiment, illustrating the data structures of an uncompressed packet (FIG. 1(a)) and a compressed packet (FIG. 1(b)) which are employed in the data transmission method. In FIGS. 1(a) and 1(b), only portions of these PPP packets, required for explaining the header compression method, are shown in detail.

As shown in FIG. 1(a), an uncompressed packet Pa is composed of a header section Hpa containing header information, and a data section Dpa containing uncompressed data Ir to be transmitted by PPP. The information in the header section Hpa is composed of a compression/uncompression identifier Ih1 indicating whether the data stored in the data section Dpa is compressed, a packet identifier (ID) Ih2a for identifying this packet, and other header information Ih3. The identifier Ih1 of this uncompressed packet Pa indicates "uncompressed". The uncompressed data Ir is transmission data (D) to be transmitted by the uncompressed packet.

On the other hand, as shown in FIG. 1(b), the compressed packet Pb is composed of a header section Hpb containing header information, and a data section Dpb containing compressed data Id to be transmitted by PPP. The information in the header section Hpb is composed of a compression/uncompression identifier Ih1 indicating whether the data stored in the data section Dpb is compressed, a reference packet identifier (ID) Ih2b for identifying an uncompressed packet (reference packet) which contains transmission data to be used as reference data, and other header information Ih3. The identifier Ih1 of the compressed packet Pb indicates "compressed". The compressed data Id is difference data (ΔD) between the transmission data (reference data) of a most-recent uncompressed packet (reference packet) which has been transmitted previously to the compressed packet Pb, and the transmission data of the compressed packet Pb.

Figure 29:
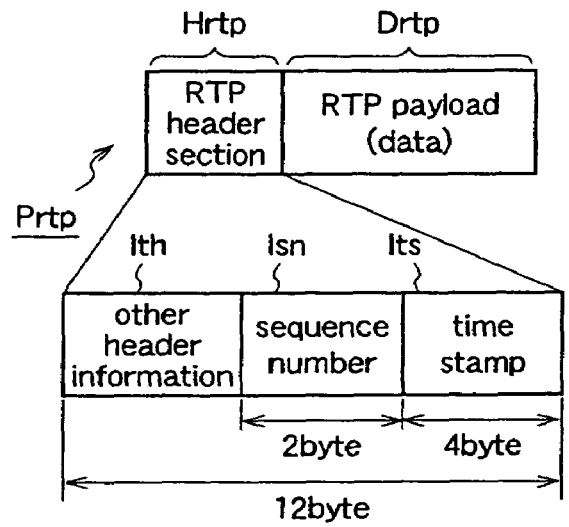
FIGS. 29(a)-29(e) are diagrams illustrating the data structures of packets used in the conventional data transmission system and, more particularly, illustrating an RTP packet (29(a)), an UDP packet (29(b)), IP packets (29(c),29(d)), and a PPP packet (29(e)).
Figure 29:
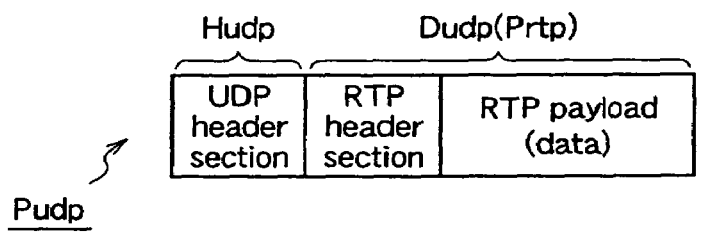
Figure 29:
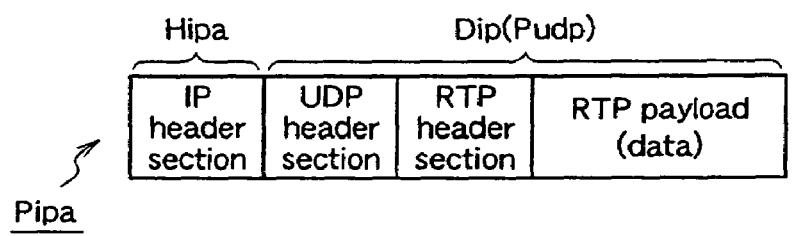
Figure 29:
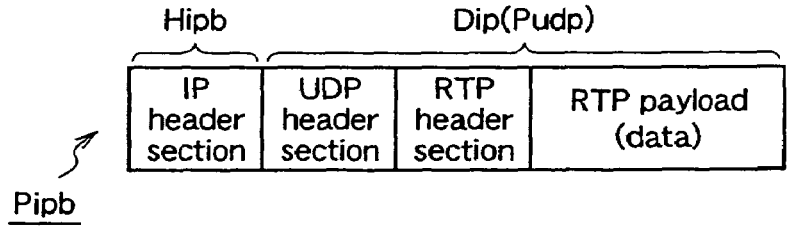
Figure 29:
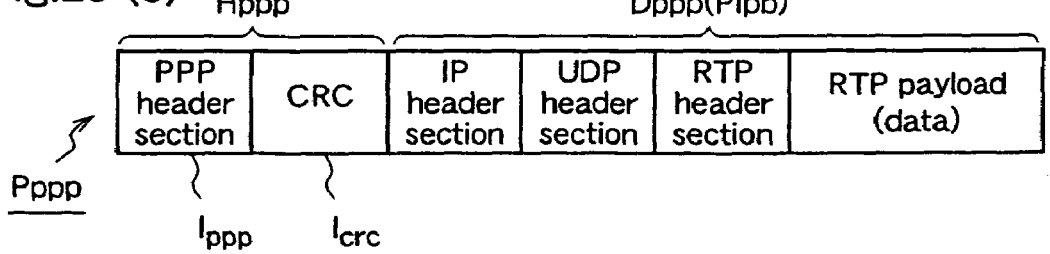
Figure 30:
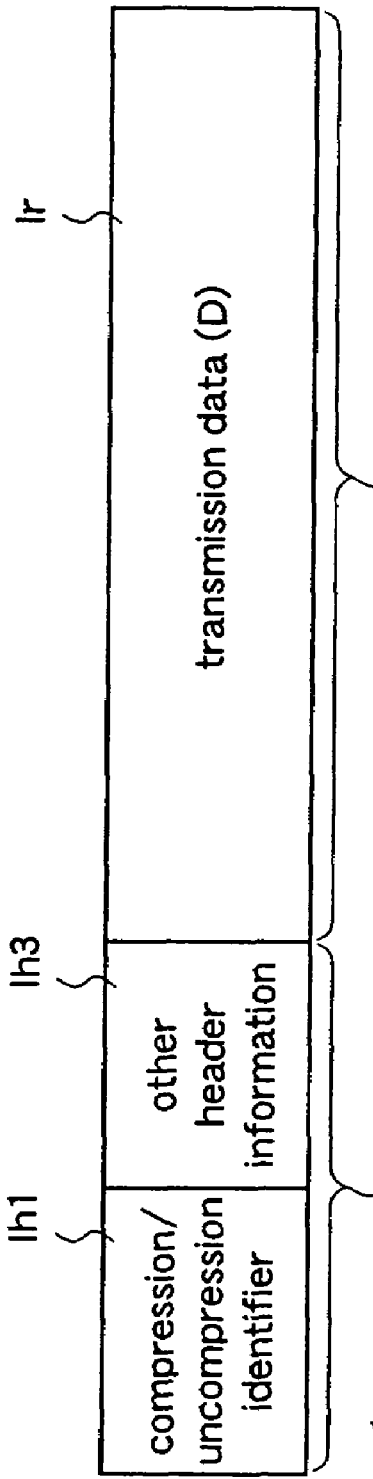
FIGS. 30(a) and 30(b) are diagrams illustrating the data structures of PPP packets used in the data transmission system to which the V. Jacobson's header compression method is applied and, more particularly, illustrating an compressed packet (30(a)) and a compressed packet (30(b)).
Figure 30:
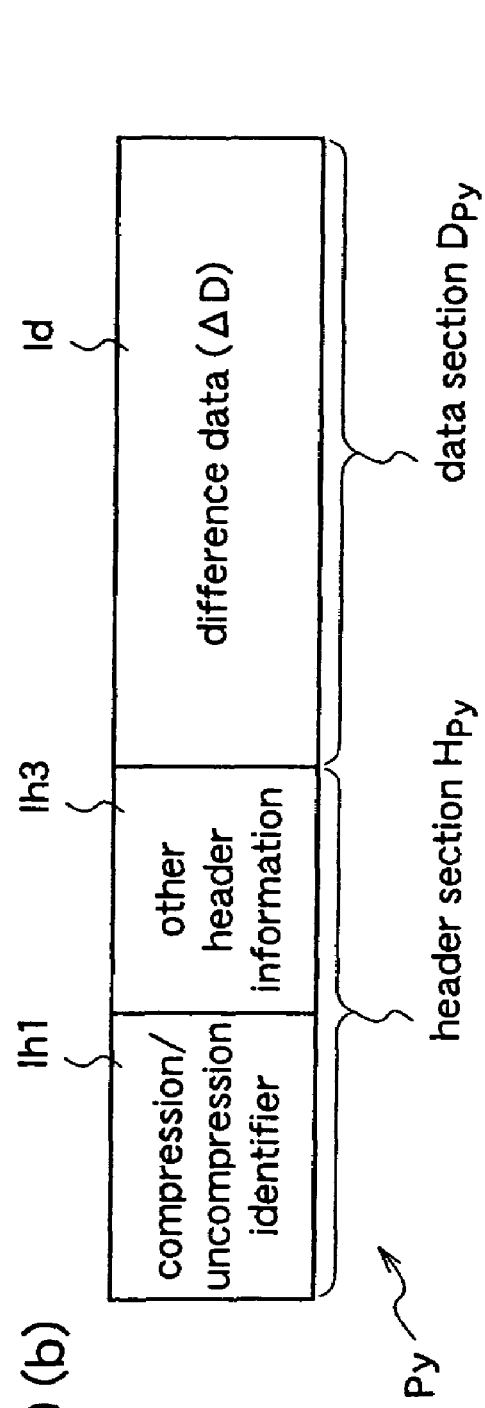

It is needless to say that the header information Ih3 includes a CRC code Icrc shown in FIG. 29(e).

Figure 2:
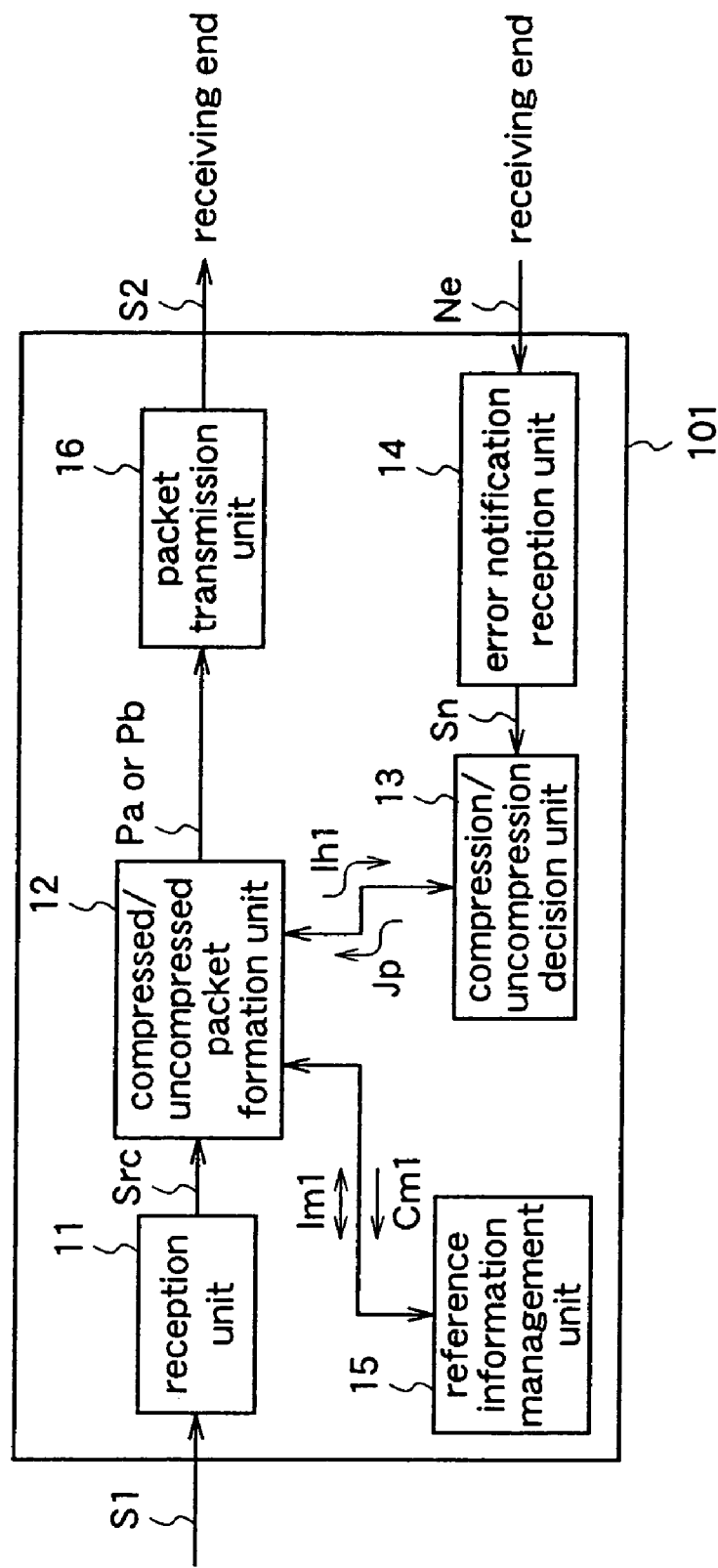
FIG. 2 is a block diagram for explaining a data transmission system using the data transmission method of the first embodiment, illustrating a data transmission apparatus in the data transmission system.

FIG. 2 is a block diagram for explaining a data transmission apparatus 101 in a data transmission system which performs data transmission according to the data transmission method of this first embodiment.

The data transmission apparatus 101 corresponds to the gateway server Sga in the data transmission system Cs2 shown in FIG. 33(a). The data transmission apparatus 101 includes a reception unit 11, a compressed/uncompressed packet formation unit 12, and a packet transmission unit 16. The reception unit 11 receives a first transmission signal S1 including transmission data, supplied from the Internet In to the receiving end (mobile radio terminal Tmo), and outputs the transmission data as a reception signal Src. The packet formation unit 12 packetizes the transmission data from the reception unit 11 on the basis of transmission standard such as PPP, and outputs an uncompressed packet Pa or a compressed packet Pb. The packet transmission unit 16 transmits the packet formed by the unit 12 as a second transmission signal S2 to the receiving end, by a transmission method such as W-CDMA.

Further, the data transmission apparatus 101 includes an error notification reception unit 14 and a compression/uncompression decision unit 13. The error notification reception unit 14 receives a restoration error notification signal Ne from the receiving end, which indicates that a restoration error has occurred at the receiving end, and outputs an error notification reception signal Sn. The decision unit 13 manages the type of each packet formed by the packet formation unit 12, decides the type of a packet to be formed next on the basis of the managed packet type and the error notification reception signal Sn, and outputs a packet decision signal Jp. In the decision unit 13, the compression/uncompression identifiers Ih1 of the packets formed by the packet formation unit 12 are recorded in association with the corresponding packets. Further, in the decision unit 13, the packet type is decided as follows. A packet which is formed first after starting data transmission, and a packet which is formed immediately after receiving an error notification reception signal Sn are decided as "uncompressed packets", while the other packets are decided as "compressed packets".

Further, the data transmission apparatus 101 includes a reference information management unit 15. This management unit 15 associates the transmission data (D) stored as uncompressed data Ir in the uncompressed packet Pa with the packet identifier (ID) Ih2a for identifying this uncompressed packet, and manages them as transmitting-end reference information Im1. The transmitting-end reference information Im1 is composed of an identifier (ID) equal to the packet identifier (ID) Ih2a, and reference data (D) equal to the transmission data (D) of the uncompressed packet Pa. This management unit 15 updates the packet identifier (ID) and the reference data (D) which are stored as the transmitting-end reference information Im1, every time an uncompressed packet is formed by the packet formation unit 12, according to a transmitting-end management control signal Cm1 supplied from the formation unit 12.

In the data transmission apparatus 101, the compressed/uncompressed packet formation unit 12 forms either an uncompressed packet Pa or a compressed packet Pb on the basis of the packet decision signal Jp. When forming the uncompressed packet Pa, the transmission data (D) is stored as the uncompressed data Ir in its data section Dpa, and the (ID) which specifies the uncompressed packet Pa is stored as the packet identifier Ih2a in its header section Hpa. When forming the compressed packet Pb, the difference data (ΔD) based on the transmission data (D) of the uncompressed packet (reference packet) is stored as the compressed data Id in its data section Dpb, and the (ID) which identifies the uncompressed packet Pa (reference packet) is stored as the reference packet identifier Ih2b in its header section Hpb.

The difference data (ΔD) of each compressed packet Pb is a difference between the transmission data of the compressed packet and the transmission data of the uncompressed packet as the reference packet. The uncompressed packet as the reference packet is a most-recent packet amongst the uncompressed packets which have been formed previously to the compressed packet Pb.

Figure 3:
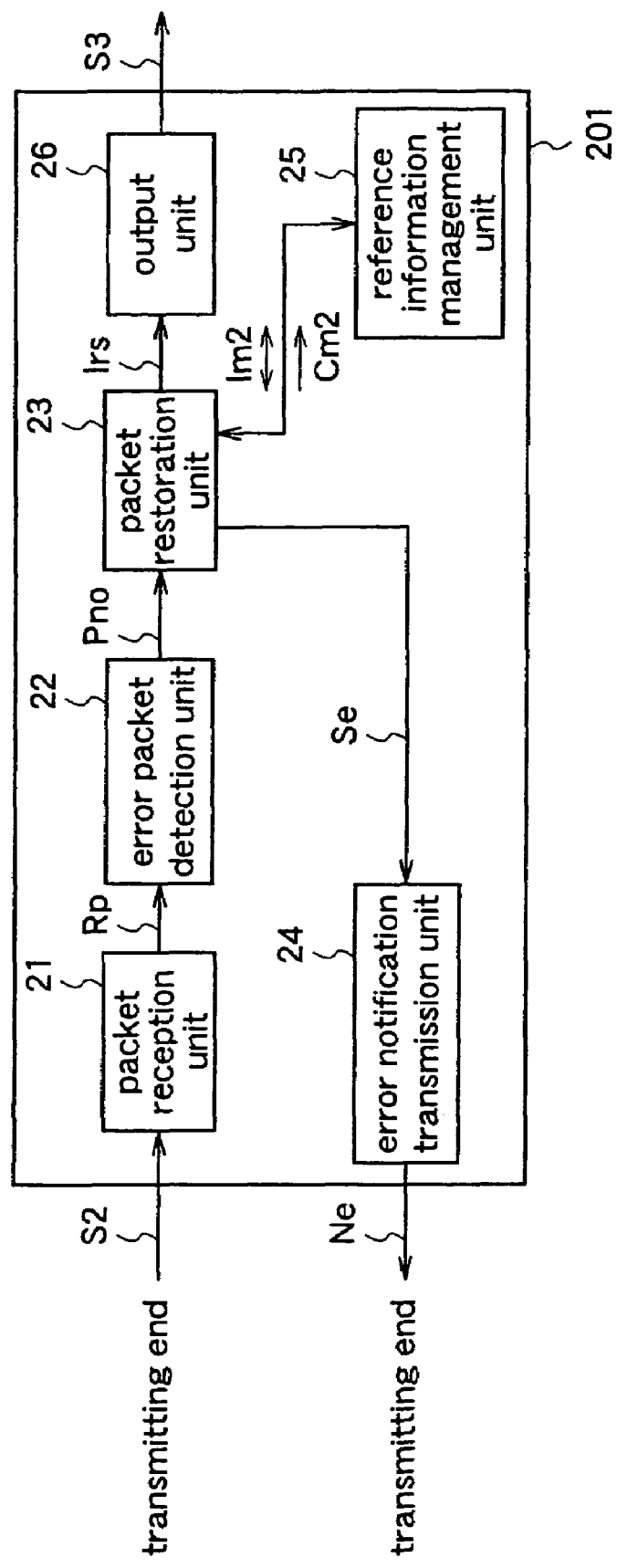
FIG. 3 is a block diagram for explaining a data transmission system using the data transmission method of the first embodiment, illustrating a data reception apparatus in the data transmission system.

FIG. 3 is a block diagram for explaining a data reception apparatus 201 in the data transmission system performing data transmission according to the data transmission method of this first embodiment.

The data reception apparatus 201 corresponds to the mobile radio terminal Tmo in the data transmission system Cs2 shown in FIG. 33(a).

The data reception apparatus 201 includes a packet reception unit 21 and an error packet detection unit 22. The packet reception unit 21 receives the packet which has been transmitted from the transmitting end as the second transmission signal S2, by a method such as W-CDMA. The error packet detection unit 22 receives the packet Rp output from the reception unit 21, detects an error packet in which an error has occurred during transmission or outputs the packet Rp which has been normally transmitted, as a normal packet Pno.

Further, the data reception apparatus 201 includes a packet restoration unit 23, an error notification transmission unit 24, and an output unit 26. The packet restoration unit 23 receives the normal packet Pno from the detection unit 22, and restores this packet Pno to output restored data Irs. Further, the restoration unit 23 outputs an error signal Se when a restoration error occurs. The error notification transmission unit 24 receives the error signal Se, and outputs a restoration error notification signal Ne which indicates that the restoration error has occurred, to the transmitting end. The output unit 26 outputs the transmission data (D) which is the restored data Irs, as an output signal S3.

In the packet restoration unit 23, as a restoration process for the uncompressed packet Pa, the transmission data (D) is taken from the data section Dpa of the uncompressed packet Pa on the basis of PPP or the like. Further, as a restoration process for the compressed packet Pb, the difference data Id is taken from the data section Dpb of the compressed packet Pb on the basis of PPP or the like, and the transmission data of this compressed packet is restored with reference to the transmission data of the uncompressed packet as the reference packet.

Further, the data reception apparatus 201 includes a reference information management unit 25. When the uncompressed packet Pa is restored in the restoration unit 23, the management unit 25 associates the packet identifier (ID) Ih2a of the restored uncompressed packet Pa with the transmission data (D) of this uncompressed packet Pa, and manages them as receiving-end reference information Im2. The receiving-end reference information Im2 is composed of an identifier (ID) equal to the packet identifier (ID) Ih2a, and reference data (D) equal to the transmission data (D) of the uncompressed packet Pa. The management unit 25 updates the packet identifier (ID) and the reference data (D) which are stored as the receiving-end reference information Im2, every time an uncompressed packet is restored in the packet restoration unit 23, according to a receiving-end management control signal Cm2 supplied from the restoration unit 23.

In the data reception apparatus 201, when each compressed packet is restored by the packet restoration unit 23, the reference packet identifier (ID) stored in this compressed packet and the transmission data (D) of this compressed packet are collated with the identifier (ID) and the corresponding reference data (D) which are stored in the management unit 25, respectively. Based on the collation, excepting the case where these packet identifiers (ID) match and these data (D) match, i.e., when either the identifier (ID) or the transmission data (D) of the reference packet which is required for restoration of the compressed packet to be restored is not stored in the management unit 25, an error signal Se indicating that a restoration error has occurred is output from the packet restoration unit 23 to the error notification transmission unit 24.

Next, the function and effect will be described.

Figure 4:
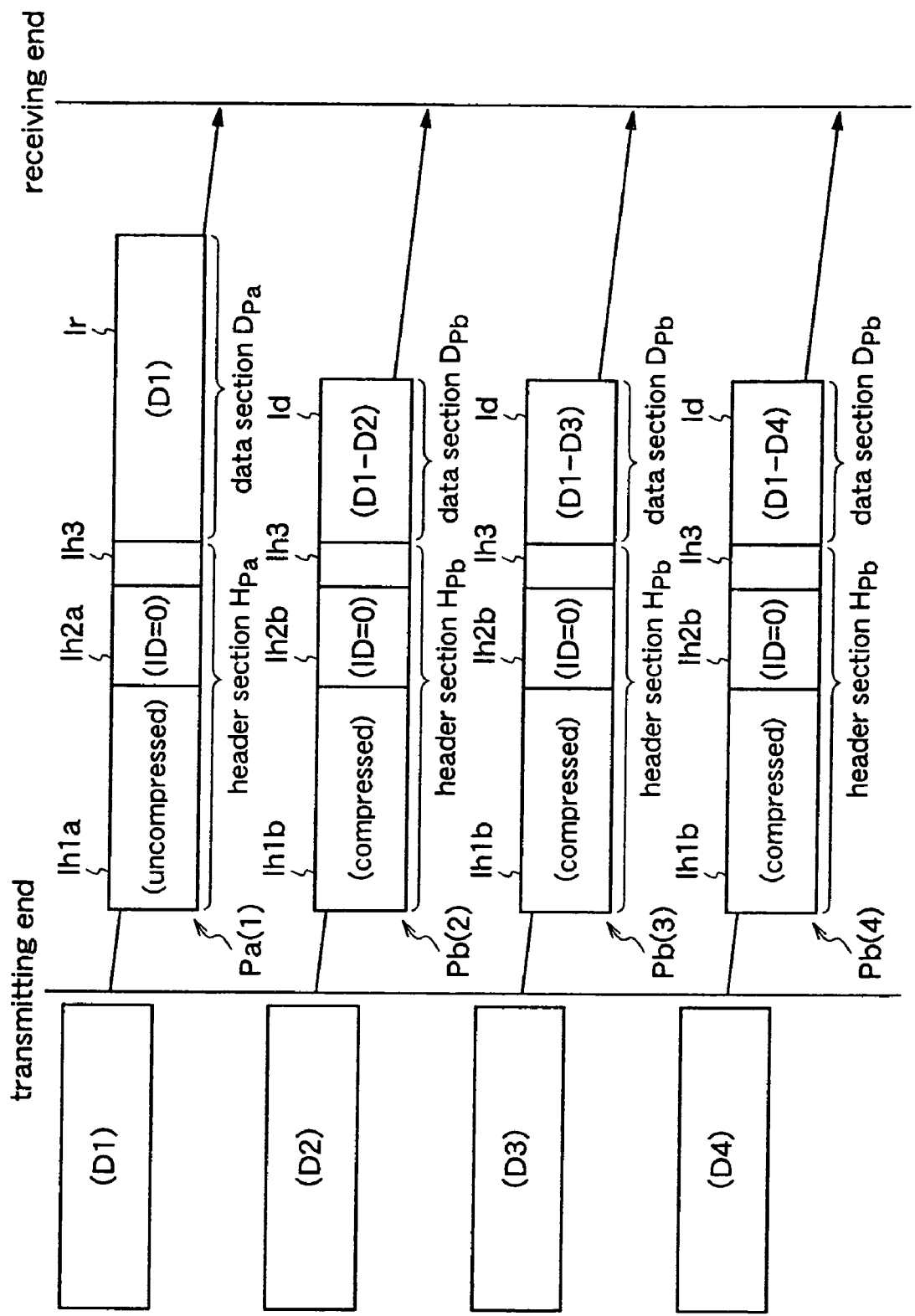
FIG. 4 is a diagram for explaining the data transmission method of the first embodiment, illustrating the flow of plural packets from the transmitting end to the receiving end in the normal transmission state.
Figure 5:
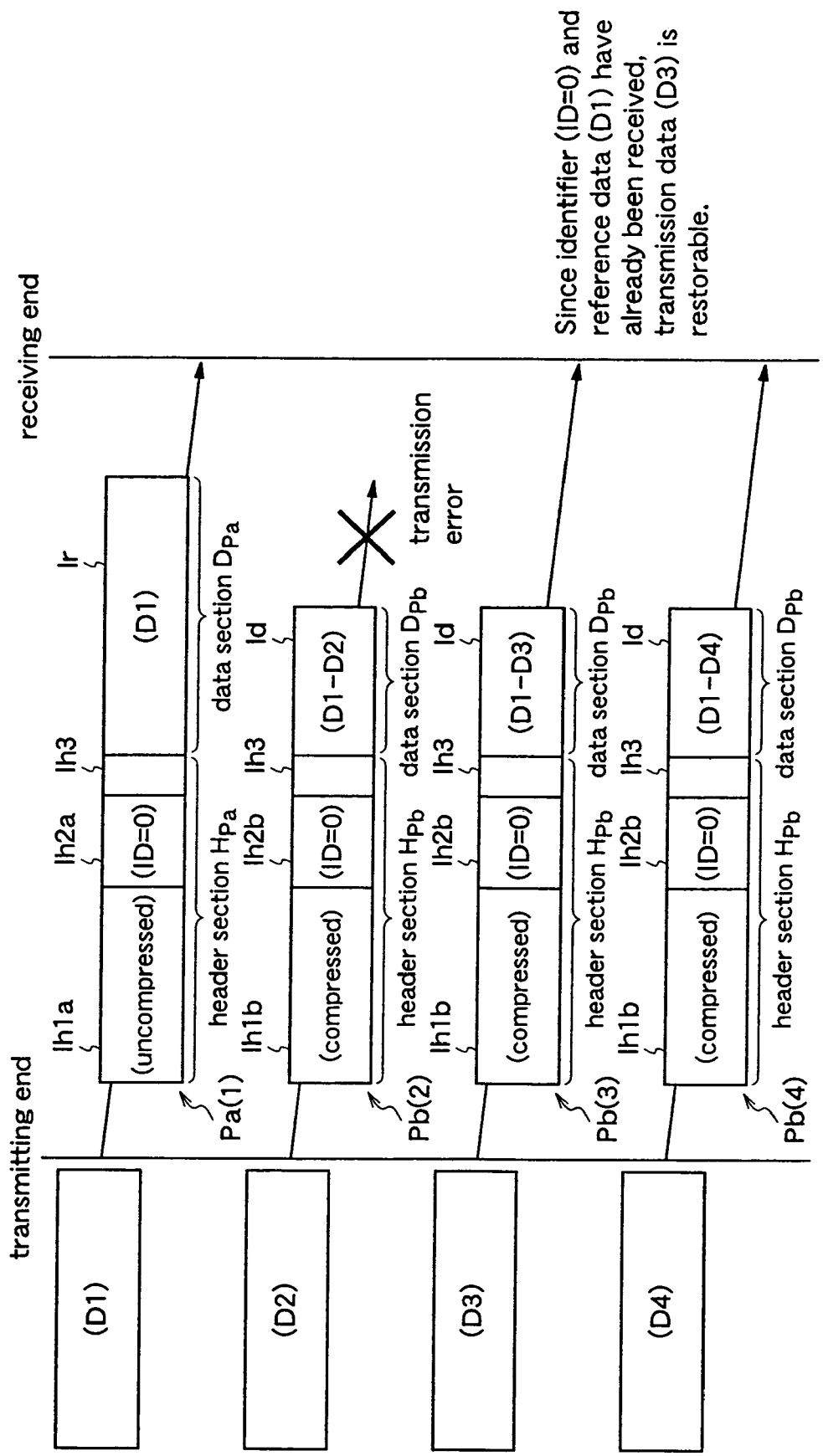
FIG. 5 is a diagram for explaining the data transmission method of the first embodiment, illustrating the flow of plural packets from the transmitting end to the receiving end in the state where a transmission error occurs.

FIGS. 4 and 5 are diagrams for explaining the data transmission method according to the first embodiment. FIG. 4 shows the flow of plural packets from the transmitting end to the receiving end in the normal transmission state, and FIG. 5 shows the flow of plural packets from the transmitting end to the receiving end when a transmission error occurs.

In FIG. 4, transmission data (D1)~(D4) are packetized data for packet-by-packet transmission. In this first embodiment, the transmission data (D1) is not compressed and transmitted by an uncompressed packet pa(1), and the transmission data (D2)~(D4) are compressed and sequentially transmitted by compressed packets Pb(2)~Pb(4) which follow the uncompressed packet Pa(1).

At the transmitting end, initially, the uncompressed packet Pa(1) is generated and transmitted to the receiving end. At this time, the transmission data (D1) is stored as the uncompressed data Ir in the data section Dpa of the uncompressed packet Pa(1), and the identifier Ih1 indicating "uncompressed", the packet identifier (ID=0) Ih2a for identifying this packet, and other header information Ih3 are stored in the header section Hpa.

Next, the compressed packet Pb(2) is generated and transmitted to the receiving end. At this time, difference data (D1-D2) is stored as the compressed data Id in the data section Dpb of this compressed packet Pb(2), and the identifier Ih1 indicating "compressed", the reference packet identifier (ID=0) Ih2b, and other header information Ih3 are stored in the header section Hpb. The difference data (D1-D2) is obtained by subtracting the transmission data (D2) of the compressed packet Pb(2) from the transmission data (D1) of the uncompressed packet Pa(1) as the reference packet.

Subsequently, the compressed packet Pb(3) is generated and transmitted to the receiving end. At this time, difference data (D1-D3) is stored as the compressed data Id in the data section Dpb of this compressed packet Pb(3), and the identifier Ih1 indicating "compressed", the reference packet identifier (ID=0) Ih2b, and other header information Ih3 are stored in the header section Hpb. The difference data (D1-D3) is obtained by subtracting the transmission data (D3) of the compressed packet Pb(3) from the transmission data (D1) of the uncompressed packet Pa(1) as the reference packet.

Further, the compressed packet Pb(4) is generated and transmitted to the receiving end. At this time, difference data (D1-D4) is stored in the data section Dpb of this compressed packet Pb(4), and the identifier Ih1 indicating "compressed", the reference packet identifier (ID=0) Ih2b, and other header information Ih3 are stored in the header section Hpb. The difference data (D1-D4) is obtained by subtracting the transmission data (D4) of the compressed packet Pb(4) from the transmission data (D1) of the uncompressed packet Pa(1) as the reference packet.

The reference packet identifier (ID=0) Ih2b which is stored in the header section Hpb of each of the compressed packets Pb(2), Pb(3), and Pb(4) indicates that the reference packet required for restoration of this compressed packet is the uncompressed packet Pa(1).

As described above, the uncompressed packet Pa(1) and the following compressed packets Pa(2)~Pa(4) are sequentially received at the receiving end in the normal transmission state, and the transmission data (D1)~(D4) of these packets are restored.

That is, at the receiving end, when the uncompressed packet Pa(1) is received, the transmission data (D1) is taken from the data section Dpa. Subsequently, when the compressed packet Pb(2) is received, the difference data (D1-D2) is taken from the data section Dpb, and the transmission data (D2) of the compressed packet Pb(2) is restored from the difference data (D1-D2) with reference to the transmission data (D1) of the uncompressed packet Pa(1) which is specified as the reference packet by the reference packet identifier (ID=0) Ih2b.

Thereafter, when the compressed packets Pb(3) and Pb(4) are received, as in the case of the compressed packet Pb(2), the difference data (D1-D3) and (D1-D4) are taken from their data sections Dpb, and the transmission data (D3) and (D4) of the compressed packets Pb(3) and Pb(4) are restored from the difference data (D1-D3) and (D1-D4) with reference to the transmission data (D1) of the uncompressed packet Pa(1) which is specified as the reference packet by the reference packet identifier (ID=0) Ih2b.

FIG. 5 shows the case where a transmission error occurs in the compressed packet Pb(2) during the above-described packet transmission. Even in this case, when the compressed packets Pb(3) and Pb(4) which follow the compressed packet Pb(2) are received, the transmission data (D3) and (D4) of these compressed packets Pb(3) and Pb(4) are normally restored.

That is, in this first embodiment, the difference data (ΔD) stored in the data section Dpb of each compressed packet Pb is not the difference data between the transmission data of the compressed packet Pb and the transmission data of the packet which has been transmitted just before the compressed packet Pb, but the difference data between the transmission data of the compressed packet Pb and the transmission data of the most-recent uncompressed packet Pa which has been transmitted previously to the compressed packet Pb. Therefore, in the data transmission system of this first embodiment, even when a transmission error has occurred in some compressed packet, this transmission error does not adversely affect restoration of a compressed packet which is normally received after the error packet. Accordingly, when such transmission error has occurred, only the error packet is discarded, and no restoration error is notified from the receiving end to the transmitting end.

Figure 32:
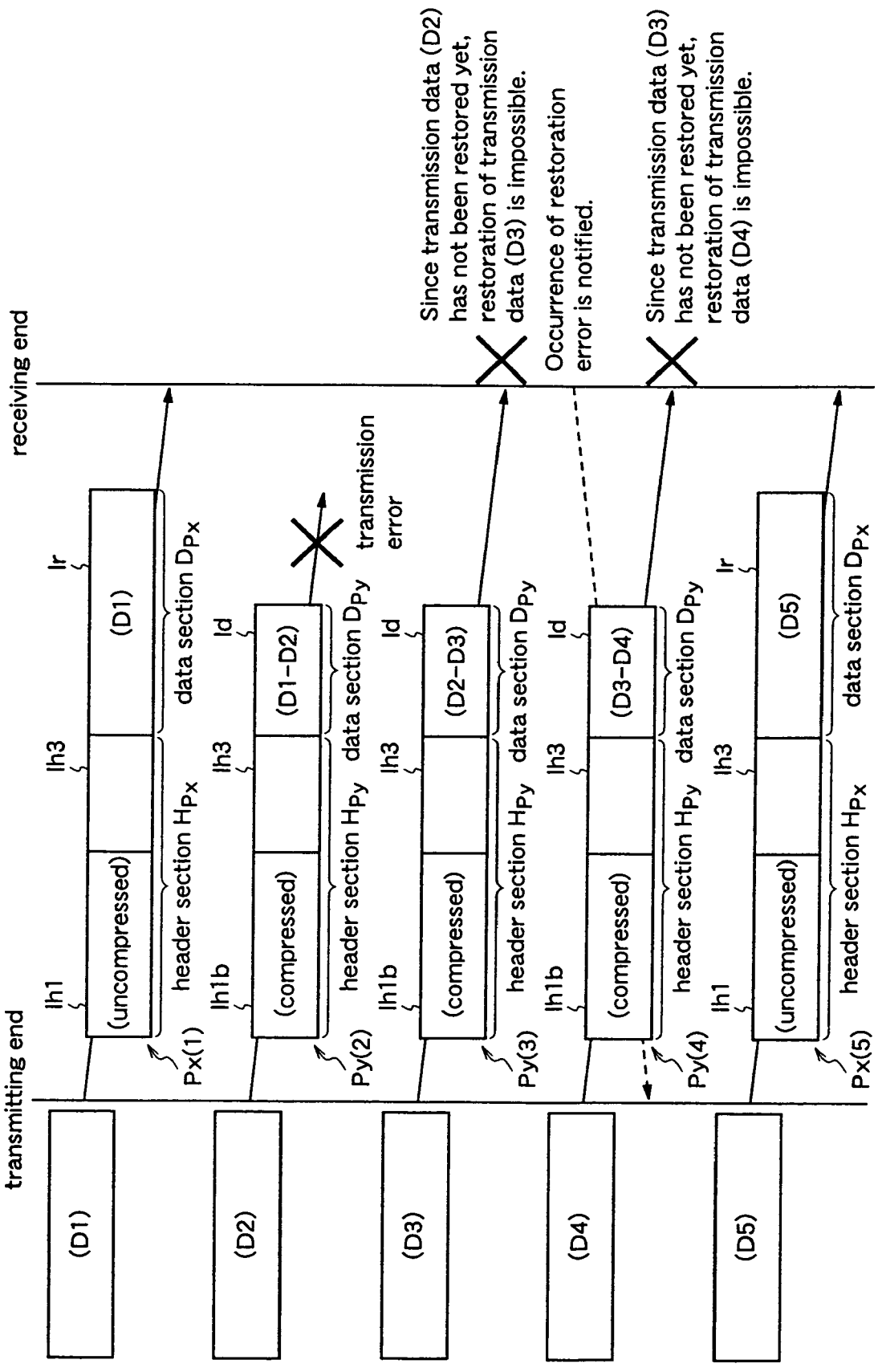
FIG. 32 is a diagram for explaining the case where a transmission error occurs in the PPP packet transmission using the V. Jacobson's header compression method.

When a transmission error has occurred in the uncompressed packet Pa(1) during the packet-by-packet data transmission, a notification signal Ne indicating that the transmission error has occurred is transmitted from the receiving end to the transmitting end, in the same manner as described with respect to FIG. 32. on receipt of this notification signal Ne, the transmitting end transmits an uncompressed packet to the receiving end and, thereafter, compressed packets are sequentially transmitted. At the receiving end, the error packet and the subsequent compressed packets, i.e., those packets which have been received from when the transmission error occurred to when the uncompressed packet is normally received, are discarded.

Next, the operation of the data transmission apparatus 101 in the data transmission system will be described.

In the data transmission apparatus 101, as shown in FIG. 4 or 5, the transmission data (D1)~(D4) are sequentially transmitted to the receiving end by the corresponding uncompressed packet and compressed packets.

For example, when the transmission data (D1)~(D4) (refer to FIG. 4) which has been transmitted from the server Sin on the Internet (refer to FIG. 33(a)) by a transmission method such as the Ethernet, are input to the data transmission apparatus 101 as a first transmission signal S1, the reception unit 11 receives these transmission data (D1)~(D4) by the above-described transmission method. The received transmission data (D1)~(D4) are sequentially output to the packet formation unit 12 as a reception signal Src.

In the packet formation unit 12, a packet for transmitting each transmission data to the receiving end is formed on the basis of a transmission protocol such as PPP. At this time, the packet formation unit 12 inquires of the compression/uncompression decision unit 13 about the type of a packet to be formed. On receipt of this inquiry, the decision unit 13 provides the packet formation unit 12 with a packet decision signal Jp indicating the packet type.

To be specific, when the transmission data (D1) is input to the packet formation unit 12, since this is the time to form the first packet after starting communication, the decision unit 13 outputs, as a packet decision signal Jp, information indicating that an uncompressed packet is to be formed, to the packet formation unit 12.

Then, in the formation unit 12, formation of an uncompressed packet is decided on the basis of the packet decision signal Jp, and an uncompressed packet Pa(1) in which the transmission data (D1) is stored as the uncompressed data Ir is formed.

At this time, "uncompressed" is set as the compression/uncompression identifier Ih1 of the uncompressed packet Pa(1), and the identifier (ID=0) which indicates the uncompressed packet Pa(1) is set as the packet identifier Ih2a. Further, when the uncompressed packet Pa(1) has been formed in the formation unit 12, the reference information management unit 15 sets the reference packet identifier (ID) and the reference data (D) as the transmitting-end reference information Im1, to the identifier (ID=0) indicating the uncompressed packet Pa(1) and the transmission data (D1) of the uncompressed packet Pa(1), respectively, according to a transmitting end management control signal Cm1 supplied from the formation unit 12.

Then, the uncompressed packet Pa(1) is output to the packet transmission unit 16, and transmitted to the receiving end by a predetermined radio communication method such as W-CDMA.

When the transmission data (D2) output from the reception unit 11 is input to the packet formation unit 12, since this is not the time to form the first packet after starting communication nor the time to form the first packet after reception of a restoration error notification signal from the receiving end, the decision unit 13 outputs, as a packet decision signal Jp, information indicating that a compressed packet is to be formed, to the packet formation unit 12.

Then, the formation unit 12 inquires of the management unit 15 about the transmitting-end reference information Im1. In this case, in the management unit 15, the reference packet identifier(ID) is set at the identifier (ID=0) and the reference data (D) is set at the transmission data (D1). Therefore, in the packet formation unit 12, the transmission data (D2) is compressed using, as reference data, the transmission data (D1) of the uncompressed packet Pa(1) indicated by the identifier (ID=0). Thereby, difference data (D1-D2) between the transmission data (D1) and the transmission data (D2) is generated as compressed data Id to be stored in the compressed packet.

Subsequently, the packet formation unit 12 forms a compressed packet Pb(2) in which the difference data (D1-D2) is stored as compressed data Id of the transmission data (D2). In this compressed packet Pb(2), "compressed" is set as the compression/uncompression identifier Ih1, and the identifier (ID=0) which indicates the uncompressed packet Pa(1) as a reference packet required for restoration of this compressed packet Pb(2) is set as the reference packet identifier Ih2b. Further, when the compressed packet Pb(2) has been formed in the formation unit 12, the reference information management unit 15 does not update the reference packet identifier (ID) and the reference data (D) as the transmitting-end reference information Im1.

This compressed packet Pb(2) is output to the packet transmission unit 16, and transmitted to the receiving end (mobile radio terminal) by a predetermined radio communication method such as W-CDMA.

When the transmission data (D3) and (D4) output from the reception unit 11 are input to the packet formation unit 12, a compressed packet Pb(3) containing difference data (D1-D3) and a compressed packet Pb(4) containing difference data (D1-D4) are formed, respectively, in the same manner as described for the transmission data (D2).

Figure 6:
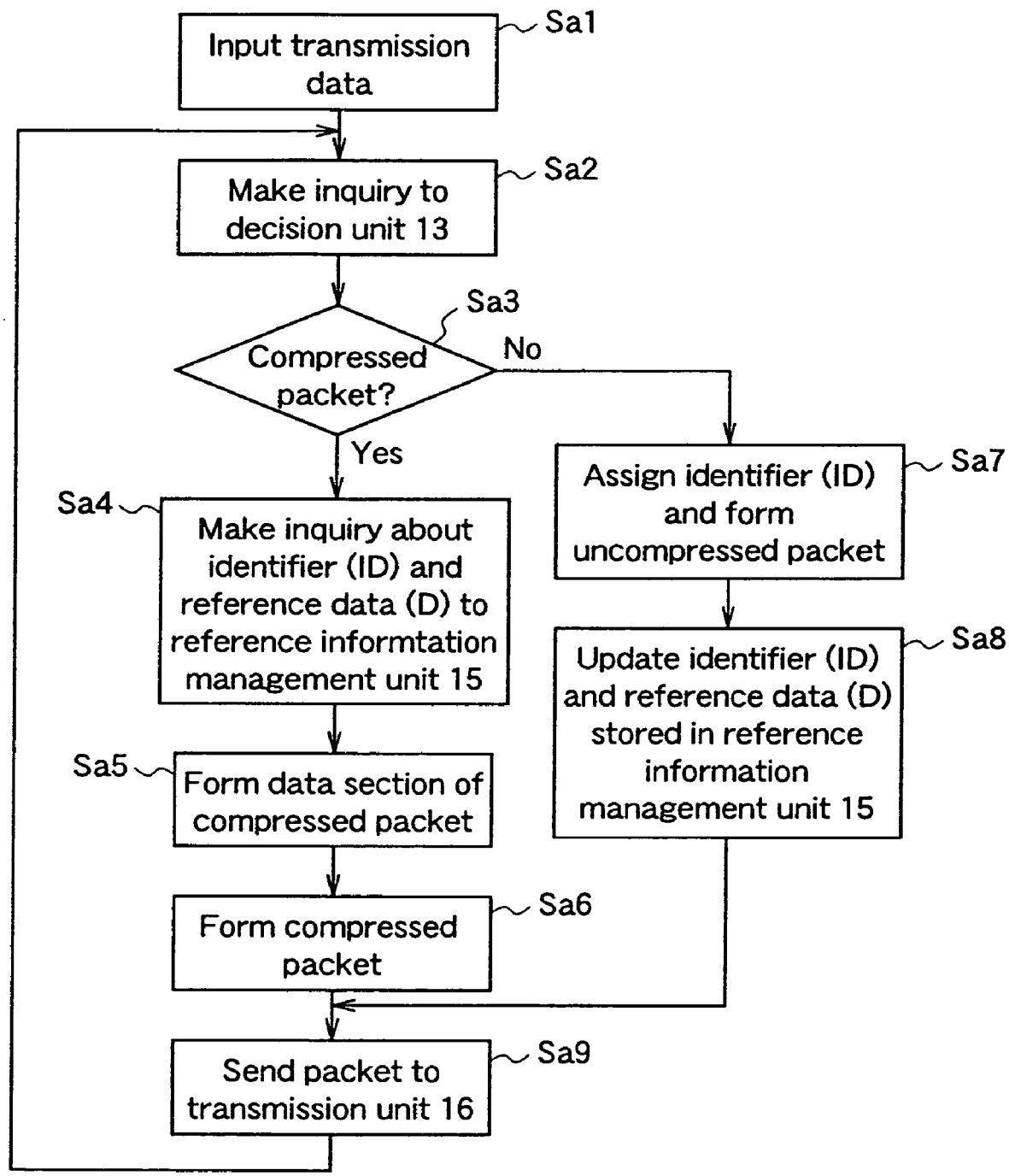
FIG. 6 is a flowchart for explaining packet formation by the data transmission apparatus of the first embodiment.

FIG. 6 is a flowchart for explaining the procedure performed by the packet formation unit 12.

When the transmission data (D) received by the reception unit 11 is input to the packet formation unit 12 (step Sa1), the formation unit 12 inquires of the decision unit 13 as to whether a packet to be formed is an uncompressed packet or a compressed packet (step Sa2), and the type of a packet to be formed is decided on the basis of a packet decision signal Jp supplied from the decision unit 13 (step Sa3).

When an uncompressed packet is to be formed, the identifier (ID) is assigned as the packet identifier Ih2a to the uncompressed packet, and the uncompressed packet Pa including the packet identifier Ih2a is formed (step Sa7). Thereafter, according to an instruction from the packet formation unit 12 (transmitting-end management control signal Cm1), the transmitting-end reference information Im1 (i.e., the identifier (ID) and the reference data (D)) which is stored in the reference information management unit 15 is updated (step Sa8).

On the other hand, when a compressed packet is to be formed, the packet formation unit 12 inquires of the reference information management unit 15 as to whether the identifier (ID) and the reference data (D) are stored as the transmitting-end reference information Im1 in the management unit 15 (step Sa4). Then, the data section Dpb of the compressed packet Pb is formed on the basis of the transmitting-side reference information Im1 (i.e., the identifier (ID) and the reference data (D)) supplied from the management unit 15 (step Sa5). Further, the identifier (ID) is stored as the reference packet identifier Ih2b in the header section Hpb, together with other header information Ih3, whereby the compressed packet Pb is completed (step Sa6).

Then, the uncompressed packet Pa or compressed packet Pb so formed is transmitted to the transmission unit 16 (step Sa9). Thereafter, the formation unit 12 returns to the process of step Sa2.

The above-described process steps in the formation unit 12 are continued until transmission of the last transmission data is completed.

Next, the operation of the data reception apparatus 201 in the data transmission system will be described.

In the data reception apparatus 201, the uncompressed packet and the compressed packets transmitted from the transmitting end as shown in FIGS. 4 and 5 are sequentially received, and restoration for each packet is performed.

To be specific, in the data reception apparatus 201, the packet reception unit 21 sequentially receives the uncompressed packet Pa(1) and the compressed packets Pb(2)~Pb(4) which have been transmitted from the transmitting end, and the received packets Rp are sequentially input to the error packet detection unit 22. In the error packet detection unit 22, each received packet Rp is subjected to error detection. When it is confirmed that the received packet Rp has been normally transmitted, this packet Rp is output as a normal packet Pno to the packet restoration unit 23. On the other hand, when it is not confirmed that the received packet Rp has been normally transmitted, this packet Rp is discarded. Although this first embodiment employs CRC (Cyclic Redundancy Check) as an error detection method, the error detection method is not restricted thereto.

In the restoration unit 23, when the uncompressed packet Pa(1) is input as a normal packet Pno, it is detected whether the normal packet Pno is a compressed packet or an uncompressed packet with reference to the compression/uncompressed identifier Ih1 included in the header section of the normal packet Pno. In this case, since the normal packet Pno is the uncompressed packet Pa(1), the restoration unit 23 takes the transmission data (D1) from the data section Dpa of the uncompressed packet Pa(1).

Next, the receiving-end reference information Im2 (i.e., the identifier (ID) and the reference data (D)) which is stored in the management unit 25 is updated according to an instruction from the restoration unit 23 (receiving-end management control signal Cm2). Thereby, the identifier (ID) and the reference data (D) stored in the management unit 25 are updated to the identifier (ID=0) and the transmission data (D1), respectively. Thereafter, the restoration unit 23 sends the transmission data (D1) as the restored data Irs to the output unit 26, and the output unit 26 outputs the transmission data (D1).

Next, in the restoration unit 23, when the compressed packet Pb(2) is input as a normal packet Pno, it is detected whether the normal packet Pno is a compressed packet or an uncompressed packet with reference to the compression/uncompression identifier Ih1 included in the header section of the normal packet Pno. In this case, since the normal packet Pno is the compressed packet Pb(2), the restoration unit 23 inquires of the reference information management unit 25 as to whether the identifier (ID=0) which is included in this compressed packet as the reference packet identifier Ih2b, and the corresponding reference data (D1) are stored in the management unit 25.

In this case, since the identifier (ID=0) and the corresponding reference data (D1) are stored in the management unit 25, the restoration unit 23 restores the transmission unit (D2) of the compressed packet Pb(2) with reference to the reference data (D1) stored in the management unit 25 and the difference data (D1-D2) stored in the compressed packet Pb(2). Thereafter, the transmission data (D2) is transmitted as the restored data Irs of the difference data (D1-D2) from the restoration unit 23 to the output unit 26, and the transmission data (D2) is output from the output unit 26.

Thereafter, when the compressed packets Pb(3) and Pb(4) are input to the packet restoration unit 23 as normal packets Pno, the transmission data (D3) and (D4) are generated as restored data Irs corresponding to the difference data (D1-D3) and (D1-D4), respectively, in the same manner as described for the compressed packet Pb(2). These transmission data (D3) and (D4) are output from the output unit 26.

Further, when either the identifier (ID=1) which is stored in the normal packet Pno (compressed packet) inputted to the restoration unit 23 or the corresponding reference data (D1) is not stored in the management unit 25, the restoration unit 23 discards the normal packet Pno (compressed packet) and outputs an error signal Se indicating that a restoration error has occurred, to the error notification unit 24.

On receipt of the error signal Se, the notification unit 24 notifies the transmitting end that the restoration error has occurred at the receiving end, by a restoration error notification signal Ne.

Figure 7:
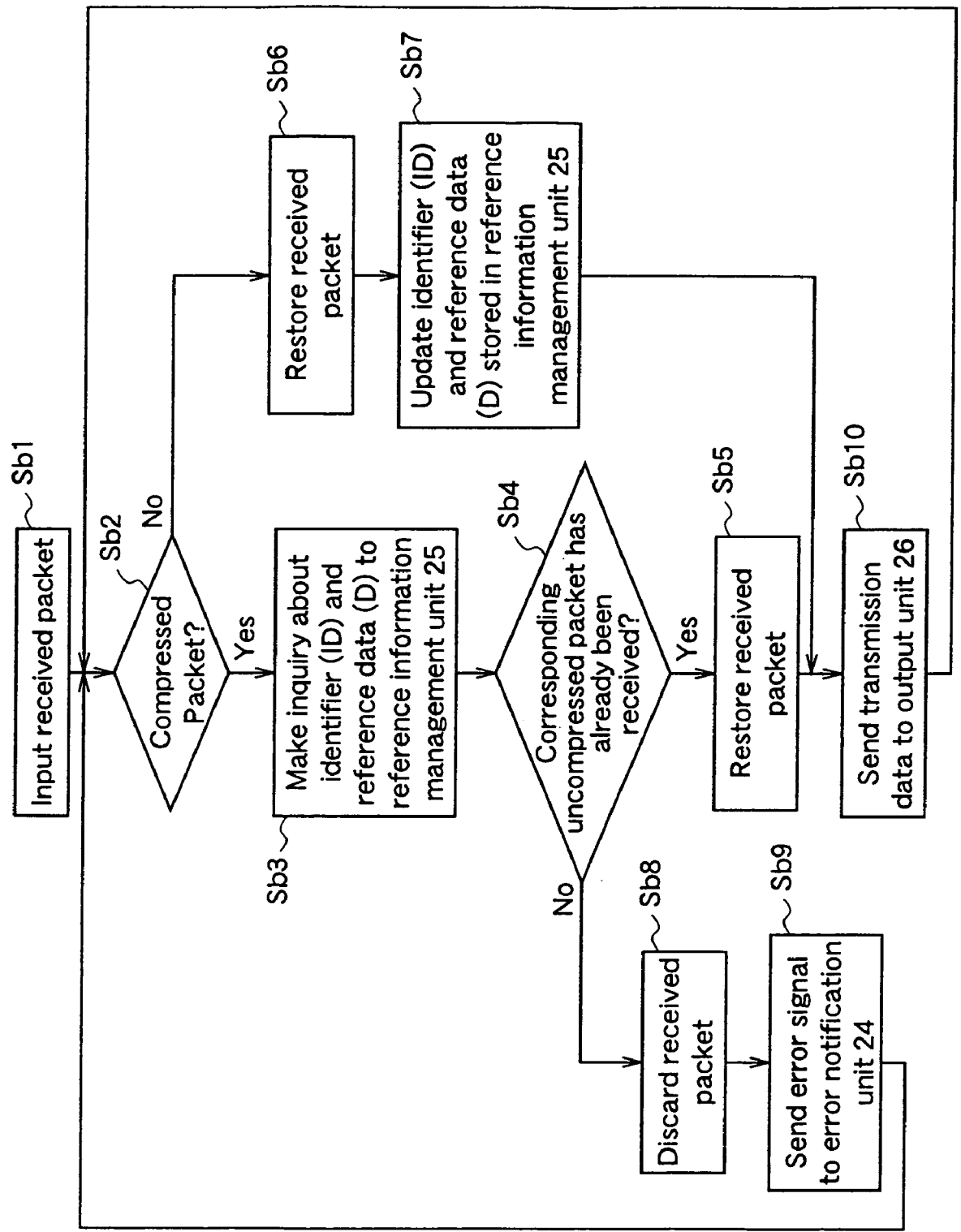
FIG. 7 is a flowchart for explaining packet restoration by the data reception apparatus of the first embodiment.
Figure 8:
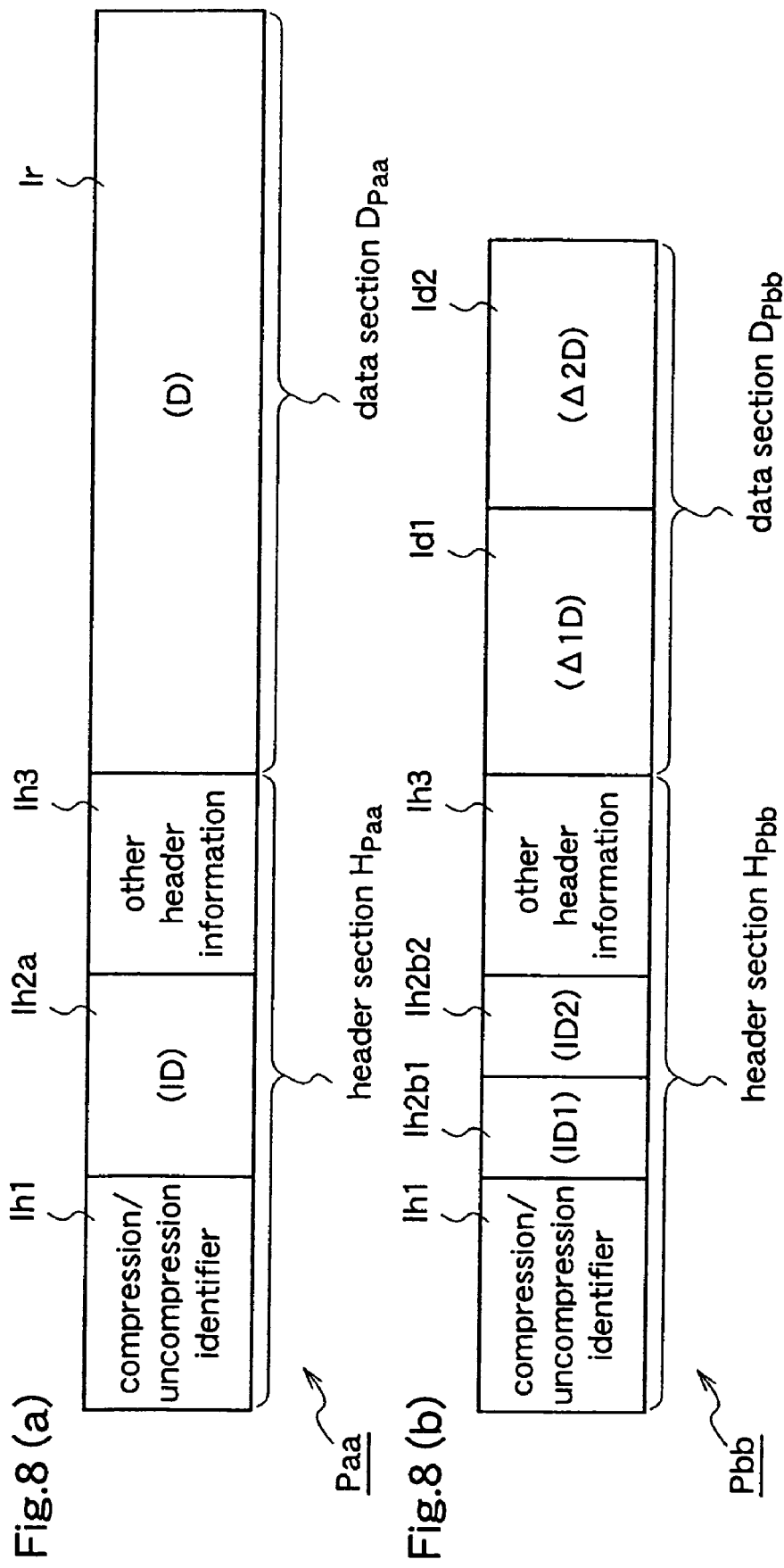
FIGS. 8(a) and 8(b) are diagrams for explaining a data transmission method according to a first modification of the first embodiment, illustrating the data structures of an uncompressed packet (8(a)) and a compressed packet (8(b)) which are used in the data transmission method.

FIG. 7 is a flowchart for explaining the procedure performed in the packet restoration unit 23.

When a normal packet Pno is transmitted from the error packet detection unit 22 to the packet restoration unit 23 (step Sb1), it is detected whether the normal packet Pno is an uncompressed packet or a compressed packet (step Sb2).

When the normal packet Pno is the uncompressed packet Pa, the uncompressed packet Pa is subjected restoration, i.e., the transmission data (D) is taken from the data section Dpa of the uncompressed packet Pa (step Sb6). Then, the identifier (ID) and the reference data (D) as the receiving-end reference information Im2 are updated according to an instruction from the packet restoration unit 23 (receiving-end management control signal Cm2) (step Sb7). Further, the transmission data (D) taken from the data section dpa of the uncompressed packet pa is sent to the output unit 26 (step Sb10).

On the other hand, when the normal packet Pno is the compressed packet pb, the packet restoration unit 23 inquires of the reference information management unit 25 as to whether the identifier (ID) and the reference data (D) are stored as the receiving-end reference information Im2 in the management unit 25 (steps Sb3).

Next, it is decided whether the uncompressed packet (reference packet) required for restoration of the difference data in the compressed packet has been received (step Sb4). This decision is made by collating the identifier (ID) stored as the reference packet identifier Ih2b in the compressed packet Pb and the corresponding transmission data (D), with the identifier (ID) stored in the reference information management unit 25 and the corresponding reference data (D).

When the uncompressed packet (reference packet) Pa for the compressed packet Pb has been received, the transmission data (D) of the compressed packet Pb is restored using the reference data (D) stored in the reference information management unit 25 (step Sb5). Further, the restored transmission data (D) is output to the output unit 26 (step Sb10). Thereafter, the restoration unit 23 returns the process of step Sb2.

Based on the result of the decision in step Sb4, when the uncompressed packet (reference packet) for the received compressed packet has not been received, the packet restoration unit 23 discards the compressed packet Pb which is the received normal packet Pno (step Sb8). Then, the restoration unit 23 outputs an error signal Se to the error notification unit 24. Thereafter, the restoration unit 23 returns to the process of step Sb2.

These process steps by the restoration unit 23 are continued until the last packet is received.

As described above, according to the data transmission method of the first embodiment, when performing packet-by-packet data transmission by using uncompressed packets Pa each containing uncompressed transmission data and compressed packets each containing compressed transmission data, difference data ($\Delta$D) between the transmission data of a compressed packet Pb to be transmitted and transmission data of an uncompressed packet Pa which has been transmitted most-recently is stored in the compressed packet Pb as compressed data Id. Therefore, so long as the uncompressed packet Pa has been normally transmitted, even when a transmission error occurs in some compressed packet Pb, the difference data ($\Delta$D) of compressed packets Pb which are normally transmitted after the error packet can be restored using the transmission data of the uncompressed packet Pa. Therefore, the number of compressed packets to be discarded due to the transmission error in the compressed packet is significantly reduced. As the result, the quality of data transmitted in the radio section is improved. In other words, the effective rate of data transmission is improved, and the time and cost required for transmission of unrestorable packets are significantly reduced.

While in this first embodiment only one reference packet identifier (ID) Ih2b is included in the header section Hpb of each compressed packet Pb, a plurality of reference packet identifiers (ID) may be included in the header section Hpb. In this case, however, a plurality of uncompressed packet must be transmitted continuously.

Modification 1 of Embodiment 1

FIG. 8(a) shows the data structure of an uncompressed packet Paa which is used when a compressed packet includes two reference packet identifiers (ID). In this case, the uncompressed packet Paa is transmitted twice continuously.

The uncompressed packet Paa is composed of a header section Hpaa which contains header information, and a data section Dpaa which contains transmission data (D) to be transmitted as uncompressed data Ir by PPP. The information in the header section Hpaa is composed of a compression/uncompression identifier Ih1, a packet identifier (ID) Ih2a, and other header information Ih3. The identifier Ih1 of this uncompressed packet Paa indicates "uncompressed".

FIG. 8(b) shows the data structure of a compressed packet Pbb including two reference packet identifiers (ID).

This compressed-packet Pbb is composed of a header section Hpbb which contains header information, and a data section Dpbb which contains first and second compressed data Id1 and Id2 to be transmitted by PPP. The information in the header section Hpbb is composed of a compression/uncompression identifier Ih1, first and second reference packet identifiers (ID1,ID2) Ih2b1 and Ih2b2 for identifying uncompressed packets as reference packets, and other header information Ih3. The identifier Ih1 of this compressed packet Pbb indicates "compressed". The second compressed data Id2 is difference data (Δ2D) between the transmission data of the compressed packet Pbb and transmission data of an uncompressed packet which has been transmitted most-recently. Further, the first compressed data Id1 is difference data (Δ1D) between the transmission data of the compressed packet Pbb and transmission data of an uncompressed packet Paa which has been transmitted previously to the most-recently-transmitted uncompressed packet Paa.

In this case, the transmission data (D1)~(D4) shown in FIG. 4 are transmitted as follows.

Figure 9:
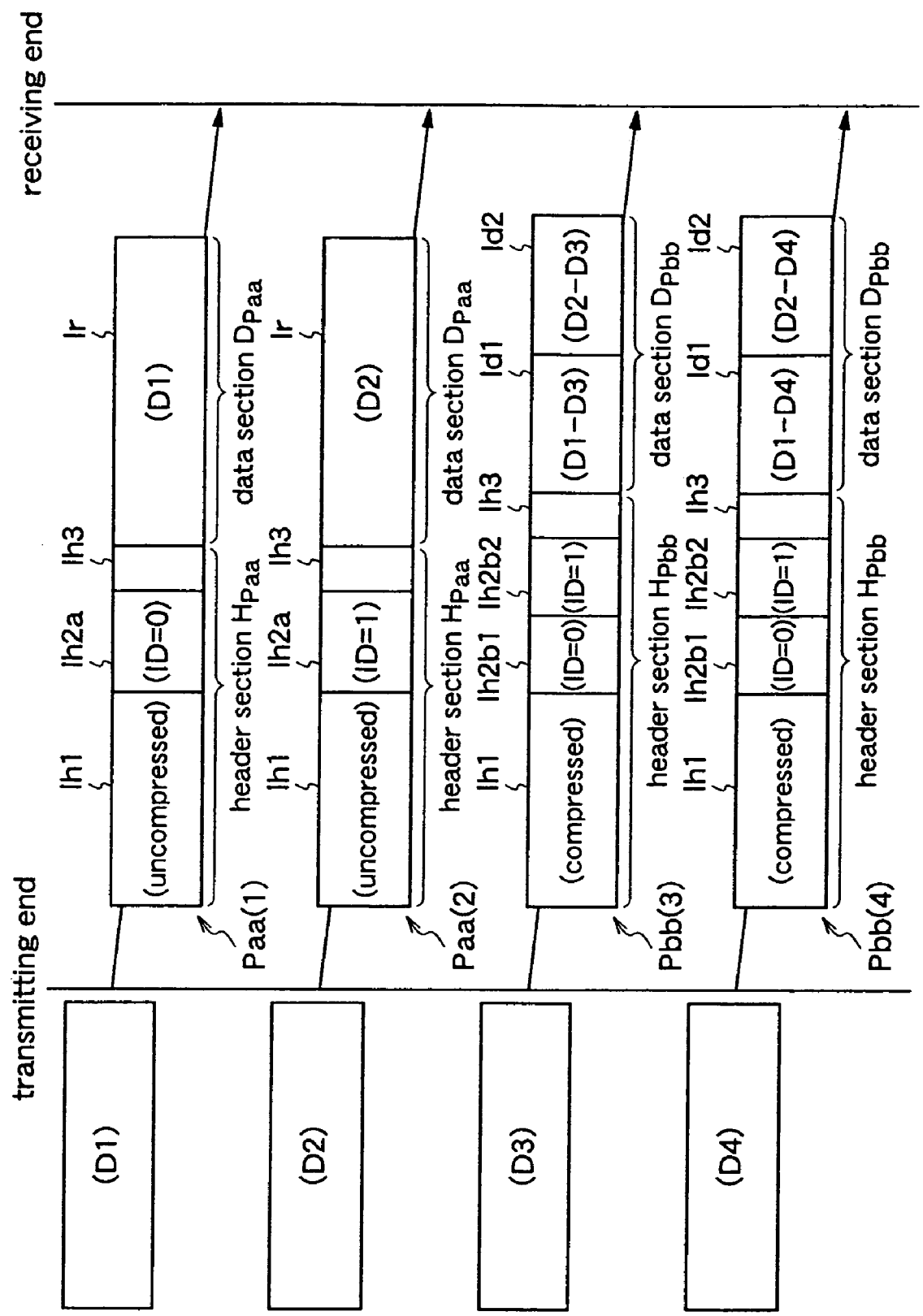
FIG. 9 is a diagram for explaining the data transmission method according to the first modification of the first embodiment, illustrating the flow of plural packets from the transmitting end to the receiving end in the normal transmission state.
Figure 10:
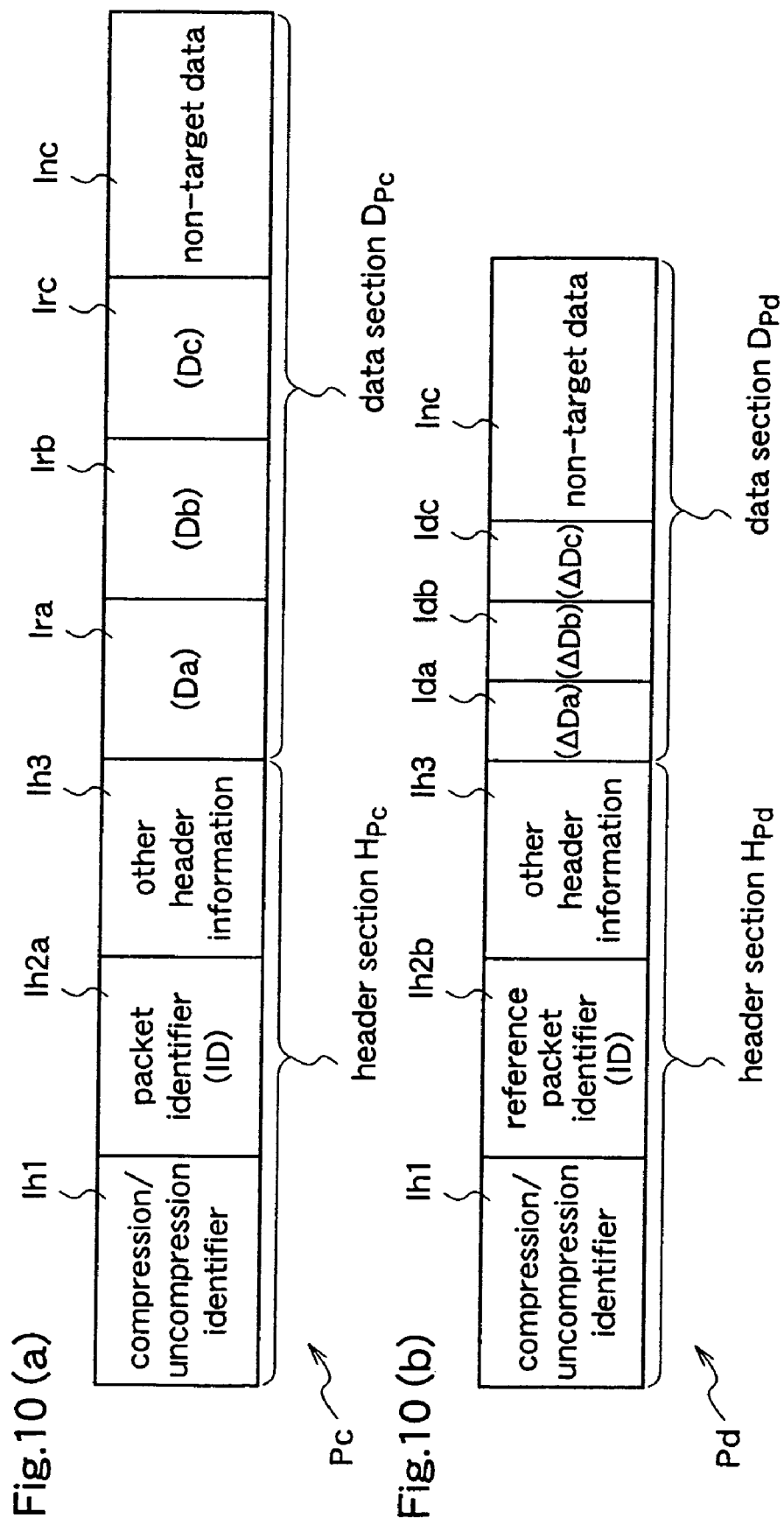
FIGS. 10(a) and 10(b) are diagrams for explaining a data transmission method according to a second modification of the first embodiment, illustrating the data structures of an uncompressed packet (10(a)) and a compressed packet (10(b)) which are used in the data transmission method.
Figure 11:
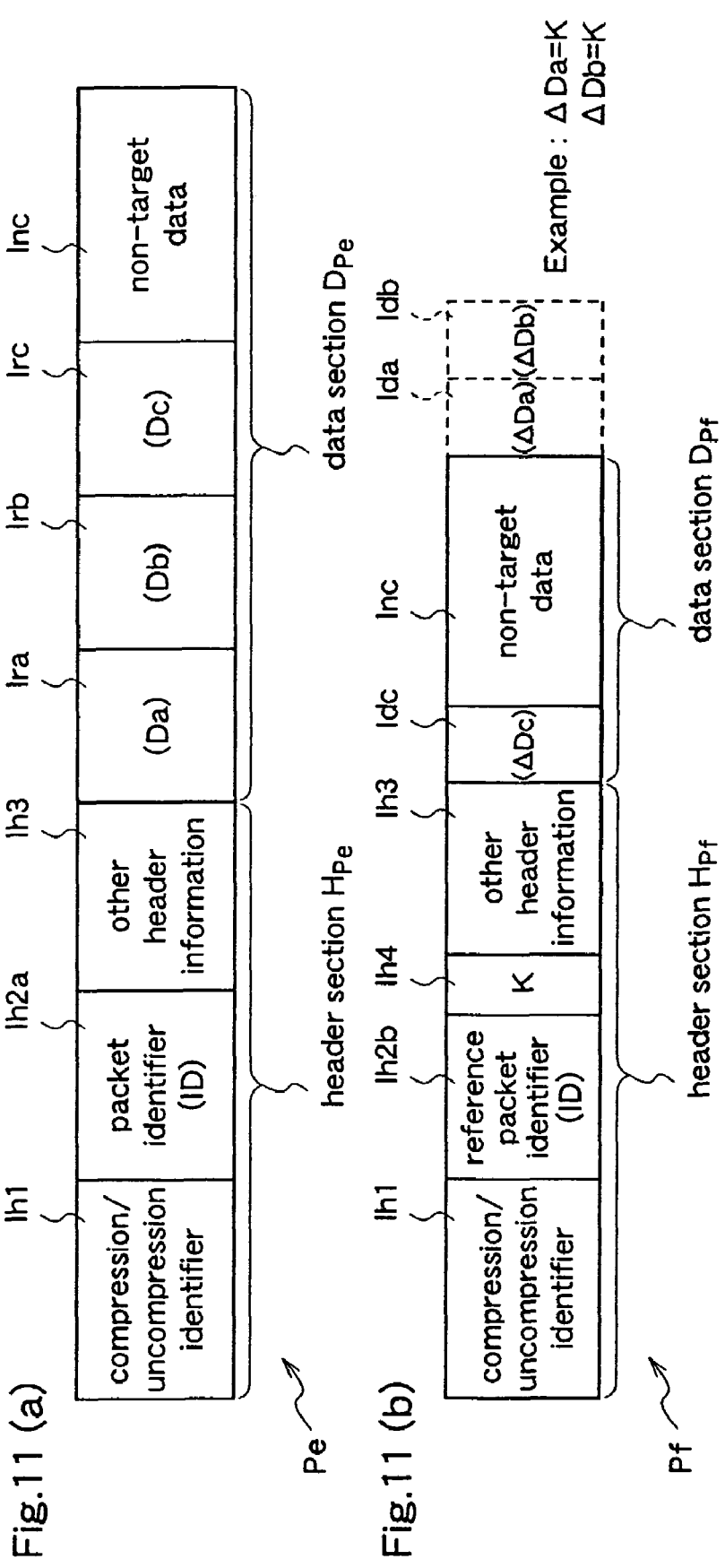
FIGS. 11(a) and 11(b) are diagrams for explaining a data transmission method according to a third modification of the first embodiment, illustrating the data structures of an uncompressed packet (11(a)) and a compressed packet (11(b)) which are used in the data transmission method.

FIG. 9 shows the flow of plural packets from the transmitting end to the receiving end in the normal transmission state.

In this first modification of the first embodiment, the transmission data (D1) and (D2) are not compressed and sequentially transmitted by uncompressed packets Paa(1) and Paa(2), and the transmission data (D3) and (D4) are compressed and sequentially transmitted by compressed packets Pb(3) and Pb(4) which follow the uncompressed packet Paa(2).

At the transmitting end, initially, the uncompressed packet Paa(1) is generated to be transmitted to the receiving end. At this time, the transmission data (D1) is stored as the uncompressed data Ir in the data section Dpaa of the uncompressed packet Paa(1). Further, the identifier Ih1 indicating "uncompressed", the packet identifier (ID=0) Ih2a for identifying this packet, and other header information Ih3 are stored in the header section Hpaa of the uncompressed packet Paa(1).

Next, the uncompressed packet Paa(2) is generated to be transmitted to the receiving end. At this time, the transmission data (D2) is stored as the uncompressed data Ir in the data section Dpaa of the uncompressed packet Paa(2). Further, the identifier Ih1 indicating "uncompressed", the packet identifier (ID=0) Ih2a for identifying this packet, and other header information Ih3 are stored in the header section Hpaa of the uncompressed packet Paa(2).

Thereafter, the compressed packet Pbb(3) is generated to be transmitted to the receiving end. At this time, the first and second compressed data Id1 and Id2 corresponding to the transmission data (D3) are stored in the data section Dpbb of the compressed packet Pbb(3). Further, the identifier Ih1 indicating "compressed", the first reference packet identifier (ID=0) Ih2b1, the second reference packet identifier (ID=1) Ih2b2, and other header information Ih3 are stored in the header section Hpbb of the uncompressed packet Pbb(3).

The first compressed data Id1 is difference data (D1-D3) which is obtained by subtracting the transmission data (D3) of the compressed packet Pbb(3) from the transmission data (D1) of the uncompressed packet Paa(1) by using this packet Paa(1) as a reference packet. Further, the second compressed data Id2 is difference data (D2-D3) which is obtained by subtracting the transmission data (D3) of the compressed packet Pbb(3) from the transmission data (D2) of the uncompressed packet Paa(2) by using this packet Paa(2) as a reference packet.

Further, the compressed packet Pbb(4) is generated to be transmitted to the receiving end. At this time, the first and second compressed data Id1 and Id2 corresponding to the transmission data (D4) are stored in the data section Dpbb of the compressed packet Pbb(4). Further, the identifier Ih1 indicating "compressed", the first reference packet identifier (ID=0) Ih2b1, the second reference packet identifier (ID=1) Ih2b2, and other header information Ih3 are stored in the header section Hpbb of the uncompressed packet Pbb(4).

The first compressed data Id1 is difference data (D1-D4) which is obtained by subtracting the transmission data (D4) of the compressed packet Pbb(4) from the transmission data (D1) of the uncompressed packet Paa(1) by using this packet Paa(1) as a reference packet. Further, the second compressed data Id2 is difference data (D2-D4) which is obtained by subtracting the transmission data (D4) of the compressed packet Pbb(4) from the transmission data (D2) of the uncompressed packet Paa(2) by using this packet Paa(2) as a reference packet.

The first packet identifier (ID=0) Ih2b1 stored in the header section Hpbb of each of the compressed packets Pbb(3) and Pbb(4) indicates that the reference packet is the uncompressed packet Paa(1). Likewise, the second packet identifier (ID=1) Ih2b2 stored in the header section Hpbb of each of the compressed packets Pbb(3) and Pbb(4) indicates that the reference packet is the uncompressed packet Paa(2).

The uncompressed packets Paa(1) and Paa(2) and the following compressed packets Pbb(3) and Pbb(4), which have been sequentially transmitted from the transmitting end, are sequentially received at the receiving end in the normal data transmission state, and the transmission data (D1)~(D4) corresponding to the respective packets are restored.

That is, at the receiving end, when the uncompressed packets Paa(1) and paa(2) are received, the transmission data (D1) and (D2) are taken from the data sections Dpaa. When the compressed packet Pbb(3) is received at the receiving end, the second difference data (D2-D3) is taken from the data section Dpbb, and the transmission data (D3) of the compressed packet Pbb(3) is restored from the difference data (D2-D3) with reference to the transmission data (D2) of the second uncompressed packet Paa(2) which is specified by the second reference packet identifier (ID=1) Ih2b2.

Thereafter, when the compressed packet Pbb(4) is received at the receiving end, in like manner as described for the compressed packet Pbb(3), the difference data (D2-D4) is taken from its data section Dpbb, and the transmission data (D4) of the compressed packet Pbb(4) is restored from the difference data (D2-D4) with reference to the transmission data (D2) of the uncompressed packet Paa(2) which is specified by the second reference packet identifier (ID=1) Ih2b2.

Since the uncompressed packets Paa(1) and Paa(2) which are reference packets for the compressed packets Pbb(3) and Pbb(4) are normally received, the uncompressed packet Paa (2) which is nearer to these compressed packets is used as a reference packet. However, when a transmission error occurs in the uncompressed packet Paa(2), the previous uncompressed packet Paa(1) is used as a reference packet to perform restoration of the compressed packets.

As described above, in this first modification of the first embodiment, two uncompressed packets Paa are continuously transmitted and, thereafter, a compressed packet Pbb is transmitted, which contains difference data (Δ1D) and (Δ2D) based on the transmission data of these uncompressed packets, and first and second reference packet identifiers (ID1, ID2) Ih2b1 and Ih2b2 which indicate that the uncompressed packets Paa are reference packets. Therefore, the compressed packet can be restored so long as at least one of the identifiers (ID1) and (ID2) in the compressed packet and the reference data corresponding to this identifier are stored in the reference information management unit 25. In other words, the number of compressed packets to be discarded due to a transmission error of an uncompressed packet is reduced.

In the first embodiment, the compression/uncompression decision unit 13 in the data transmission apparatus 101 controls the packet formation unit 12 so that an uncompressed packet is formed immediately after communication has started or a restoration error signal Ne from the error notification reception unit 14 has been received and, thereafter, compressed packets are continuously formed until a next restoration error signal Ne is received. However, the construction of the decision unit 13 is not restricted thereto, and it may control the packet formation unit 12 so that an uncompressed packet is transmitted periodically.

In this case, in the state where there is no restoration error notification from the receiving end, the decision unit 13 instructs the packet formation unit 12 to from one uncompressed packet every time a predetermined number of compressed packet have been transmitted. For example, when the number of compressed packets, which is predetermined as the uncompressed packet transmission cycle, is three, transmission of one uncompressed packet and transmission of following three compressed packets are repeated.

Hereinafter, the effect obtained by the above-described construction will be described briefly.

Video data, audio data, and header information of a TCP/IP or UDP/IP packet required to transmit these data, are stored as transmission data in the data sections Dpa and Dpb of the PPP packets to be transmitted by the PPP (i.e., the packets shown in FIGS. 1(a) and 1(b)).

Although a difference (difference data) in the video data, the audio data, or the header information between two adjacent packets is very small or 0 in many cases, a difference between distant packets tends to be large. Therefore, by periodically transmitting an uncompressed packet, the quality of data transmitted by radio is improved, and the average of the above-described difference data is reduced, that is, the compression efficiency of data in the data section is improved.

Further, the compression/uncompression decision unit 13 in the data transmission apparatus 101 of the first embodiment may be constructed as follows. That is, the decision unit 13 obtains the average size m of difference data stored in the data section of each compressed packet, and controls the packet formation unit 12 so as to transmit an uncompressed packet when this size m exceeds a predetermined value x.

The average size m is obtained by averaging the difference data of plural compressed packets which have been transmitted from when the latest uncompressed packet was transmitted to the present point of time. More specifically, when four compressed packets have been transmitted from when the latest uncompressed packet was transmitted to the present point of time and the sizes of difference data of these four compressed packets are "2", "4", "4", and "6", respectively, the average size m of difference data at the present point of time is 4 ($=(2+4+4+6)/4$).

Also in this case, the quality of data transmitted by radio is improved, and the average of difference data is reduced, that is, the compression efficiency of data in the data section is improved.

Measurement of the average size m of the difference data may be performed in the data receiving apparatus 201.

To be specific, at the receiving end, the packet restoration unit 23 measures the average size m of difference data, and outputs a size excess signal to the error notification transmission unit 24 when the average size m exceeds a predetermined value x. Further, the error notification transmission unit 24 outputs a restoration error signal Ne to the transmitting end on receipt of the error signal Se and, moreover, it outputs a request signal for transmission of an uncompressed packet, to the transmitting end, on receipt of the size excess signal.

At the transmitting end, the error notification reception unit 14 in the data transmission apparatus 101 outputs an error notification reception signal Sn to the compression/uncompression decision unit 13 not only when receiving the restoration error signal Ne but also when receiving the packet request signal.

Further, transmission of the uncompressed packet may be performed not when the average size m of difference data exceeds the predetermined value x but when a compressed packet in which the size of difference data exceeds a predetermined value x is transmitted or received.

For example, in the data transmission apparatus 101, when the size of compressed data included in a compressed packet to be transmitted exceeds a predetermined value, an uncompressed packet is transmitted subsequently to this compressed packet.

Further, in the data reception apparatus 201, when the size of compressed data included in a compressed packet to be restored exceeds a predetermined value, a request for transmission of an uncompressed packet is output to the transmitting end. In the data transmission apparatus 101, on receipt of this request from the receiving end, an uncompressed packet is transmitted to the receiving end.

Modification 2 of Embodiment 1

In the first embodiment, as shown in FIGS. 1(a) and 1(b), the data section Dpb of the compressed packet Pb contains difference data (ΔD) between the whole transmission data of this compressed packet Pb and the whole transmission data of the uncompressed packet Pa. However, the data section Dpb of the compressed packet Pb may contain data obtained by compressing only a part of the transmission data of the compressed packet.

That is, the transmission data is separated into data to be compressed (hereinafter referred to as "compression target data" or "target data") and data not to be compressed (hereinafter referred to as "non-target data"), and difference data between the compression target data of the uncompressed packet and the compression target data of the compressed packet is stored in the data section of the compressed packet and, further, the non-target data of the compressed packet is also stored in the data section.

FIG. 10(a) shows the data structure of an uncompressed packet Pc which is used when transmission data is composed of compression target data and non-target data.

The uncompressed packet Pc is composed of a header section Hpc containing header information, and a data section Dpc containing uncompressed data Ir to be transmitted by PPP. The information in the header section Hpc is composed of a compression/uncompression identifier Ih1 indicating whether the data in the data section is compressed, a packet identifier (ID) Ih2a for identifying this uncompressed packet, and other header information Ih3. In the data section Dpc, compression target data which is not compressed (hereinafter referred to as uncompressed target data), and non-target data Inc are stored. The uncompressed target data is composed of three pieces of item-basis uncompressed data Ira, Irb, Irc corresponding to first, second, and third items to be compressed (hereinafter referred to as target items). More specifically, the three pieces of item-basis uncompressed data Ira, Irb, and Irc are transmission data (Da), (Db), and (Dc) corresponding to the first, second, and third target items in the uncompressed packet.

FIG. 10(b) shows the data structure of a compressed packet Pd which is used when transmission data is composed of compression target data and non-target data.

The compressed packet Pd is composed of a header section Hpd containing header information, and a data section Dpd containing partially compressed data to be transmitted by PPP. The information in the header section Hpd is composed of a compression/uncompression identifier Ih1 indicating whether the data in the data section is compressed, a reference packet identifier (ID) Ih2b for identifying a reference packet, and other header information Ih3.

In the data section Dpd, compression target data which is compressed (hereinafter referred to as compressed target data) and non-target data Inc are stored. The compressed target data is composed of three pieces of item-basis compressed data Ida, Idb, and Idc corresponding to first, second, and third items to be compressed (hereinafter referred to as "target items"). To be specific, the compressed data Ida is difference data ($\Delta$Da) between the data (Da) corresponding to the first target item in the transmission data of the uncompressed packet and the data (Da) corresponding to the first target item in the transmission data of the compressed packet. The compressed data Idb is difference data ($\Delta$Db) between the data (Db) corresponding to the second target item in the transmission data of the uncompressed packet and the data (Db) corresponding to the second target item in the transmission data of the compressed packet. The compressed data Idc is difference data ($\Delta$Dc) between the data (Dc) corresponding to the third target item in the transmission data of the uncompressed packet and the data (Dc) corresponding to the third target item in the transmission data of the compressed packet.

In this case, in the data transmission apparatus 101, the reference information management unit 15 tables the reference packet identifier (ID), the respective compression target items, and the data corresponding to the respective target items in the reference data (item-basis reference data), and stores this table.

Further, also in the data reception apparatus 201, the reference information management unit 25 tables the reference packet identifier (ID), the respective compression target items, and the item-basis reference data, and stores the table.

In the above-described construction, since the transmission data is compressed for each compression target item, the storage capacity of a memory, such as a RAM, mounted on the management unit 15 or 25 can be reduced while maintaining the effect of reducing a predetermined quantity of data by data compression.

Modification 3 of Embodiment 1

In the above-described first embodiment and the first and second modifications thereof, the data section of each compressed packet contains, as data obtained by compressing the whole or a part of transmission data of the compressed packet, difference data between the whole or a part of the transmission data of the uncompressed packet and the whole or a part of the transmission data of the compressed packet. However, instead of the difference data or in addition to the difference data, difference-specifying additional information (K) for calculating the difference data may be stored in the header section or the data section of the compressed packet.

For example, in the compressed packet Pb shown in FIG. 1(b), in stead of the difference data, difference-specifying additional information (K) for calculating this difference data may be stored.

In the compressed packet Pd shown in FIG. 10(b), instead of the difference data corresponding to at least one item-basis compressed data amongst the plural pieces of item-basis compressed data, difference-specifying additional information (K) for calculating this difference data may be stored.

FIGS. 11(a) and 11(b) are diagrams for explaining the data structure of a packet which is used in the case where difference-specifying additional information (K) is stored in a compressed packet.

FIGS. 11(a) and 11(b) illustrate an uncompressed packet Pe and a compressed packet Pf to be used in this case, respectively.

The uncompressed packet Pe is composed of a header section Hpe containing header information, and a data section Dpe containing transmission data to be transmitted by PPP. The packet Pe has the same structure as the uncompressed packet Pc shown in FIG. 10(a).

The compressed packet Pf is composed of a header section Hpf containing header information, and a data section Dpf containing partially compressed data to be transmitted by PPP. The header section Hpf contains difference-specifying additional information (K) Ih4 in addition to a compression/uncompression identifier Ih1, a reference packet identifier (ID) Ih2b, and other header information Ih3 which are identical to those mentioned for the compressed packet Pd shown in FIG. 10(b). Further, the data section Dpf contains three pieces of item-basis compressed data Ida, Idb, and Idc corresponding to first, second, and third items, and non-target data Inc, which are identical to those mentioned for the compressed packet Pd shown in FIG. 10(b).

The difference-specifying additional information (K) is a sequence number indicating the position of the compressed packet, counted from the uncompressed packet which is referred to for restoration of the compressed packet. Further, difference data ($\Delta$Da) and ($\Delta$Db) as the item-basis compressed data Ida and Idb are equal to the difference-specifying additional information (K) and, therefore, the data size of the difference data ($\Delta$Da) and ($\Delta$Db) is 0 byte.

Hereinafter, a description will be given of the case where the difference-specifying additional information (K) is stored in the compressed packet, taking data transmission using RTP (Real Time Protocol) as an example.

To be specific, a description will be given of the case where video data or audio data is converted to RTP type data according to RTP defined in RFC1889/1890, and the RTP type data is converted to UDP/IP type data according to UDP and IP, and then the RTP/UDP/IP type data is transmitted from the data transmission terminal 101 to the data reception terminal 201. The RTP/UDP/IP type data corresponds to the IP packet Pipb shown in FIG. 29(d).

Usually, the sequence number Isn included in the header Hrtp of the RTP packet Prtp (refer to FIG. 29(a)) increments by 1 every time one RTP packet is formed. Further, the packet ID (IPv4 (Internet Protocol version 4) ID, not shown) included in the header Hipb of the IP packet Pipb also increments by 1 every time one IP packet is formed. When these values are stored as difference data in a compressed packet, these values can be set at 0 if the position of the compressed packet, counted from an uncompressed packet as a reference packet for the compressed packet, can be detected.

In other words, when the sequence number Isn in the header section Hrtp of the RTP packet Prtp is stored as simple difference data in the compressed packet, at least 1 byte is always needed as the data quantity of the sequence number Isn. However, by using the above-described difference-specifying additional information, the size of the difference data corresponding to the sequence number Isn becomes 0 byte, whereby the compression efficiency is improved.

For example, when the size of the difference-specifying additional information (K) is 1 byte, the size of the difference data of the sequence number Isn in the header section Hrtp of the RTP packet Prtp is usually 0 byte, and the sum of the difference-specifying additional information and the difference data is usually 1 byte. In this case, even when the difference-specifying additional information (K) is used, the data quantity of the RTP packet does not change.

However, when plural pieces of compression target data which can be restored using the same calculation method as the above-described one (i.e., addition of the difference-specifying additional information and the difference data) are included in the transmission data, for example, when there are two kinds of information such as the sequence number in the header section of the RTP packet and the IPv4 ID in the header section of the IP packet, substantial effect is obtained by using the difference-specifying additional information, whereby the compression efficiency is significantly improved.

Further, an arithmetic expression having the above-described difference-specifying additional information as a variable may be used for obtaining difference data of a compressed packet to be processed, from transmission data of a reference packet (uncompressed packet) used for restoration of the compressed part.

As for the arithmetic expression, for example, there is an expression which defines four rules (addition, subtraction, multiplication, division) or functional arithmetic such as sin and cos.

Further, the arithmetic expression having the difference-specifying additional information as a variable may be dynamically changed during data transmission according to a predetermined rule even though it is previously decided at the transmitting end and the receiving end. Thereby, the compression efficiency of transmission data stored in the data section of the PPP packet is further improved, and the quality of data transmitted by radio and the effective transmission rate are further improved.

Embodiment 2

Figure 12:
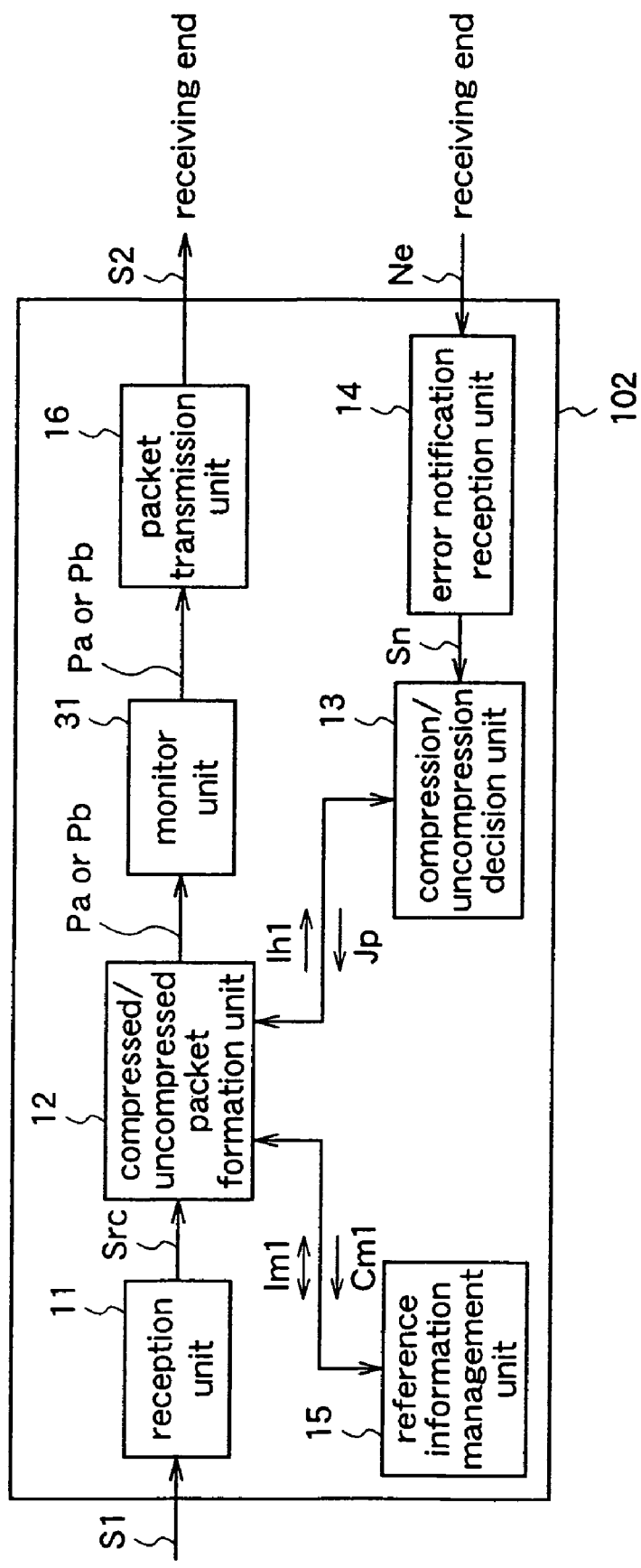
FIG. 12 is a block diagram for explaining a data transmission system using a data transmission method according to a second embodiment of the present invention, illustrating a data transmission apparatus in the data transmission system.

FIG. 12 is a block diagram for explaining a data transmission method according to a second embodiment of the present invention, illustrating a data transmission apparatus 102 in a data transmission system using this data transmission method. This second embodiment corresponds to aspects 1, 2, 10~12, 18~21, 32, 33, 36, and 37.

The data transmission apparatus 102 includes, in addition to the constituents of the data transmission apparatus 101 of the first embodiment, a monitor unit 31 which monitors the number of times that an uncompressed packet output from the compressed/uncompressed packet formation unit 12 is transmitted to the receiving end. The monitor unit 31 receives packets from the packet formation unit 12, and continuously outputs the same uncompressed packet Pa by a predetermined number of times (in the second embodiment, two times) to the packet transmission unit 16, and then outputs compressed packets Pb which follow the uncompressed packet Pa, to the packet transmission unit 16. Other constituents of the data transmission apparatus 102 are identical to those of the data transmission apparatus 101 of the first embodiment.

A data reception apparatus in the data transmission system of this second embodiment is identical to the data reception apparatus 201 in the data transmission system of the first embodiment.

Next, the function and effect will be described.

Figure 13:
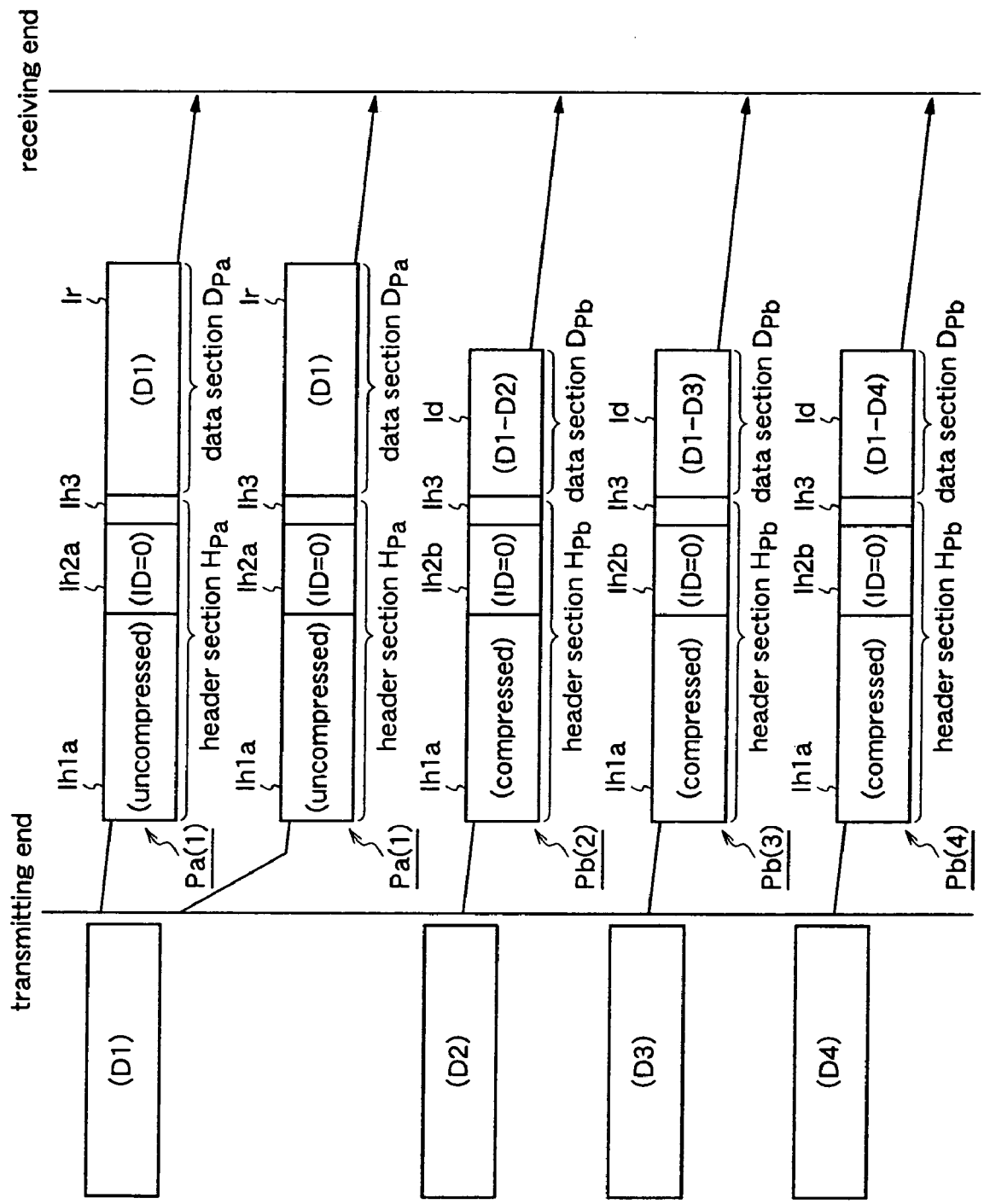
FIG. 13 is a diagram for explaining the data transmission method of the second embodiment, illustrating the flow of plural packets from the transmitting end to the receiving end in the normal transmission state.

In the data transmission apparatus 102 of this second embodiment, the number of times that the uncompressed packet Pa is transmitted is monitored by the monitor unit 31. For example, as shown in FIG. 13, when an uncompressed packet Pa(1) is output from the packet formation unit 12 to the monitor unit 31, the monitor unit 31 outputs the same uncompressed packet Pa(1) twice to the packet transmission unit 16. Thereafter, compressed packets Pb(2), Pb(3), and Pb(4) which follow the uncompressed packet Pb(1) are sequentially output to the packet transmission unit 16. In the packet transmission unit 16, those packets supplied from the monitor unit 31 are sequentially output by a predetermined radio transmission method such as W-CDMA.

The other constituents of the data transmission apparatus 102 operate in the same manner as described for the first embodiment.

On the other hand, in the data reception apparatus, when the continuously-transmitted two uncompressed packets Pa(1) are normally received, the reference information management unit 25 updates the identifier (ID) and the reference data (D). Therefore, when the following compressed packets Pb(2), Pb(3), and Pb(4) are received, the identifier (ID=0) and the reference data (D1) stored in the management unit 25 are referred to.

Even when one of the two uncompressed packets Pa(1) has not arrived at the receiving end due to a transmission error, the normally transmitted packet Pa(1) is input to the packet restoration unit 23 through the error packet detection unit 22. Therefore, in the reference information management unit 25, the identifier (ID) and the reference data (D) which are the receiving-end reference information Im2 are updated to those corresponding to the uncompressed packet Pa(1).

As described above, according to the second embodiment of the invention, the uncompressed packet Pa is continuously transmitted twice and, thereafter, the following compressed packets Pb are transmitted. So, even when a transmission error occurs in one of the two uncompressed packets Pa, the difference data of the following compressed packets are normally restored at the receiving end. Therefore, the number of received packets to be discarded due to a restoration error at the receiving end is reduced, whereby the quality of data transmitted by radio is improved.

While in this second embodiment the uncompressed packet is transmitted twice, it may be transmitted three time or more.

Further, in this second embodiment, the monitor unit 31 manages transmission of the uncompressed packet so that the uncompressed packet itself is transmitted by plural times. However, the monitor unit 31 may control, after transmission of the uncompressed packet, transmission of an auxiliary packet so that it is transmitted by a predetermined number of times (at least one time), which auxiliary packet is different from the uncompressed packet and contains the packet identifier (ID) and the transmission data (D) of the uncompressed packet.

In this case, the packet formation unit 12 forms, after formation of the uncompressed packet, an auxiliary packet which contains the packet identifier (ID) and transmission data (D) of the uncompressed packet. Thereafter, a plurality of compressed packets based on the uncompressed packet (i.e., compressed packets containing different data obtained by using the transmission data of the uncompressed packet) are formed. The uncompressed packet, the auxiliary packet, and the compressed packets are supplied to the monitor unit 31 in this order. In the monitor unit 31, initially the uncompressed packet is transmitted and then the auxiliary packet is transmitted by a predetermined number of times. Thereafter, the compressed packets are sequentially transmitted.

In this construction, by using one uncompressed packet and a predetermined number (at least one) of auxiliary packets, the reference packet identifier and the reference data are transmitted at least two times before the compressed packets based on the uncompressed packet are transmitted. Therefore, even when a transmission error occurs in any of these uncompressed packet and auxiliary packets, the difference data of the subsequent compressed packets are normally restored at the receiving end.

Thereby, the number of received packets to be discarded due to a restoration error at the receiving end is reduced, and the quality of data transmitted by radio is improved.

While in this second embodiment the uncompressed packet or the auxiliary packet is transmitted by a predetermined number of times, the number of times may be changed according to the frequency of restoration error notification which is sent from the receiving end to the transmitting end.

For example, when the number of times that the uncompressed packet is transmitted is changed, in the compression/uncompression decision unit 13, the number of times per unit time that the error notification reception signal Sn from the error notification reception unit 14 is input, is counted, and this count is compared with a predetermined reference value Y. According to the result of the comparison, a control signal for controlling the number of transmission times is output to the monitor unit 31. In the monitor unit 31, on the basis of this control signal, the number of times that the uncompressed packet or the auxiliary packet is transmitted is increased or decreased. To be specific, when the count exceeds the reference value Y, the number of transmission times is increased, and when the count becomes equal to or lower than the reference value Y, it is decreased.

In this construction, when the quality of the transmission data is relatively stable, the transmission efficiency can be improved by decreasing the number of times that the uncompressed packet or the auxiliary packet is transmitted. When the quality of the transmission data is unstable, the number of packets to be discarded at the receiving end due to a restoration error can be reduced by increasing the number of transmission times.

Embodiment 3

Figure 14:
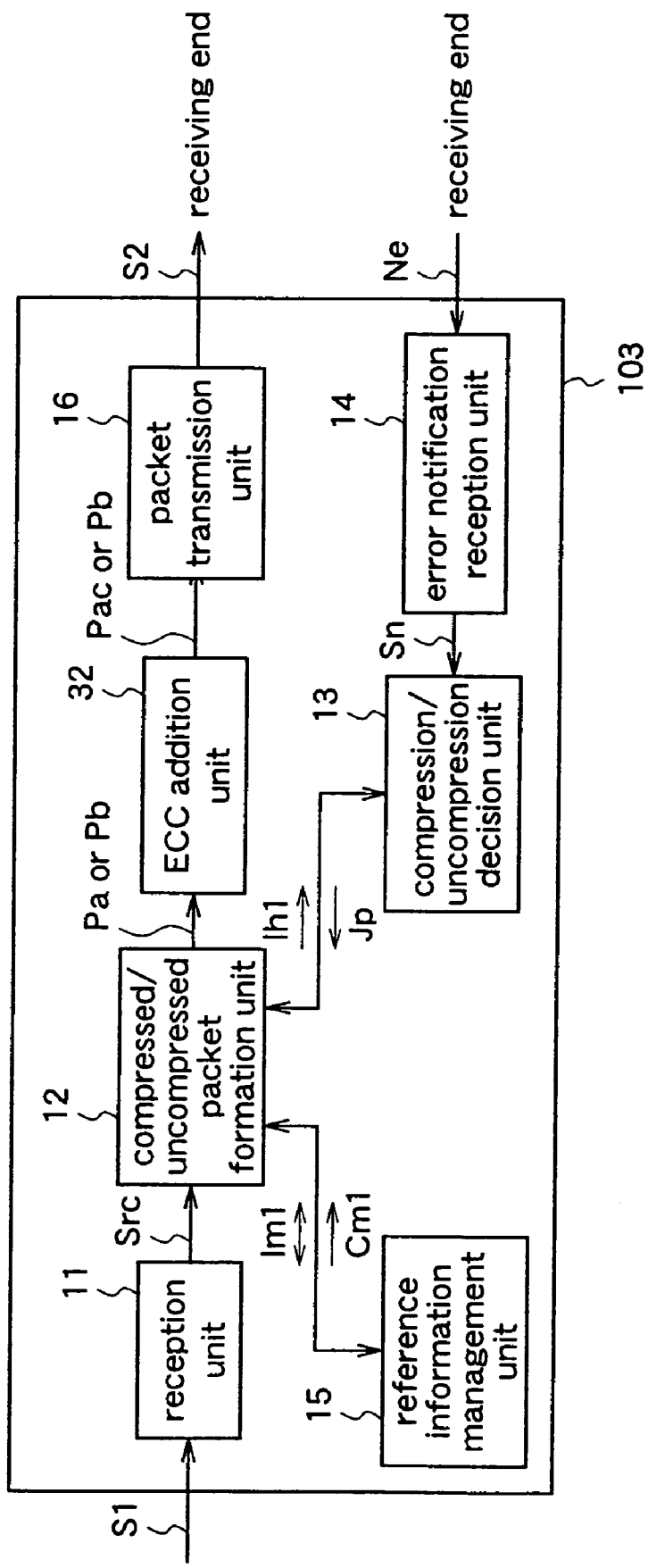
FIG. 14 is a block diagram for explaining a data transmission system using a data transmission method according to a third embodiment of the present invention, illustrating a data transmission apparatus in the data transmission system.
Figure 15:
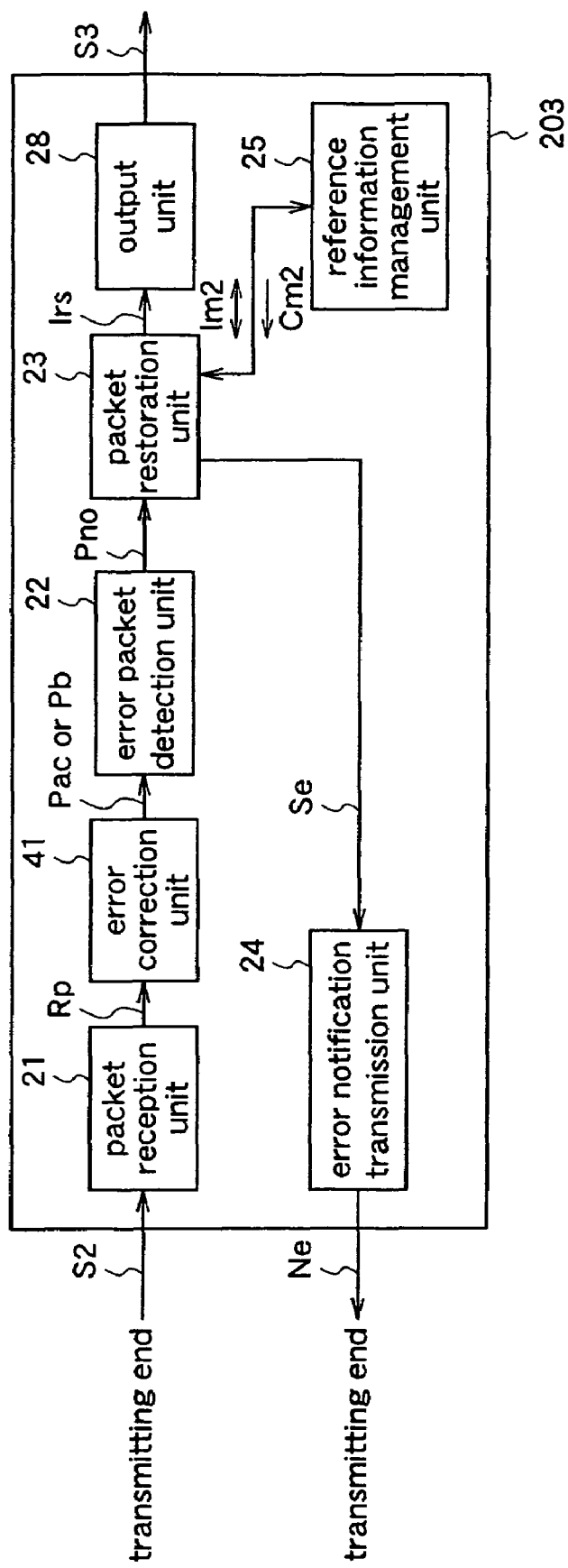
FIG. 15 is a block diagram for explaining the data transmission system using the data transmission method of the third embodiment, illustrating a data reception apparatus in the data transmission system.

FIGS. 14 and 15 are diagrams for explaining a data transmission method according to a third embodiment of the present invention. This third embodiment corresponds to aspects 1, 2, 13~15, 18~21, 32, 33, 36, and 37.

FIG. 14 is a block diagram illustrating a data transmission apparatus 103 in a data transmission system which performs data transmission by the data transmission method.

The data transmission apparatus 103 includes, in addition to the constituents of the data transmission apparatus 101 of the first embodiment, an ECC (Error Correction Code) addition unit 32 which receives an uncompressed packet Pa and a compressed packet Pb output from the compressed/uncompressed packet formation unit 12, and gives an ECC to the uncompressed packet Pa. The ECC-added uncompressed packet Pac which is obtained in the unit 32 and the compressed packet Pb which has passed the unit 32 are input to the packet transmission unit 16. Other constituents of the data transmission apparatus 103 are identical to those of the data transmission apparatus 101 of the first embodiment.

FIG. 15 is a block diagram illustrating a data reception apparatus 203 in the data transmission system which performs data transmission by the data transmission method of this third embodiment.

The data reception apparatus 203 of this third embodiment includes, in addition to the constituents of the data reception apparatus 201 of the first embodiment, an error correction unit 41 which receives the packets Rp output from the packet reception unit 21, and performs error correction on the ECC-added uncompressed packet Pac. The error correction unit 41 outputs the compressed packet to which no ECC is added, as it is. The packets output from the error correction unit 41 are input to the error packet detection unit 22. Other constituents of the data reception apparatus 203 are identical to those of the data reception apparatus 201 of the first embodiment.

Next, the function and effect will be described.

In the data transmission apparatus 103 constructed as described above, when the uncompressed packet Pa formed in the packet formation unit 12 (i.e., the packet containing reference data to be used for restoration of the compressed packets) is input to the ECC addition unit 32, the ECC addition unit 32 adds an ECC to the uncompressed packet Pa, and outputs the ECC-added uncompressed packet Pac to the packet transmission unit 16. When the compressed packet Pb formed in the packet formation unit 12 is input to the ECC addition unit 32, the unit 32 does not process this compressed packet Pb, and outputs it to the packet transmission unit 16. Other constituents of the data transmission apparatus 103 operate in the same manner as described for the data transmission apparatus 101 of the first embodiment.

On the other hand, in the data reception unit 203, when the received packets Rp output from the packet reception unit 21 are input to the error correction unit 41, the ECC-added uncompressed packet Pac is subjected to error correction and output to the error packet detection unit 22, while the compressed packet Pb to which no ECC is added is output as it is to the error packet detection unit 22. Other constituents of the data reception unit 203 operate in the same manner as described for the data reception unit 201 of the first embodiment.

As described above, according to the third embodiment, an ECC is added to the uncompressed packet Pa at the transmitting end, and the ECC-added uncompressed packet Pac is transmitted to the receiving end. At the receiving end, the ECC-added uncompressed packet Pac is subjected to error correction using the ECC. Therefore, even when transmission errors occur, most uncompressed packets are recovered at the receiving end, thereby suppressing occurrence of defective uncompressed packets due to transmission errors.

Therefore, the number of received packets to be discarded due to a restoration error in the compressed packet that follows the uncompressed packet is reduced, and the quality of data transmitted by radio is improved.

While in this third embodiment an ECC is added to the uncompressed packet itself, an ECC may be added to a part of the uncompressed packet, i.e., a part including reference information (identifier (ID) and reference data (D)) which is required for restoration of the following compressed packets.

In this case, at least the identifier (ID) and the reference data (D) which are required for restoration of the compressed packets, are subjected to error correction at the receiving end.

Thereby, the number of received packets to be discarded due to a restoration error in the compressed packet which follows the uncompressed packet is reduced, and the quality of data transmitted by radio is improved.

Further, while in this third embodiment an ECC is added to every uncompressed packet, it may be decided whether an ECC is to be added to the uncompressed packet, according to the frequency of restoration error notification which is performed from the receiving end to the transmitting end.

In this case, in the compression/uncompression decision unit 13, the number of times per unit time that the error notification reception signal Sn from the error notification reception unit 14 is input, is counted, and the count is compared with a predetermined reference value Y. According to the result of the comparison, an error correction control signal is output to the formation unit 12. According to the error correction control signal, the formation unit 12 notifies the ECC addition unit 32 as to whether an ECC is to be added to the uncompressed packet. To be specific, when the count exceeds the reference value Y, the ECC addition unit 32 adds an ECC to the uncompressed packet and outputs it. When the count is equal to or lower than the reference value Y, the ECC addition unit 32 adds no ECC to the uncompressed packet, and outputs the packet as it is.

In this construction, when the quality of transmission data is relatively stable, the effective transmission rate is increased by transmitting the uncompressed packet as it is. On the other hand, when the quality of transmission data is unstable, the number of packets to be discarded at the receiving end due to a restoration error is reduced by adding an ECC to the uncompressed packet.

Embodiment 4

Figure 16:
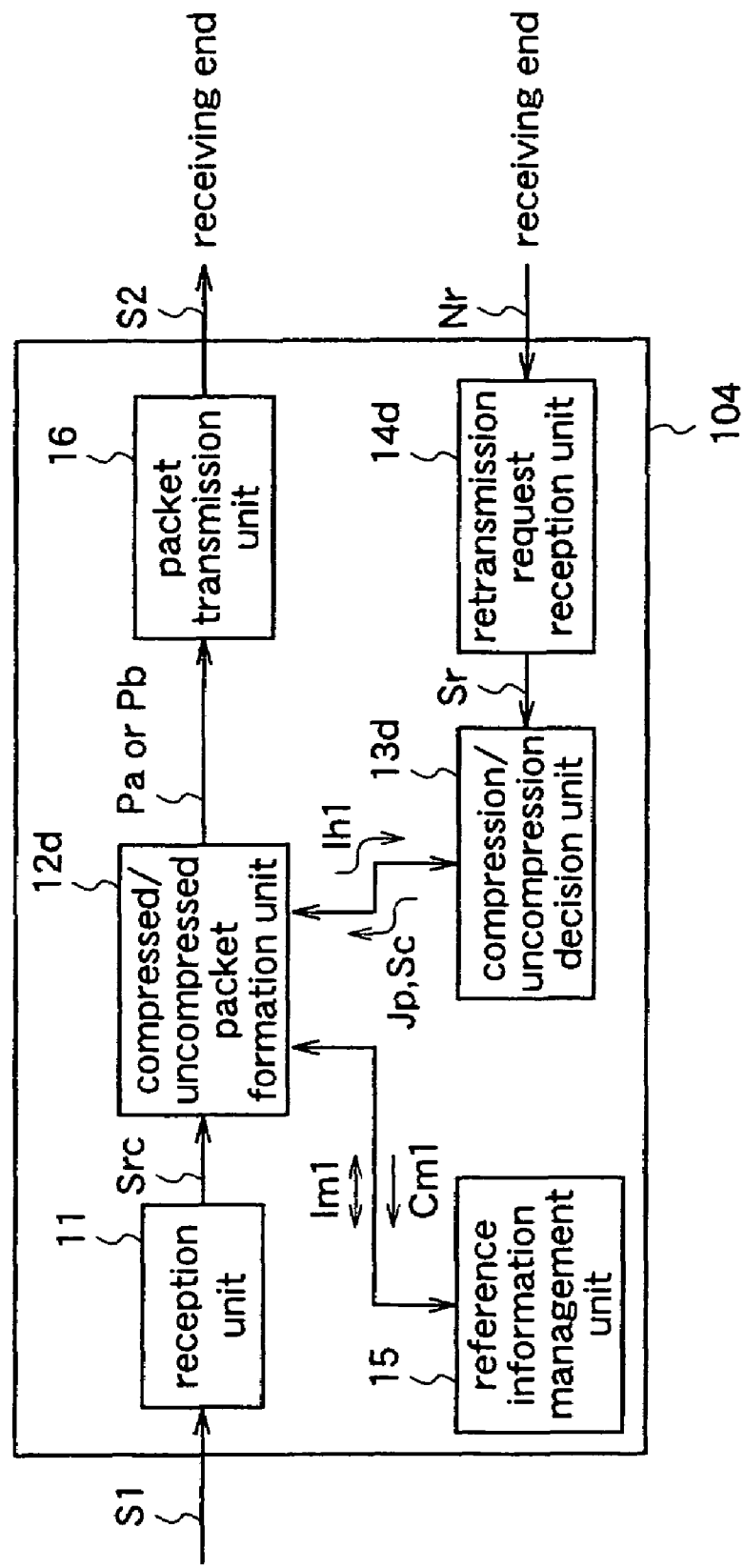
FIG. 16 is a block diagram for explaining a data transmission system using a data transmission method according to a fourth embodiment of the present invention, illustrating a data transmission apparatus in the data transmission system.
Figure 17:
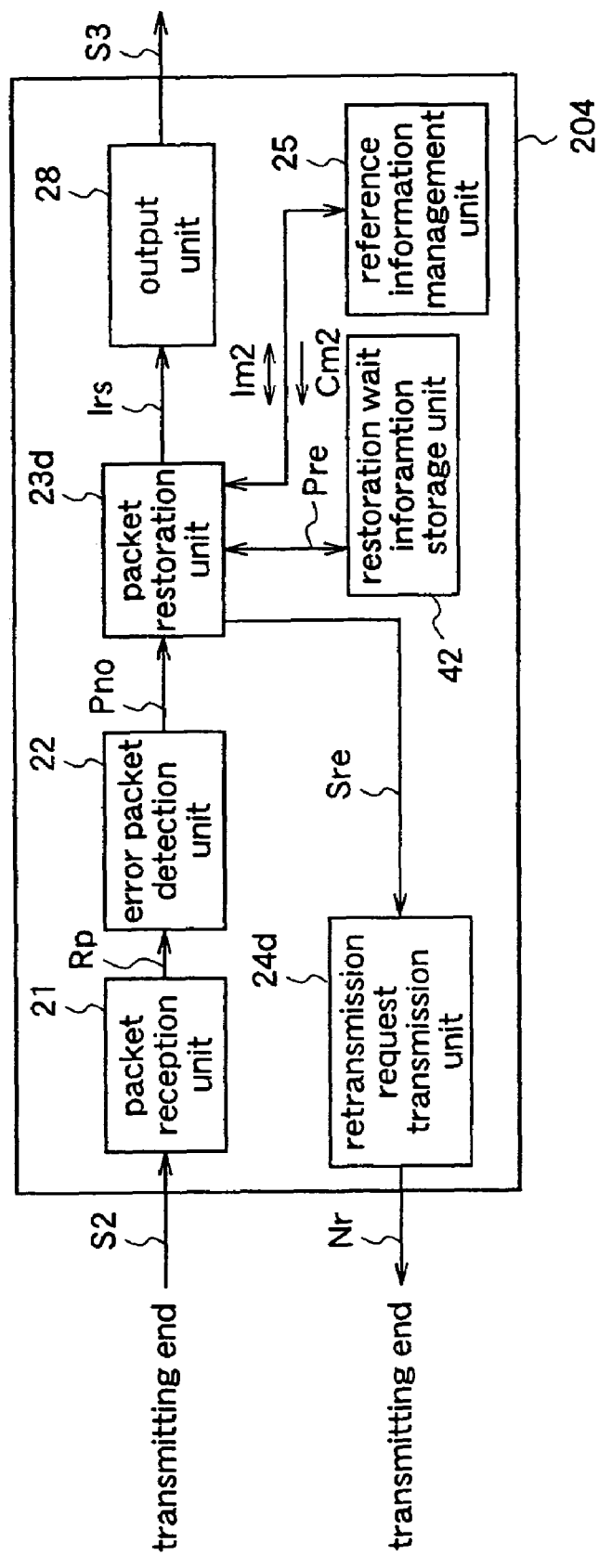
FIG. 17 is a block diagram for explaining the data transmission system using the data transmission method of the fourth embodiment, illustrating a data reception apparatus in the data transmission system.
Figure 18:
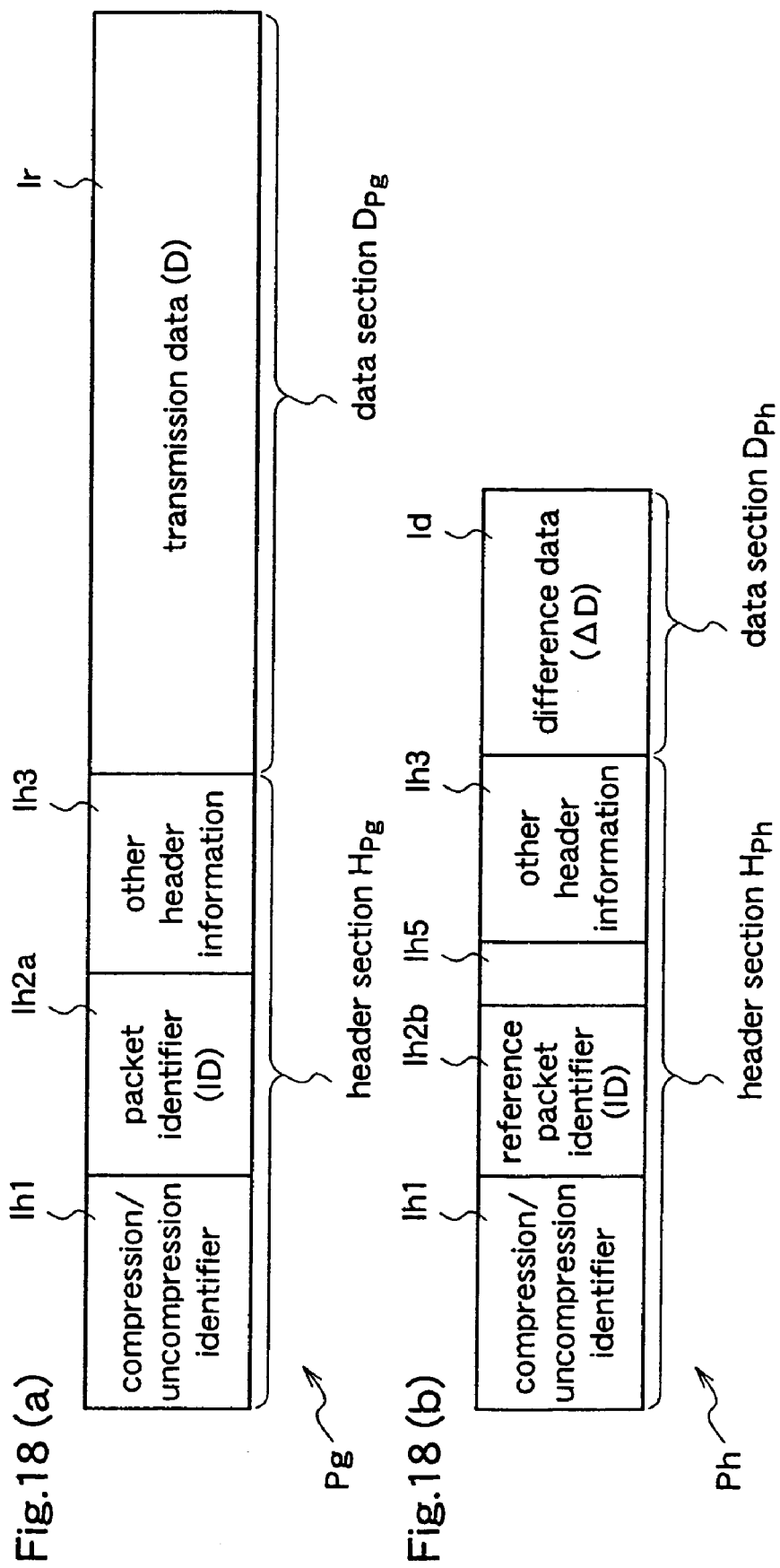
FIGS. 18(a) and 18(b) are diagrams for explaining a data transmission method according to a fifth embodiment of the present invention, illustrating the data structures of an uncompressed packet (18(a)) and a compressed packet (18(b)) which are used in the data transmission method.

FIGS. 16 and 17 are block diagrams for explaining a data transmission method according to a fourth embodiment of the present invention. FIG. 16 illustrates a data transmission apparatus 104 in a data transmission system which employs the data transmission method. This fourth embodiment corresponds to aspects 1, 2, 16~21, 32, 33, 36 and 37.

The data transmission apparatus 104 includes, instead of the error notification reception unit 14 according to the first embodiment, a retransmission request notification reception unit 14d which receives a request signal for retransmission of an uncompressed packet (retransmission request signal Nr) from the receiving end, and outputs a retransmission request reception signal Sr. Further, the constructions of the packet formation unit 12 and the compression/uncompression decision unit 13 are altered so that uncompressed packets are formed according to the retransmission request reception signal Sr.

To be specific, in this data transmission apparatus 104, the compression/uncompression decision unit 13d outputs a packet decision signal Jp indicating the type of a packet to be formed next by the packet formation unit 12d, to the packet formation unit 12d. When the decision unit 13d receives the retransmission request reception signal Sr, it outputs, instead of the packet decision signal Jp, a re-form instruction signal Sc which instructs the formation unit 12d to re-form the uncompressed packet for which retransmission is requested.

Further, the packet formation unit 12d forms either an uncompressed packet or a compressed packet on the basis of the packet decision signal Jp. On receipt of the re-form instruction signal Sc, the formation unit 12d re-forms the uncompressed packet which has been formed most-recently, on the basis of the identifier (ID) and the reference data (D) stored in the reference information management unit 15. The retransmission request signal Nr, the retransmission request reception signal Sr, and the re-form instruction signal Sc include the identifier (ID) which specifies the uncompressed packet to be retransmitted.

Other constituents of the data transmission apparatus 104 are identical to those of the data transmission apparatus 101 of the first embodiment.

FIG. 17 shows a data reception apparatus 204 in the data transmission system of this fourth embodiment.

The data reception apparatus 204 includes, in addition to the constituents of the data reception apparatus 201 of the first embodiment, a restoration wait data storage unit 42 which temporarily stores a compressed packet that is decided as a restoration error packet Pre, amongst the received compressed packets. Further, the error notification transmission unit 24 and the packet restoration unit 23 according to the first embodiment are altered so that the compressed packet which is decided as a restoration error packet Pre is subjected to restoration on the basis of the reference data of the retransmitted uncompressed packet.

That is, the data reception apparatus 204 includes, instead of the error notification transmission unit 24 of the first embodiment, a retransmission request transmission unit 24d which outputs, to the transmitting end, a signal for requesting retransmission of an uncompressed packet which is a reference packet required for restoration of the restoration error packet (retransmission request signal), on the basis of an error signal Sre which is output when a restoration error occurs.

Further, when the receiving-end reference information Im2 (identifier (ID) and reference data (D)) which is required for restoration of the received packet is not stored in the reference information management unit 25, the packet restoration unit 23d decides that the received compressed packet is a restoration error packet, and outputs an error signal Sre to the retransmission request transmission unit 24d. The error signal Sre includes the identifier (ID) which specifies the uncompressed packet to be retransmitted.

In this data reception apparatus 204, the compressed packet which is decided as a restoration error packet Pre is subjected to restoration on the basis of the identifier (ID) and the transmission data (D) of the retransmitted uncompressed packet.

Other constituents of the data reception apparatus 204 are identical to those of the data reception apparatus 201 according to the first embodiment.

Next, the function and effect will be described.

In the data transmission system according to the fourth embodiment, when a restoration error occurs in the compressed packet Pb, the uncompressed packet is retransmitted from the transmitting end, in response to the retransmission request signal Nr from the receiving end.

That is, at the receiving end, in the packet restoration unit 23d, when it is decided that the compressed packet is a restoration error packet because the identifier (ID) and the reference data (D), which are the receiving-end reference information Im2 required for restoration of the compressed packet Pb, are not stored in the reference information management unit 25, this compressed packet Pre is output from the restoration unit 23d and input to the restoration wait data storage unit 42, wherein the compressed packet Pre is temporarily stored. At this time, an error signal Sre including the reference packet identifier (ID) of the restoration error packet Pre is output to the retransmission request transmission unit 24d. Then, the retransmission request transmission unit 24d transmits a retransmission request signal Nr including the reference packet identifier (ID) to the transmitting end.

In the data transmission apparatus 104, when the retransmission request signal Nr including the reference packet identifier (ID) is received by the reception unit 14d, the reception unit 14d outputs a retransmission request reception signal Sr to the decision unit 13d, and the decision unit 13 outputs a signal Sc instructing formation of the uncompressed packet specified by the reference packet identifier (re-form instruction signal) to the packet formation unit 12d. In the packet formation unit 12d, the uncompressed packet required for restoration of the restoration error packet is re-formed on the basis of the identifier (ID) and the reference data (D) as the transmission-end reference information Im1 stored in the reference information management unit 15, and the uncompressed packet so formed is transmitted to the receiving end through the packet transmission unit 16.

At the receiving end, when the retransmitted uncompressed packet is received by the packet reception unit 21, it is supplied to the packet restoration unit 23d through the error packet detection unit 22. In the packet restoration unit 23d, the identifier (ID) and the transmission data (D) are taken from the retransmitted uncompressed packet, and the difference data (ΔD) of the compressed packet stored in the restoration wait data storage unit 42 is restored on the basis of the identifier (ID) and the transmission data (D).

On the other hand, the identifier (ID) and the transmission data (D) are supplied to the reference information management unit 25, whereby the identifier (ID) and the reference data (D) as the receiving-end reference information Im2 are updated.

As described above, according to the fourth embodiment, when a restoration error occurs in a compressed packet, the transmitting end retransmits an uncompressed packet which is required for restoration of the compressed packet, according to a retransmission request signal Nr from the receiving end. Therefore, even when the received compressed packet is decided as a restoration error packet because the receiving-end reference information (identifier (ID) and reference data (D)) required for restoration of the compressed packet is absent at the receiving end, the restoration error packet can be normally restored after completing retransmission of the uncompressed packet. Thereby, the number of received packets to be discarded due to the restoration error of the compressed packet is reduced, and the quality of data transmitted by radio is improved.

While in this fourth embodiment the identifier (ID) and the transmission data (D) included in the uncompressed packet are stored in the reference information management unit 15, the uncompressed packet itself may be stored in the management unit 15.

In this case, when performing retransmission of the uncompressed packet, the process of forming the uncompressed packet by the packet formation unit 12d can be dispensed with.

Further, in this fourth embodiment, the uncompressed packet itself is retransmitted according to the retransmission request from the receiving end. However, on receipt of the request, only a part of the uncompressed packet including the identifier (ID) and the transmission data (D) may be retransmitted after storing them in a predetermined packet for retransmission.

Also in this case, the received compressed packet which is decided as a restoration error packet can be restored after transmission of the packet for retransmission, whereby the number of received packets to be discarded due to the restoration error of the compressed packet is reduced, and the quality of data transmitted by radio is improved.

Further, while in the first to fourth embodiments difference data (first difference data) between transmission data of an uncompressed packet and transmission data of a compressed packet is stored as compressed data in the compressed packet, the compressed data to be stored in the compressed packet may be switched between the first difference data and another difference data (second difference data) according to the transmission status of packets.

Figure 31:
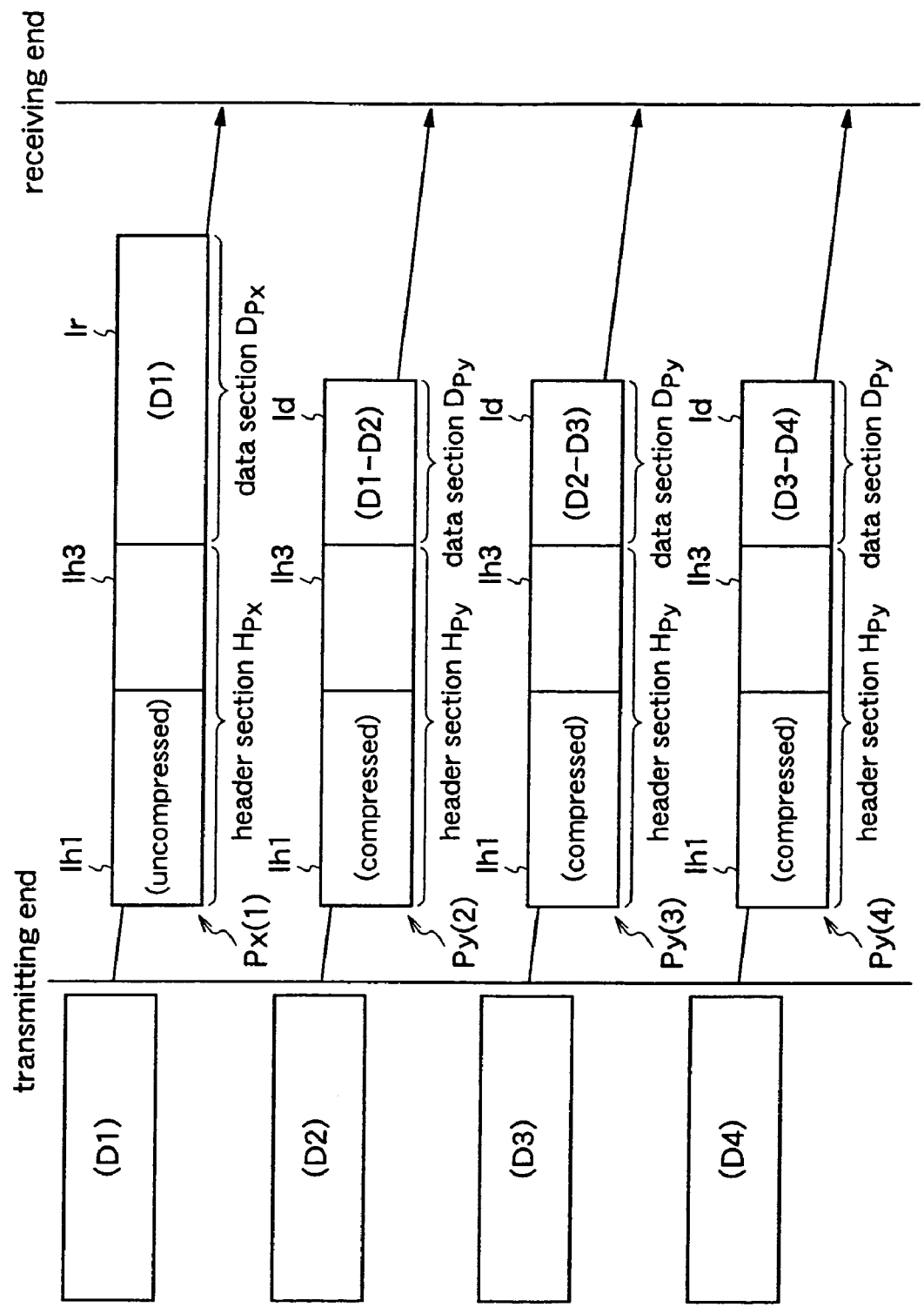
FIG. 31 is a diagram for conceptually explaining PPP packet transmission using the V. Jacobson's header compression method.

As an example of the second difference data, there is difference data defined in the literature by V. Jacobson which is described in the section of BACKGROUND OF THE INVENTION, that is, difference data between the transmission data of the compressed packet and the transmission data of the packet which has been formed immediately before the compressed packet (refer to FIG. 31).

Hereinafter, a description will be given of the case where the data transmission method in which the compressed data to be stored in the compressed packet is switched between the first difference data and the second difference data according to the transmission status of packets, is applied to the data transmission system according to the first embodiment, with reference to FIGS. 2 and 3.

In this case, the error notification reception unit 14 in the data reception unit 101 is constructed so as to calculate the frequency (z) of receiving the restoration error signal Ne in a unit time. Further, the compressed/uncompressed packet formation unit 12 is constructed so as to receive a signal indicating the reception frequency (z) calculated by the error notification reception unit 14. When the reception frequency (z) exceeds a predetermined reference value Y, the first difference data is formed as the compressed data to be stored in the compressed packet. On the other hand, when the reception frequency (z) is smaller than the reference value Y, the second difference data is formed as the compressed data.

The operation in this case will be described briefly.

Initially, when an error occurs during the process of restoring the compressed data included in the compressed packet at the receiving end, the receiving end notifies the transmitting end of this error. At the transmitting end, when the frequency of error notification from the receiving end exceeds a predetermined value, the transmitting end requests the receiving end to change the restoration process to that using the first difference data and, thereafter, the transmitting end performs the compression process using the first difference data. On the other hand, when the frequency of error notification becomes equal to or smaller than the predetermined value, the transmitting end requests the receiving end to change the restoration process to that using the second difference data and, thereafter, the transmitting end performs the compression process using the second difference data. Then, the receiving end performs restoration according to the compression process at the transmitting end.

In this case, an identifier indicating that the compressed data is the first difference data or the second difference data may be included in the compressed packet Pb.

The method of switching the compressed data Id to be stored in the compressed packet Pb between the first difference data and the second difference data, provides the following effects.

Usually, a difference in data, such as the above-mentioned transmission data (video or audio data) or the header data, between two adjacent packets is very small or 0 in many cases, but a difference in such data between distant packets tends to be large. Therefore, by switching the compressed data between the first difference data and the second difference data, the quality of data transmitted by radio is improved and, further, the average of difference data is reduced, that is, the compression efficiency of data stored in the data section is improved.

While in the above-described method the decision about that either the first difference data or the second difference data is to be used is made at the transmitting end, this decision may be made according to an instruction from the receiving end.

In this case, switching between the first difference data and the second difference data may be performed based on the number of transmission errors per unit time.

In this case, the number of transmission errors per unit time (incidence of transmission error) is obtained by the error packet detection unit 22 in the data reception apparatus, and the error notification unit 24 notifies the transmitting end of the incidence of transmission error.

Further, switching between the first difference data and the second difference data may be performed according to the frequency of restoration errors at the receiving end.

In this case, the frequency (z) of restoration errors per unit time is obtained in the packet restoration unit 23 at the receiving end, and this frequency (z) is compared with a predetermined reference value Y. Then, the error notification unit 24 notifies the transmitting end of the result of the comparison. At the transmitting end, according to the result of the comparison, either the first difference data or the second difference data is used as the compressed data.

The operation in this case will be described briefly.

At the receiving end, when the frequency of errors in the process of restoring the compressed data included in the compressed packet exceeds a predetermined value, the receiving end requests the transmitting end to change the compression process at the transmitting end to that using the first difference data. When the frequency of errors becomes equal to or smaller than the predetermined value, the receiving end requests the transmitting end to change the compression process to that using the second difference data.

Then, the transmitting end performs compression using the difference data according to the request from the receiving end, and the receiving end performs restoration according to the compression process using the difference data requested to the transmitting end.

Embodiment 5

FIGS. 18 to 27 are diagrams for explaining a data transmission method according to a fifth embodiment of the invention, and a data transmission system using the data as transmission method. This fifth embodiment corresponds to aspects 22~31, 34, 35, 38~40.

The data transmission system of this fifth embodiment is a system for transmitting data in packet units from the transmitting end to the receiving end. At the transmitting end, when forming a uncompressed packet containing data to be transmitted (transmission data) and a compressed packet containing compressed transmission data, the transmission data is compressed by using transmission data (reference data) corresponding to the uncompressed packet and a specific compressed packet. At the receiving end, the compressed transmission data is restored using the reference data.

FIGS. 18(a) and 18(b) are diagrams illustrating data structures (formats) of an uncompressed packet Pg and a compressed packet Ph used in the data transmission system, respectively.

With reference to FIG. 18(a), the uncompressed packet Pg is composed of a header section Hpg containing header information, and a data section Dpg containing uncompressed data Ir to be transmitted by PPP (Point to Point Protocol). The information stored in the header section Hpg is composed of a compression/uncompression identifier Ih1 indicating whether the data Ir stored in the data section Dpg is compressed, a packet identifier (ID) for identifying this uncompressed packet, and other header information Ih3. The uncompressed data Ir is transmission data (D) to be transmitted by the uncompressed packet.

With reference to FIG. 18(b), the compressed packet Ph is composed of a header section Hph containing header information, and a data section Dph containing compressed data Id to be transmitted by PPP. The information stored in the header section Hph is composed of a compression/uncompression identifier Ih1 indicating whether the data Id in the data section Dph is compressed or not, a reference packet identifier (ID) Ih2b indicating a reference packet which is needed for restoration of the compressed data Id, a reference data update flag Ih5 indicating whether reference data used for the restoration is to be updated and other header information Ih3.

In an ordinary compressed packet Ph, the reference data update flag Ih5 is set at "Off" indicating that the reference data is not to be updated. In a specific compressed packet Ph, the update flag Ih5 is set at "On" indicating that the reference data is to be updated. The compressed data Id is difference data (ΔD) between transmission data (D) of a most-recent uncompressed packet or a most-recent specific compressed packet which has been transmitted previously to the compressed packet Pb to be transmitted, and transmission data (D) of the compressed packet Pb to be transmitted.

The header information Ih3 includes a CRC code Icrc shown in FIG. 27(e).

Figure 19:
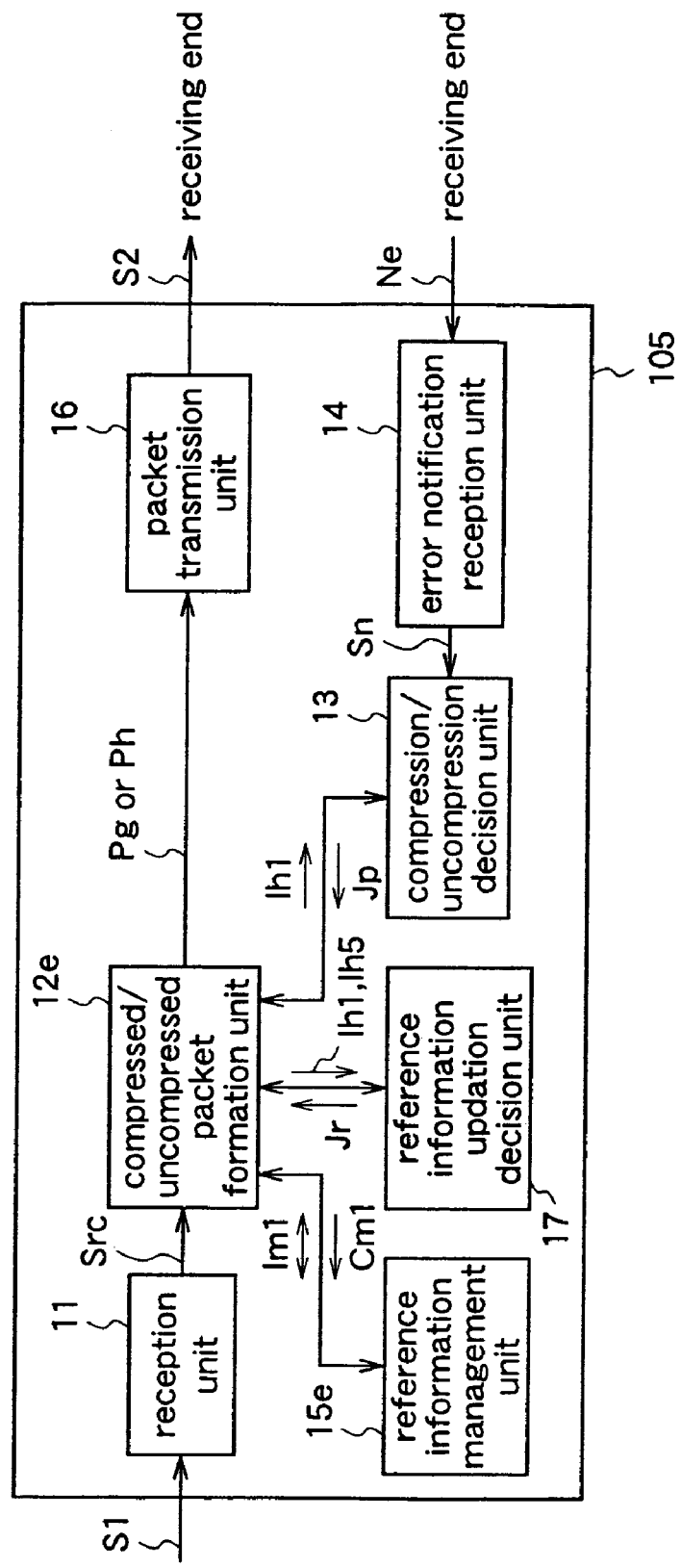
FIG. 19 is a block diagram for explaining a data transmission system using the data transmission method of the fifth embodiment, illustrating a data transmission apparatus in the data transmission system.

FIG. 19 is a block diagram illustrating a data transmission apparatus 105 in the data transmission system according to the fifth embodiment.

The data transmission apparatus 105 includes a reception unit 11, a compressed/uncompressed packet formation unit 12e, and a packet transmission unit 16, like the data transmission apparatus 101 of the first embodiment. The reception unit 11 receives a first transmission signal S1 including transmission data (D), and outputs a reception signal Src. The packet formation unit 12e receives the reception signal Src, and packetizes the transmission data (D) according to a control signal, thereby forming an uncompressed packet Pg or a compressed packet Ph. The packet transmission unit 16 transmits the packet formed by the formation unit 12e, as a second transmission signal S2, to the receiving end.

Further, the data transmission apparatus 105 includes a reference information decision unit 17. This decision unit 17 stores the transmission history of compressed packets which have been transmitted to the receiving end, and decides as to whether the reference data is to be updated or not when forming a compressed packet, on the basis of the compression/uncompression identifier Ih1 and the reference data update flag Ih5 which are supplied from the packet formation unit 12e. Every time the packet formation unit 12e forms n packets (e.g., three packets), the decision unit 17 outputs, as the above-described control signal, a reference data update signal Jr instructing update of the reference data, to the packet formation unit 12e. When the update signal Jr is input to the packet formation unit 12e, "On" indicating that the reference data is to be updated is stored as the reference data update flag Ih5 in the header section Uph of the compressed packet Ph, whereby a specific compressed packet is formed. On the other hand, when no update signal Jr is input to the packet formation unit 12e, "Off" indicating that the reference data is not to be updated is stored as the update flag Ih5 in the header section Hph of the compressed packet Ph, whereby an ordinary compressed packet is formed.

Further, the data transmission apparatus 105 includes a reference information update decision unit 17. This decision unit 17 stores the transmission history of compressed packets which have been transmitted to the receiving end, and decides as to whether the reference data is to be updated when forming a compressed packet, on the basis of the compression/uncompression identifier Ih1 and the reference data update flag Ih5 which are supplied from the packet formation unit 12e. Every time the packet formation unit 12e forms n packets (e.g., three packets), the decision unit 17 outputs, as the above-described control signal, a reference data update signal-Jr instructing update of the reference data, to the packet formation unit 12e. When the update signal Jr is input to the packet formation unit 12e, "On" indicating that the reference data is to be updated is stored as the reference data update flag Ih5 in the header section Hph of the compressed packet Ph, whereby a specific compressed packet is formed. On the other hand, when no update signal Jr is input to the packet formation unit 12e, "Off" indicating that the reference data is not to be updated is stored as the update flag Ih5 in the header section Hph of the compressed packet Ph, whereby an ordinary compressed packet is formed.

Further, the data transmission apparatus 105 includes a reference information management unit 15e. This management unit 15e associates transmission data (D) to be referred to when forming compressed data corresponding to each compressed packet with a reference packet identifier (ID) indicating a reference packet corresponding to the transmission data (D), and manages them as transmitting-end reference information Im1 (reference data (D) and identifier (ID)). In this management unit 15e, when an uncompressed packet or a specific compressed packet including the reference data update flag "On" Ih5 is formed, the reference data (D) and the identifier (ID) as the transmitting-end reference information Im1 are updated according to a transmitting-end management control signal Cm1 supplied from the packet formation unit 12e.

Figure 20:
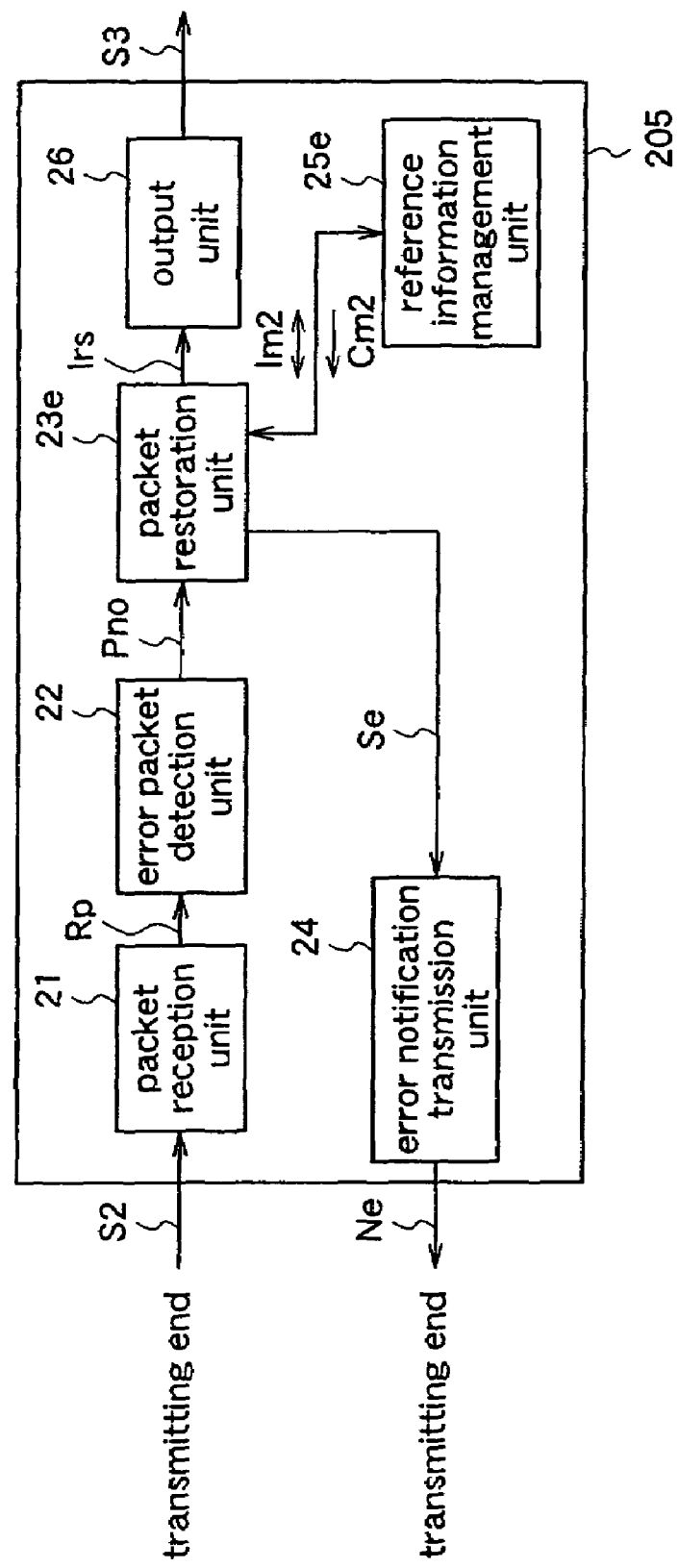
FIG. 20 is a block diagram for explaining the data transmission system using the data transmission method of the fifth embodiment, illustrating a data reception apparatus in the data transmission system.

FIG. 20 is a block diagram for explaining a data reception apparatus 205 in the data transmission system of this fifth embodiment.

The data reception apparatus 205 includes a packet reception unit 21, and error packet detection unit 22, a packet restoration unit 23e, and an out put unit 26, like the data reception apparatus 201 of the first embodiment. The packet reception unit 21 receives the packet which has been transmitted from the transmitting end as the second transmission signal S2, and outputs the received packet Rp. The error packet detection unit 22 receives the packet Rp, detects an error packet, and outputs a normal packet Pno which has been normally transmitted. The packet restoration unit 23e receives the normal packet Pno from the detection unit 22, and restores the uncompressed data or compressed data stored in the packet. The output unit 26 outputs the restored data Irs (transmission data (D)) as an output signal S3.

The data reception unit 205 includes a reference information management unit 25e. This management unit 25e associates transmission data (D) to be referred to when restoring compressed data corresponding to each compressed packet with a reference packet identifier (ID) indicating a reference packet corresponding to the transmission data (D), and manages them as receiving-end reference information Im2 (reference data (D) and identifier (ID)). In this management unit 25e, when the uncompressed packet or the specific packet including the reference data update flag "On"Ih5 is restored, the reference data (D) and the identifier (ID) as the receiving-end reference information Im2 are updated according to a receiving-end management control signal Cm2 supplied from the packet formation unit 23e.

Further, in the packet restoration unit 23e, when performing restoration on the compressed packet Ph, it is decided whether the reference packet identifier (ID) and the corresponding reference data (D) which are stored in the compressed packet Ph are stored in the reference information management unit 25e. According to the result of this decision, an error signal Se which indicates that a restoration error occurs in the compressed packet, is output.

Further, the data reception unit 205 includes an error notification transmission unit 24 which receives the error signal Se from the packet restoration unit 23e, and notifies the transmitting end that the restoration error has occurred at the transmitting end, by using a restoration error notification signal Ne.

Next, the function and effect will be described.

Figure 21:
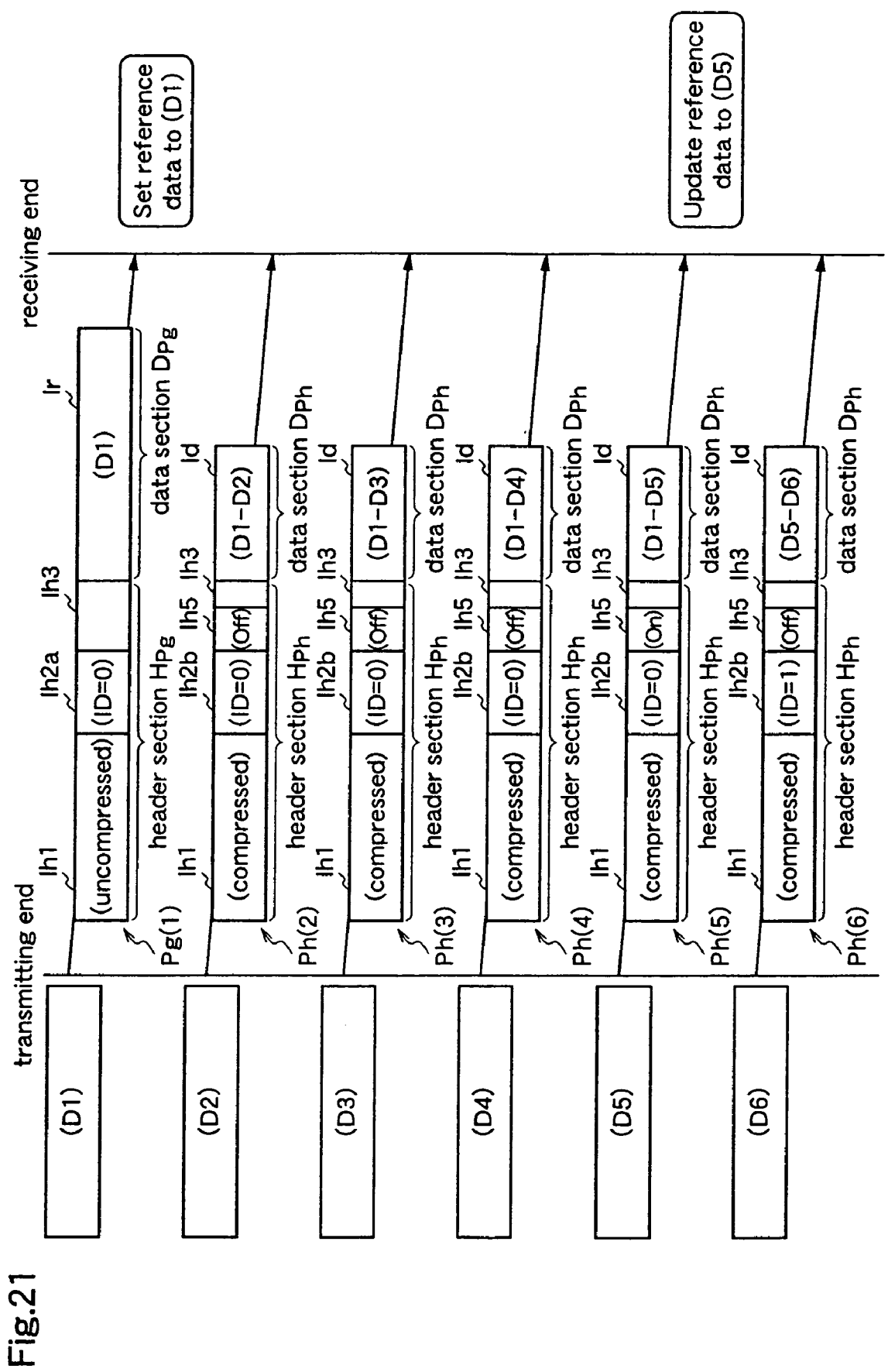
FIG. 21 is a diagram for explaining the data transmission method of the fifth embodiment, illustrating the flow of plural packets from the transmitting end to the receiving end in the normal transmission state.
Figure 22:
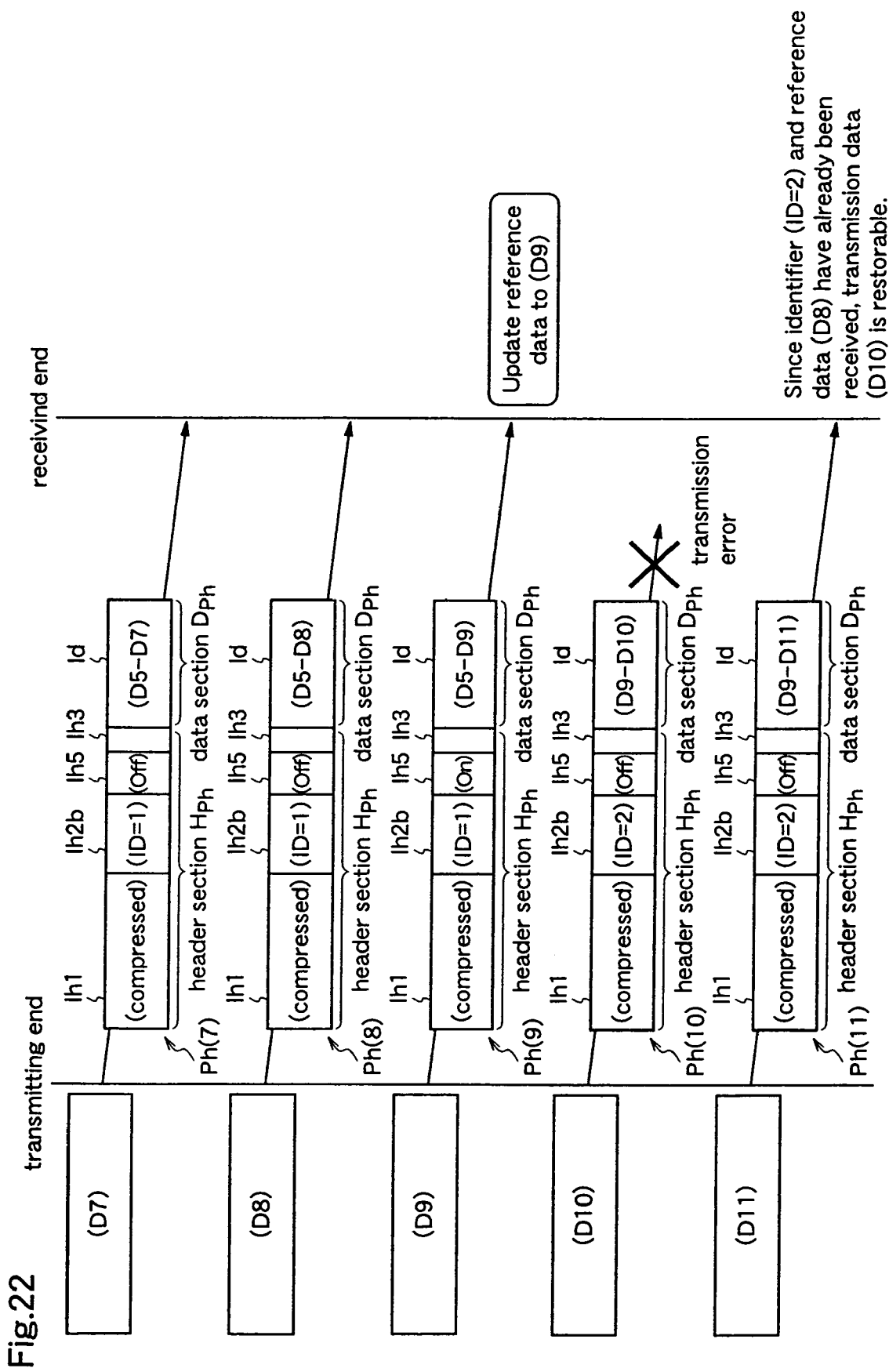
FIG. 22 is a diagram for explaining the data transmission method of the fifth embodiment, illustrating the flow of plural packets from the transmitting end to the receiving end in the state where a transmission error occurs.

FIGS. 21 and 22 are diagrams for explaining the data transmission method according to the fifth embodiment. FIG. 21 shows the flow of plural packets from the transmitting end to the receiving end in the normal transmission state, and FIG. 22 shows the flow of plural packets from the transmitting end to the receiving end in the state where a transmission error occurs.

Transmission data (D1)~(D11) are data which are packetized for packet-by-packet transmission. In this fifth embodiment, the transmission data (D1) is not compressed and is transmitted by an uncompressed packet Pg(1). The transmission data (D2)~(D11) are compressed and sequentially transmitted by compressed packets Ph(2)~Ph(11) which follow the uncompressed packet Pg(1), respectively.

At the transmitting end, initially, the uncompressed packet Pg(1) is formed and transmitted to the receiving end. At this time, the transmission data (D1) is stored as uncompressed data Ir in the data section Dpg of the uncompressed packet Pg(1). Further, an identifier Ih1 indicating "uncompressed", a packet identifier (ID=0) Ih2a for identifying this packet, and other header information Ih3 are stored in the header section Hpg of this packet Pg(1).

Thereafter, the compressed-packets Ph(2)~Ph(11) are successively formed and transmitted to the receiving end.

When forming these compressed packets, an identifier Ih1 indicating "compressed", a reference packet identifier (ID=0) Ih2b, a reference data update flag Ih5, and other header information Ih3 are stored in the header section Hph of each of the compressed packets Ph(2)~Ph(5). Further, difference data (D1-D2), difference data (D1-D3), difference data (D1-D4), and difference data (D1-D5) are stored in the data sections Dph of the compressed packets Ph(2)~Ph(5), respectively.

In this fifth embodiment, the reference data is updated every time three packets are transmitted. Therefore, in the compressed packets Ph(2)~Ph(4), the value of the reference data update flag Ih5 in the header section Hph is "Off" indicating that the reference data is not to be updated. On the other hand, in the compressed packet Ph(5), the value of the flag Ih5 is "On" indicating that the reference data is to be updated. That is, after transmission of the compressed packet Ph(5), the reference packet identifier is updated to (ID=1) which indicates the compressed packet Ph(5), and the reference data is updated to the transmission data (D5) corresponding to the reference packet identifier Ph(5).

Accordingly, an identifier Ih1 indicating "compressed", a reference packet identifier (ID=1) Ih2b, a reference data update flag Ih5, and other header information Ih3 are stored in the header section Hph of each of the four compressed packets Ph(6)~Ph(9) which follow the compressed packet Ph(5). Further, difference data (D5-D6), difference data (D5-D7), reference data (D5-D8), and difference data (D5-D9) are stored in the data sections Dph of the compressed packets Ph(6)~Ph(9).

In the compressed packets Ph(6)~Ph(8), the value of the update flag Ih5 in the header section Hph is "Off" indicating that the reference data is not to be updated. On the other hand, in the compressed packet Ph(9), the value of the flag Ih5 is "On" indicating that the reference data is to be updated. That is, after transmission of the compressed packet Ph(9), the reference packet identifier is updated to (ID=2) indicating the compressed packet Ph(9), and the reference data is updated to the transmission data (D9) corresponding to the reference packet identifier Ph(9).

Accordingly, an identifier Ih1 indicating "compressed", a reference packet identifier (ID=2), a reference data update flag Ih5, and other header information Ih3 are stored in the header section Hph of each of the compressed packets Ph(10) and Ph(11). Further, difference data (D9-D10) and difference data (D9-D11) are stored in the data sections Dph of the compressed packets Ph(10) and Ph(11), respectively.

In the compressed packets Ph(10) and Ph(11), the value of the reference data update flag Ih5 in the header section Hph is "Off" indicating that the reference data is not to be updated.

The uncompressed packet Pg(1) and the following compressed packets Ph(2)~Ph(11), which have been transmitted from the transmitting end, are sequentially received at the receiving end in the normal data transmission state, and the transmission data (D1)-(D11) corresponding to the respective packets are restored.

To be specific, the difference data (D1-D2), (D1-D3), (D1-D4), and (D1-D5) of the packets Ph(2), Ph(3), Ph(4), and Ph(5) are restored with reference to the transmission data (D1) of the uncompressed packet Pg(1) which is identified by the identifier (ID=0).

Further, difference data (D5-D6), (D5-D7), (D5-D8), and (D5-D9) of the packets Ph(6), Ph(7), Ph(8), and Ph(9) are restored with reference to the transmission data (D5) of the compressed packet Ph(5) which is identified by the identifier (ID=1).

Further, the difference data (D9-D10) and (D9-D11) of the packets Ph(10) and Ph(11) are restored with reference to the transmission data (D9) of the compressed packet Ph(9) which is identified by the identifier (ID=2).

Turning to FIG. 22, it is assumed that a transmission error occurs in the compressed packet Ph(10) during the above-described packet-by-packet transmission. In this case, when the compressed packet Ph(11) is received, restoration of the difference data (D9-D11) stored in this compressed packet Ph(11) is performed in the same way as in the case where no transmission error has occurred in the compressed packet Ph(10).

That is, also in this fifth embodiment, as in the first embodiment, when performing restoration of the difference data (ΔD) stored in each compressed packet Ph, the reference data to be used for this restoration is not the transmission data of a packet immediately before the compressed packet to be processed but the transmission data of an uncompressed packet which has been transmitted first or immediately after occurrence of a restoration error, and the transmission data of a specific packet which has been transmitted every time a predetermined number of packets was transmitted.

Therefore, in this fifth embodiment, even when a transmission error occurs in a compressed packet other than the specific compressed packet, this transmission error does not affect restoration of the subsequent compressed packets which have been received normally. In this case, only the error packet is discarded at the receiving end, and no restoration error notification is sent from the receiving end to the transmitting end.

When a transmission error occurs in the uncompressed packet Pg(1) or the specific compressed packet during the packet-by-packet data transmission, a restoration error notification is sent to the transmitting end in the same procedure as described with respect to FIG. 32. Immediately after the restoration error notification is received by the transmitting end, an uncompressed packet is transmitted from the transmitting end and, thereafter, the ordinary compressed packet and the specific compressed packet are repeatedly transmitted. At the receiving end, the error packet and the subsequent compressed packets are discarded.

Hereinafter, the operation of the data transmission apparatus 105 will be described.

For example, when continuous transmission data (D1)~(D11) which have been transmitted from a provider by a transmission method such as the Ethernet (refer to FIGS. 21 and 22) are input to the data transmission apparatus 105 as a first transmission signal S1, the reception unit 11 receives these transmission data (D1)~(D11) by the transmission method. These transmission data are sequentially output to the compressed/uncompressed packet formation unit 12e, as received data Src.

In the packet formation unit 12e, packets for transmitting the respective transmission data to the receiving end are formed on the basis of a transmission protocol such as PPP. At this time, any of an uncompressed packet, an ordinary compressed packet, and a specific compressed packet is formed in accordance with a packet decision signal Jp from the compression/uncompression decision unit 13, and a reference data update signal Jr from the update decision unit 17. The uncompressed packet Pg and the compressed packets Ph so formed are sequentially transmitted to the packet transmission unit 16, and the packet transmission unit 16 transmits them as a second transmission signal S2 to the receiving end.

To be specific, when communication is started or when an error notification reception signal Sn is supplied from the error notification reception unit 14 to the decision unit 13, the decision unit 13 instructs the packet formation unit 12e to form an uncompressed packet, by the packet decision signal Jp. In cases other than described above, the decision unit 13 instructs the formation unit 12e to form a compressed packet.

In the case where the formation unit 12e is instructed to form a compressed packet, the formation unit 12e forms a specific compressed packet as the compressed packet when the reference data update signal Jr indicates update of the transmitting-end reference information Im1, and it forms an ordinary compressed packet when the signal Jr does not indicate update of the reference information Im1.

In the compression/uncompression decision unit 13, it is decided that either an uncompressed packet or a compressed packet is to be formed next, on the basis of the compression/uncompression identifiers Ih1 of the respective packets which have been formed, and the error notification reception signal Sn. Then, a packet decision signal Jp indicating the type of the packet to be formed is output. To be specific, immediately after starting communication, a packet decision signal Jp indicating that an uncompressed packet is to be formed is output, and when an error notification reception signal Sn is input, a packet decision signal Jp indicating that a compressed packet is to be formed is output.

In the packet formation unit 12e, formation of an uncompressed packet Pg is performed in the same manner as described for the first embodiment. Further, a compressed packet Ph is formed on the basis of the transmitting-end reference information Im1 (i.e., identifier (ID) and reference data (D)) which is stored in the reference information management unit 15e. At this time, in the header section Hph of the ordinary compressed packet Ph, the reference data update flag Ih5 that is set at "Off" is stored together with the compression/uncompression identifier Ih1, the reference packet identifier Ih2b, and the other header information IH3. In the header section Hph of the specific compressed packet, the update flag Ih5 that is set at "On"is stored together with the compression/uncompression identifier Ih1, the reference packet identifier Ih2b, and the other header information Ih3. In the data sections of these compressed packets, the difference data (ΔD) based on the reference data managed by the reference information management unit 15e are stored.

Further, when the uncompressed packet Pg or the compressed packet Ph is formed, in the reference information management unit 15e, the identifier (ID) and the corresponding reference data (D) as the transmitting-end reference information Im1 are updated to the reference packet identifier (D) for identifying the packet Ph or Ph and the corresponding transmission data (D), on the basis of a transmitting-end update control signal Cm1 supplied from the packet formation unit 12e.

Further, in the reference information update decision unit 17, the number of the ordinary compressed packets which have been transmitted after transmission of the uncompressed packet or the specific compression packet is counted on the basis of the compression/uncompression identifiers Ih1 of the respective packets, and the reference data update flags Ih5 of the compressed packets. When the count reaches a predetermined value (in this case, 3), a reference data update signal Jr is output, and the count is reset. When the count is smaller than the predetermined value, no reference data update signal Jr is output.

Figure 23:
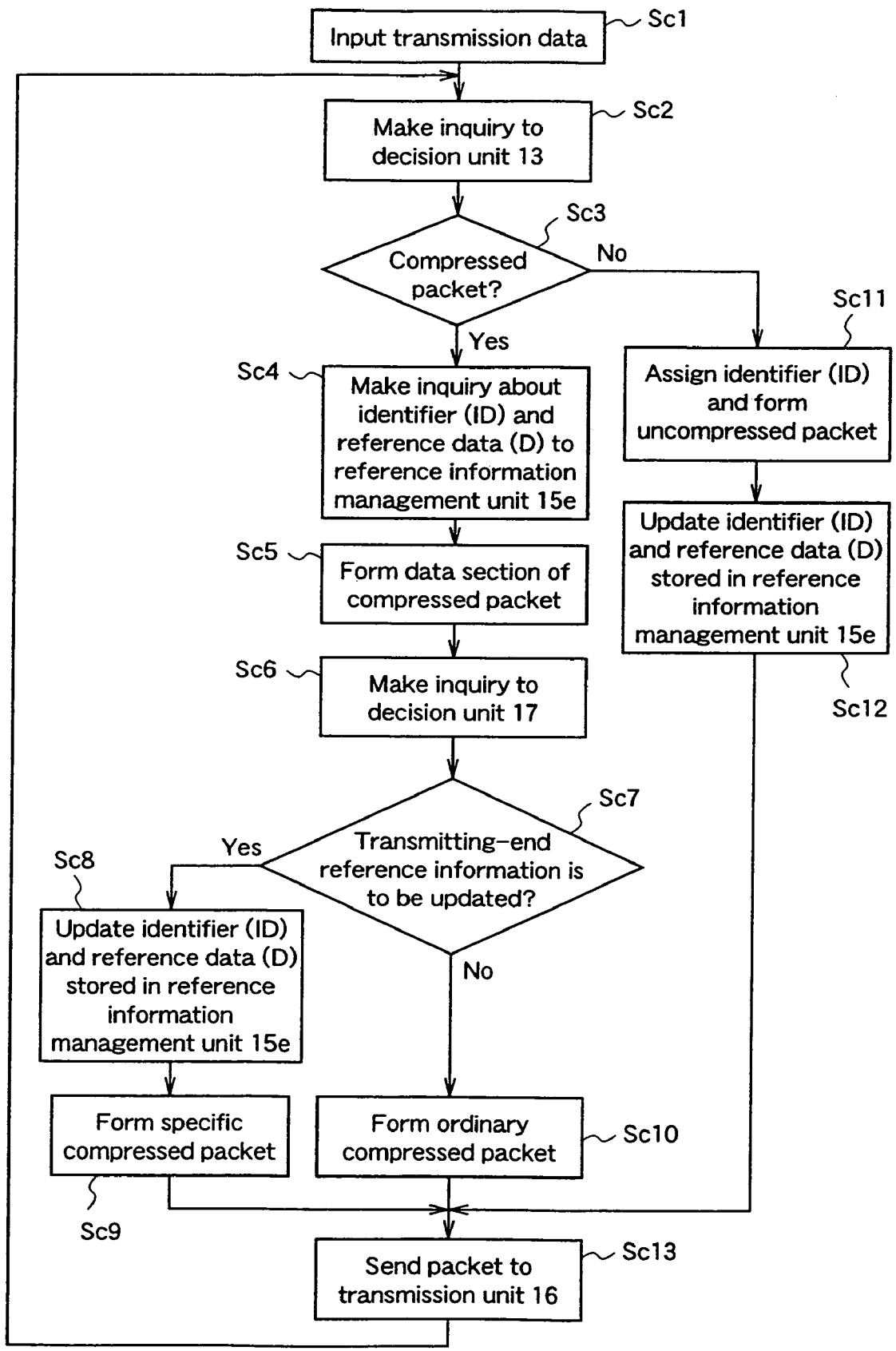
FIG. 23 is a flowchart for explaining packet formation by the data transmission apparatus of the fifth embodiment.

The process steps performed by the packet formation unit 12e will be described hereinafter, with reference to a flowchart shown in FIG. 23.

When the transmission data received by the reception unit 11 is input to the packet formation unit 12e (step Sc1), the packet formation unit 12e inquires of the decision unit 13 about the type of a packet to be formed next, i.e., either an uncompressed packed or a compressed packet (step Sc2), and the type of a packet to be formed is decided on the basis of the packet decision signal Jp from the decision unit 13 (step Sc3).

Based on the result of the decision, when an uncompressed packet is to be formed, an identifier (ID) for identifying this uncompressed packet is given to this packet as a packet identifier Ih2a, and an uncompressed packet Pg including the packet identifier (ID) is formed (step Sc11). Thereafter, the identifier (ID) and the corresponding reference data (D), which are stored as the transmitting-end reference information Im1 in the management unit 15e, are updated according to an instruction from the packet formation unit 12e (transmitting-end management control signal Cm1) (step Sc12).

On the other hand, when a compressed packet is to be formed, the packet formation unit 12e inquires of the reference information management unit 15e about the identifier (ID) and the reference data (D) which are stored as the transmitting-end reference information Im1 in the management unit 15 (step Sc4). Then, the data section Dph of a compressed packet is formed on the basis of the identifier (ID) and the reference data (D) obtained by the inquiry (step Sc5).

Thereafter, the packet formation unit 12e inquires of the decision unit 17 as to whether the transmitting-end reference information Im1 is to be updated or not (step Sc6), and it is decided whether the information Im1 is to be updated on the basis of the reference data update signal Jr from the decision unit 17 (step Sc7).

When the transmitting-end reference information Im1 is to be updated, the identifier (ID) and the reference data (D) stored in the reference information management unit 15e are updated according to an instruction from the packet formation unit 12e (step Sc8), and a specific compressed packet Ph is formed (step Sc9).

On the other hand, when the transmitting-end reference information Im1 is not to be updated, an ordinary compressed packet is formed (step Sc10).

Then, those packets formed as described above are transmitted to the transmission unit 16 (step Sc13).

Thereafter, the packet formation unit 12e returns to the process of step Sc2. The above-mentioned process steps are repeated until the last packet is transmitted.

Next, a description will be given of the operation of the data reception apparatus 205 when plural packets are sequentially transmitted as shown in FIGS. 21 and 22.

In the packet reception unit 21, the packets Pg(1) and Ph(2)~Ph(11) which have been transmitted from the transmitting end are sequentially received, and the received packets are input to the error packet detection unit 22. In the error packet detection unit 22, when it is confirmed that the received packets have been normally transmitted, these packets are output to the packet restoration unit 23e as normal packets Pno. However, when it is not confirmed that the received packets have been normally transmitted, the received packets are discarded as error packets. Although this fifth embodiment employs CRC (Cyclic Redundancy Check) as an error detection method, the error detection method is not restricted thereto.

In the packet restoration unit 23e, it is decided whether the normal packet Pno (normally-received packet) is a compressed packet or an uncompressed packet, according to the compression/uncompression identifier Ih1 included in the header section of the normal packet Pno.

For example, when the normally-received packet Pno supplied to the restoration unit 23e is the uncompressed packet Pg(1), the restoration unit 23e restores this uncompressed packet Pg(1) by taking the transmission data (D1) from the data section Dpg.

Next, in the management unit 25e, the identifier (ID) and the reference data (D) which are stored as the receiving-end reference information Im2 are updated according to the receiving-end management control signal Cm. Thereby, the identifier (ID) and the reference data (D) stored in the management unit 25e are updated to the identifier (ID=0) and the transmission data (D1), respectively. Thereafter, the restoration unit 23e outputs the transmission data (D1) as restored data to the output unit 26, and the output unit 26 outputs the transmission data (D1).

On the other hand, when the packet supplied to the restoration unit 23e is the specific compressed packet Ph(5), the restoration unit 23e inquires of the reference information management unit 25e as to whether the reference packet identifier (ID=0) and the corresponding reference data (D1) which are included in this compressed packet are stored in the management unit 25e. When the identifier (ID=0) and the data (D1) are stored in the management unit 25e, the restoration unit 23e restores the transmission data (D5) of this packet by using the reference data (D1) and the difference data (D1-D5).

When either the reference packet identifier (ID=0) or the corresponding reference data (D1) is not stored in the management unit 25e, the received compressed packet is discarded as an error packet, and an error signal Se indicating occurrence of a restoration error is output to the error notification transmission unit 24. On receipt of the error signal Se, the error notification transmission unit 24 sends a restoration error notification signal Ne to the transmitting end.

Further, in the restoration unit 23e, the reference data update flag Ih5 of the header section Hph is checked. When this flag Ih5 indicates that the receiving-end reference information Im2 is to be updated, a receiving-end update control signal Cm2 is output to the reference information management unit 25e. In the management unit 25e, according to the control signal Cm2, the stored identifier (ID) and the corresponding reference data (D) are updated to, for example, the reference packet identifier (ID=1) and the reference data (D5). Thereafter, the transmission data (D5) restored in the restoration unit 23e is output to the output unit 26, and the output unit 26 outputs the transmission data (D5) as a signal S3.

When the packet inputted to the restoration unit 23e is an ordinary compressed packet, the processes to be performed in the restoration unit 23e and the reference information management unit 25e are identical to those described for the first embodiment, except the process of checking the reference data update flag Ih5.

Figure 24:
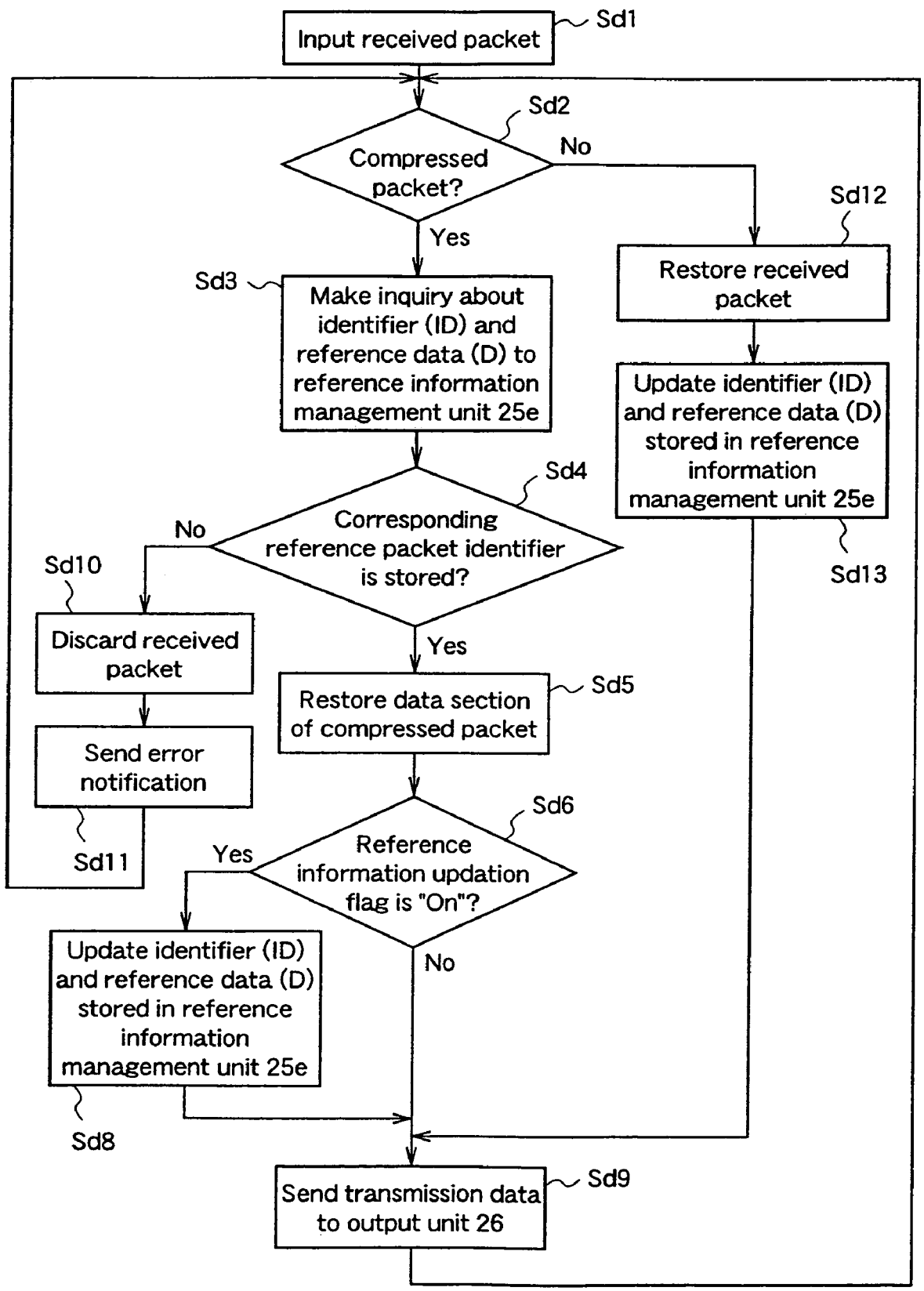
FIG. 24 is a flowchart for explaining packet restoration by the-data reception apparatus of the fifth embodiment.

Hereinafter, the process performed by the packet restoration unit 23e will be described with reference to a flowchart shown in FIG. 24.

When the normally-received packet Pno is supplied from the error packet detection unit 22 to the packet restoration unit 23e (step Sd1), it is decided whether the normally-received packet Pno is an uncompressed packet or a compressed packet (step Sd2).

When the normally-received packet Pno is an uncompressed packet, the uncompressed packet is restored, i.e., the transmission data (D) is taken from the data section Dpg of this packet Pg (step Sd12). Then, according to an instruction from the packet restoration unit 23e, the identifier (ID) and the reference data (D) which are stored as the receiving-end reference information Im2 in the management unit 25e are updated to the packet identifier of the uncompressed packet and the corresponding transmission data, respectively (step Sd13). The transmission data taken from the data section of the uncompressed packet is sent to the output unit 26 (step Sd9).

When the normally-received packet is a compressed packet the packet restoration unit 23e inquires of the reference information management unit 25e as to whether the reference packet identifier (ID) Ih2b and the corresponding reference data (D) which are included in the compressed packet are stored in the management unit 25e (step Sd3), and it is decided whether the identifier (ID) and the data (D) are stored in the management unit 25e or not (step Sd4).

When the reference packet identifier (ID) Ih2b and the corresponding reference data (D) are not stored in the management unit 25e, the normally-received packet is discarded as an error packet (step Sd10), and an error signal Se is output to the error notification transmission unit 24 (step Sd11). Thereafter, the packet restoration unit 23e returns to the process of step Sd2.

On the other hand, when the reference packet identifier (ID) Ih2b and the corresponding reference data (D) are stored in the management unit 25e, the difference data of the compressed packet is restored to the transmission data on the basis of the reference data (step Sd5).

Next, it is detected whether or not the reference data update flag Ih5 stored in the compressed packet indicates that the reference information is to be updated (step Sd6). When the flag Ih5 indicates that the reference information is to be updated, the identifier (ID) and the reference data (D) which are stored as the receiving-end reference information Im2 in the management unit 25e are updated (step Sd8). Thereafter, the transmission data is output to the output unit 26 (step Sd9). When the flag Ih5 does not indicate that the reference information is to be updated, the transmission data is output to the output unit 25 without updating the receiving-end reference information Im2 (step Sd9). When the flag Ih5 does not indicate that the reference information is to be updated, the transmission data is output to the output umit 25 without updating the receiving-end reference information Im2 (step Sd9).

Thereafter, the packet restoration unit 23e returns to the process of step Sd2. The above-described process steps are repeated until the last packet is received.

As described above, according to the data transmission method of the fifth embodiment, when performing packet-by-packet data transmission by using uncompressed packets in which uncompressed transmission data are stored, and compressed packets in which compressed transmission data are stored, the transmission data of each compressed packet is compressed by using, as reference data, the transmission data of an uncompressed packet or a specific compressed packet which has been transmitted previously to the compressed packet. Therefore, so long as the uncompressed packet or the specific compressed packet is normally transmitted, even when a transmission error occurs in some compressed packet, difference data of the compressed packets which have been normally transmitted after the error packet can be restored by using the transmission data of the uncompressed packet or the specific compressed packet. Therefore, the number of the compressed packets to be discarded due to the transmission error is significantly reduced. As the result, the quality of data transmitted in the radio section is improved. In other words, the effective rate of data transmission is increased, and the time and cost required for transmission of unrestorable packets are significantly reduced.

While in this fifth embodiment, the timing for updating the transmitting-end or receiving-end reference information (i.e., to transmit one specific compressed packet every time three compressed packet are transmitted) is decided at the transmitting end, the specific compressed packet may be transmitted every time a predetermined period (n sec.) has passed, or when the size of the difference data stored in the compressed packet exceeds a predetermined threshold.

Further, the specific compressed packet may be transmitted when the transmitting end receives a request for updating the reference data from the receiving end, or when the size of difference data (or the average of difference data) exceeds a predetermined threshold.

For example, the transmitting end transmits the specific compressed packet when it receives a request for transmission of the specific compressed packet from the receiving end.

Further, the transmitting end transmits the specific compressed packet when the size of compressed data included in the compressed packet to be transmitted to the receiving end exceeds a predetermined value.

Furthermore, the transmitting end transmits the specific compressed packet when the average of sizes of compressed data included in the compressed packets to be transmitted to the receiving end exceeds a predetermined value.

The method of deciding the timing to update the transmitting-end or receiving-end reference information may be a combination of the above-described methods.

The following effects are achieved by deciding the reference data update timing as described above.

Usually, a difference in video data, audio data, or header information between two adjacent packets is very small or 0 in many cases, but a difference in such data between distant packets tends to be large. Therefore, by periodically transmitting an uncompressed packet, the quality of data transmitted by radio is improved, and the average of difference data is reduced, that is, the compression efficiency of the data section is improved.

Modification of Embodiment 5

While in the fifth embodiment the compressed data to be stored in the data section Dph of the compressed packet Ph is the difference data ($\Delta D$) between the whole transmission data of the compressed packet and the whole transmission data of the uncompressed packet Pg, the compressed data to be stored may be obtained by compressing a part of the transmission data of the compressed packet Ph.

That is, the transmission data is separated into a plurality of compression target data corresponding to different items to be compressed, and non-target data which is not to be compressed. In the data section Dph of the compressed packet Ph, difference data between the compression target data of the transmission data corresponding to the uncompressed packet and the compression target data of the transmission data corresponding to the compressed packet is stored as item-basis compressed data, and the non-target data of the transmission data corresponding to the compressed packet is also stored in the data section Dph.

FIG. 25(a) shows the data structure of an uncompressed packet Pi which is used when transmission data is composed of compression target data (data to be compressed) and non-target data (data not to be compressed).

The uncompressed packet Pi is composed of a header section Hpi containing header information, and a data section Dpi containing transmission data (D) to be transmitted by PPP, as uncompressed data Ir. The header section Hpi is composed of a compression/uncompression identifier Ih1 indicating whether the data in the data section is compressed or not, a packet identifier (ID) Ih2a for identifying this uncompressed packet, and other header information Ih3. The uncompressed data Ir is composed of four pieces of item-basis target data Ira, Irb, Irc, and Ird corresponding to four items to be compressed, and non-target data Inc which is not to be compressed. In FIG. 25(a), item-basis transmission data (Da), (Db), (DC), and (Dd) are stored as the item-basis compression target data (item-basis uncompressed data) Ira, Irb, Irc, and Ird.

FIG. 25(b) shows the data structure of a compressed packet Pj which is used when transmission data is composed of compression target data and non-target data.

The compressed packet Pj is composed of a header section Hpj containing header information, and a data section Dpj containing partially-compressed data (D) to be transmitted by PPP. The header section Hpj is composed of a compression/uncompression identifier Ih1, a reference packet identifier (ID) Ih2b, a reference data update flag Ih5, and difference data existence flag Ih6, and other header information Ih3. The difference data existence flag Ih6 indicates whether compressed item-basis target data which is not "0" is included in the compressed packet or not.

The data section Dpj includes four pieces of item-basis compressed data Ida, Idb, Idc, and Idd corresponding to four target items to be compressed, and non-target data Inc which is not compressed. The compressed data Ida is a difference (item-basis difference data ($\Delta Da$)) between the item-basis transmission data (Da) of the transmission data corresponding to the uncompressed packet and the item-basis transmission data (Da) of the transmission data corresponding to the compressed packet. The compressed data Idb is a difference (item-basis difference data ($\Delta Db$)) between the item-basis transmission data (Db) of the transmission data corresponding to the uncompressed packet and the item-basis transmission data (Db) of the transmission data corresponding to the compressed packet. The compressed data Idc is a difference (item-basis difference data ($\Delta Dc$)) between the item-basis transmission data (Dc) of the transmission data corresponding to the uncompressed packet and the item-basis transmission data (Dc) of the transmission data corresponding to the compressed packet. The compressed data Idd is a difference (item-basis difference data ($\Delta Dd$)) between the item-basis transmission data (Dd) of the transmission data corresponding to the uncompressed packet and the item-basis transmission data (Dd) of the transmission data corresponding to the compressed packet.

In this case, in the data transmission apparatus 105, the reference information management unit 15e tables the reference packet identifier (ID), the data indicating each target item to be compressed, and the reference compressed data corresponding to each target item (item-basis reference data), and stores them as transmitting-end reference information Im1.

Likewise, in the data reception apparatus 205, the reference information management unit 25e tables the reference packet identifier (ID), the data indicating each target item to be compressed, and the reference compressed data corresponding to each target item (item-basis reference data), and stores them as receiving-end reference information Im2.

FIG. 25(c) shows the process of forming a compressed packet Pj(Y) by compressing transmission data D(Y).

In this case, in the reference information management unit 15e, a reference packet identifier (ID=X) and item-basis reference data (Da(X)), (Db(X)), (Dc(X)), and (Dd(X)) are stored as the transmitting-end reference information Im1.

Further, the respective item-basis difference data ($\Delta Da$), ($\Delta Db$), ($\Delta Dc$), and ($\Delta Dd$) are differences between the respective item-basis reference data (Da(X)), (Db(X)), (Dc(X)), and (Dd(X)) as the transmitting-end reference information Im1 and the corresponding item-basis transmission data (Da(Y)), (Db(Y)), (Dc(Y)), and (Dd(Y)) in the transmission data (D(Y)), as represented by the following formulae (1) to (4).

$$\Delta Da = Da(X) - Da(Y) = 0 \quad (1)$$

$$\Delta Db = Db(X) - Db(Y) \neq 0 \quad (2)$$

$$\Delta Dc = Dc(X) - Dc(Y) \neq 0 \quad (3)$$

$$\Delta Dd = Dd(X) - Dd(Y) = 0 \quad (4)$$

Since the values of the item-basis difference data ($\Delta Db$) and ($\Delta Dc$) are not 0 while the values of the item-basis difference data (ΔDa) and (ΔDd) are 0, the difference data existence flag Ih6 in the header section Hj of the compressed packet Pj(Y) is set at "On" indicating that there are item-basis difference data which are not 0 amongst the plural item-basis difference data, and only the item-basis difference data (ΔDb) and (ΔDc) are stored in the data section Dj of the compressed packet Pj(Y).

Figure 26:
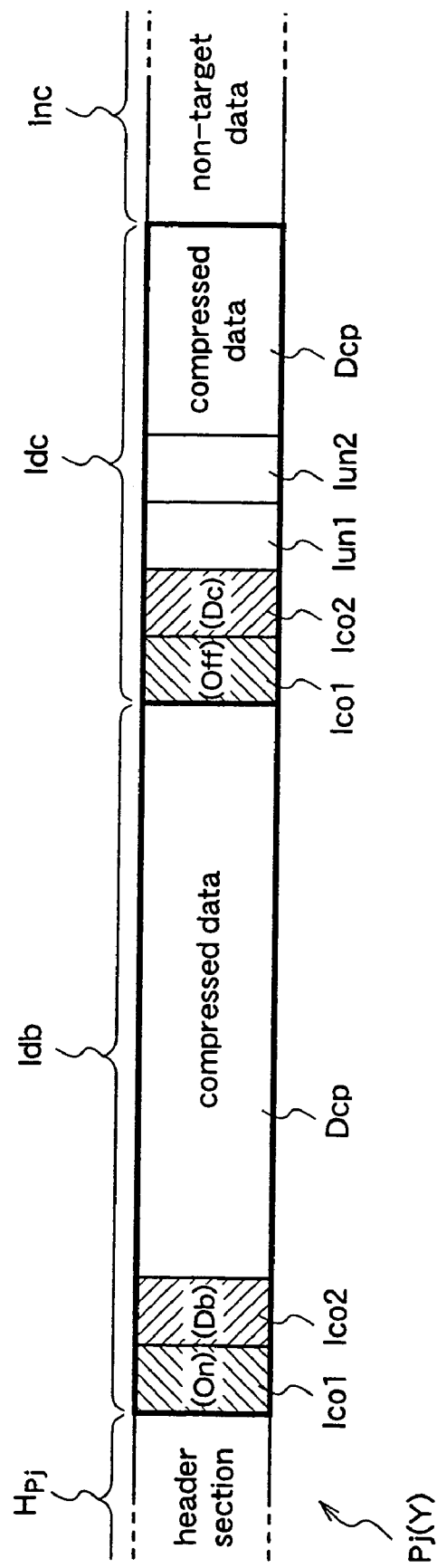
FIG. 26 is a diagram illustrating a part of the compressed packet Pj(Y) according to the modification of the fifth embodiment.
Figure 27:
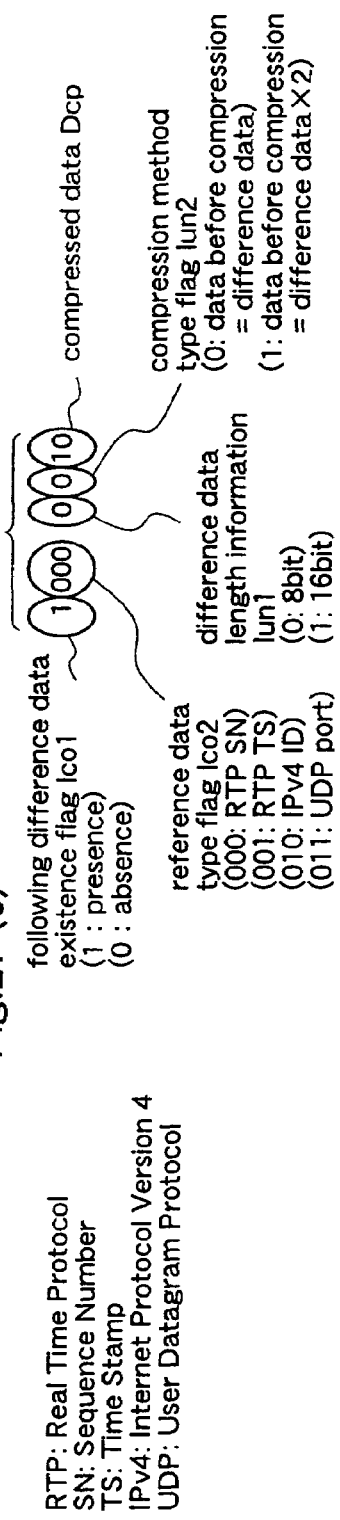
FIGS. 27(a), 27(b) and 27(c) are diagrams for explaining transmission data to be transmitted (27(a)) and specific data stored in an uncompressed packet Pi and a compressed packet Pj (27(b)), according to the modification of the fifth embodiment.
Figure 28:
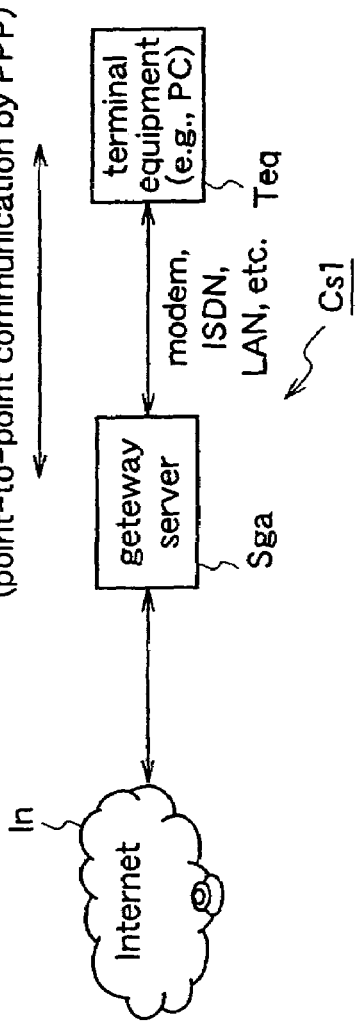
FIGS. 28(a) and 28(b) are diagrams for explaining a data transmission system to which the conventional header compression method by V. Jacobson is applied, illustrating the whole structure of the data transmission system (28(a)) and processes required for data transmission in the data transmission system (28(b)).
Figure 28:
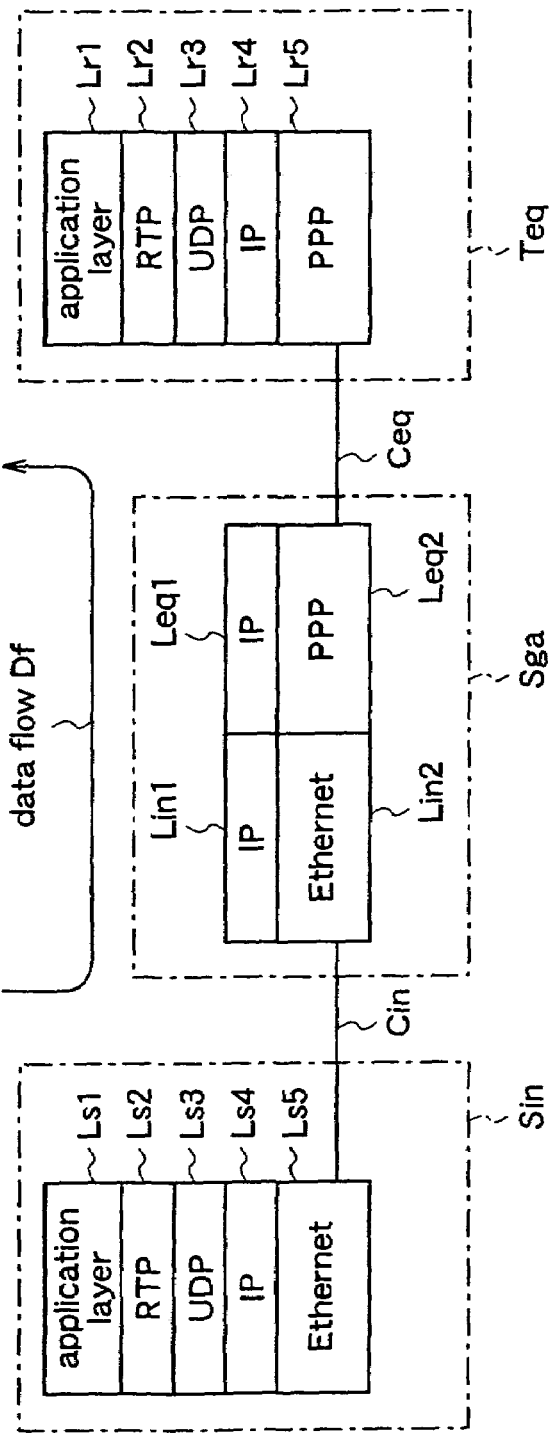

FIG. 26 shows a part of the compressed packet Pj(Y).

Further, each item-basis difference data includes, as common information (format), a following difference data existence flag and a reference data type flag. The value of the following difference data existence flag Ico1 in the compressed data Idb (item-basis difference data (ΔDb)) is set at "On" indicating that another item-basis difference data is stored after this item-basis difference data (ΔDb) in the data section Dpj, and the value of the reference data type flag Ico2 in the compressed data Idb indicates that the item-basis transmission data (Db) should be referred to when restoring the item-basis difference data (ΔDb). Further, the value of the following difference data existence flag Ico1 in the compressed data Idc (item-basis difference data (ΔDd)) is set at "Off" indicating that no compressed data follows this item-basis difference data (ΔDd) in the data section Dpj, and the value of the reference data type flag Ico2 in the compressed data Idc indicates that the item-basis transmission data (Dc) should be referred to when restoring the compressed data Idc.

Since each item-basis difference data includes the following difference data existence flag Ico1 and the reference data type flag Ico2, only the item-basis difference data whose data quantity is not 0 can be included as components of the difference data in the data section of the compressed packet.

Therefore, the transmission data can be compressed for each component of the transmission data (data corresponding to each target item to be compressed), whereby the storage area (e.g., a RAM) of the transmitting-end reference information management unit 15e or the receiving-end reference information management unit 25e can be reduced while maintaining the compression efficiency.

Further, in the item-basis difference data Idc, as peculiar information (format) different from the common information (the following difference data existence flag and the reference data type flag), difference data length information Ium1 and a compression method type flag Inu2 are stored.

The difference data length information Iun1 shows the data size of the item-basis difference data Idc, and the compression method type flag Inu2 is used for specifying a method for restoring the item-basis difference data Idc from plural restoration methods.

Since the difference data length information Iun1 is included in the item-basis difference data (ΔDc), when the item-basis difference data (ΔDc) is relatively small, the data size can be reduced, whereby the compression efficiency is further improved.

Further, the compression method type flag Iun2 comprises, for example, 2-bit data, and the compression efficiency is further improved by predetermining compression methods according to the values.

For example, when the value of the compression method type flag Iun2 is "00", the item-basis difference data is a difference (ΔDn) from the reference data. When the value is "01", the item-basis difference data is (ΔDn/2). When the value is "10", the item-basis difference data is (ΔDn/8). When the value is "11", the item-basis difference data is (ΔDn/64).

FIGS. 27(a)-27(c) are diagrams for explaining specific data to be stored in the uncompressed packet Pi and the compressed packet Pj. FIG. 27(a) shows data to be transmitted (transmission data) by these packets, and FIG. 27(b) shows transmission data in the uncompressed packet and difference data in the compressed packet. Here, transmission of RTP data is taken as an example.

The above-described transmission data corresponds to an IP packet (RTP/UDP/IP data) Pipb shown in FIG. 29(d), and the transmission data comprises data corresponding to first to fourth compression target items K1 to K4. The data corresponding to the first and second target items K1 and K2 (compression target data Ira and Irb shown in FIG. 25(a)) are an RTP packet's sequence number (SN) and a time stamp (ST), respectively. The data corresponding to the third target item K3 (compression target data Irc shown in FIG. 25(a)) is an IP packet's identifier (ID), and the data corresponding to the fourth target item K4 (compression target data Ird shown in FIG. 25(a)) is an UDP port number. The specific data corresponding to the respective target items in the respective transmission data (D1)~(D5) are shown in No.1~No.5 on the table of FIG. 27(a).

When the RTP/UDP/IP data are actually transmitted as the transmission data (D1) to (D5), the transmission data are stored in PPP packets (uncompressed packet and compressed packet) according to PPP (Point to Point Protocol), and the PPP packets are transmitted from the data transmission apparatus 105 to the data reception apparatus 205.

At this time, the compression target data Ira, Irb, Irc, and Ird of the transmission data (D1) are stored without being compressed, in the data section Dpi of the uncompressed packet Pi(1). Further, in the header section Hpi of this packet Pi(1), a compression/uncompression identifier Ih1 (1 bit), packet identifiers (ID) Ih2a and Ih2b (5 bits), and other header information Ih3 (not shown in FIG. 27(b)) are stored.

Further, in the data sections Dpj of the compressed packets Pj(2) and Pj(3), the item-basis compression target data (item-basis uncompressed data) Ira, Irb, Irc, and Ird corresponding to the respective target items of the transmission data (D2) and (D3) are compressed and stored as item-basis compressed data Ida, Idb, Idc, and Idd. The item-basis compressed data Ida corresponding to the sequence numbers (SN) of the compressed packets Pj(2) and Pj(3) are 8-bit difference data "1" and "2", respectively. The item-basis compressed data Idb corresponding to the time stamps (ST) of the compressed packets Pj(2) and Pj(3) are 16-bit difference data "50" and "100", respectively. The item-basis compressed data Idc corresponding to the IP packet identifiers (ID) of the compressed packets Pj(2) and Pj(3) are 8-bit compressed transmission data "1" and "2", respectively. Further, the item-basis compressed data Idd corresponding to the UDP port numbers of the compressed packets Pj(2) and Pj(3) are 0 bit, respectively.

Further, in the header section Hpj of each of the compressed packets Pj(2) and Pj(3), a 1-bit compression/uncompression identifier Ih1, a 5-bit reference packet identifier (ID) Ih2b, a 1-bit reference data update flag Ih5, a 1-bit difference data existence flag Ih6, and other header information Ih3 (not shown in FIG. 27(b)) are stored.

In the data structure shown in FIGS. 26 and 27(a)-27(c), the reference data type flag Ico2, the difference data length information Iun1, and the compression method type flag Iun2 are included in the difference data (ΔDn). However, these data may be added to the header sections Hpi, Hpj or the data sections Dpi, Dpj when the reference data is updated, i.e., when the uncompressed packet Pi is formed or when the specific compressed packet Pj (compressed packet having the reference data update flag "On") is formed.

In this case, the transmitting-end reference information management unit 15e and the receiving-end reference information management unit 25e are constructed so as to manage the difference data length information Iun1 and the compressed method type flag Iun2 for each item-basis reference data, whereby, at the receiving end, restoration of compressed packets can be performed on the basis of the information Ium1 and the flag Iun2.

In this case, the compression efficiency is further improved because it is not necessary to add the difference data length information Iun1 and the compression method type flag Iun2 in the item-basis difference data (ΔDn) of the compressed packet every time the compressed packet is transmitted.

The above-described method of adding the reference data update flag Ico2, the difference data length information Iun1, and the compression method type flag Iun2 to the header section or the data section of the uncompressed packet or the specific compressed packet when the item-basis reference data is updated, is especially effective in the case where the compression method for transmission data changes at regular intervals among a plurality of complicated compression methods, and higher compression efficiency is expected.

While in this fifth embodiment a data transmission method using uncompressed packets, specific compressed packets, and ordinary compressed packets is described for packet-by-packet data transmission, data transmission may be performed by switching the method between the method of this fifth embodiment and another data transmission method, according to the transmission status of packets.

In this case, as the second data transmission method, any of the data transmission method according to the first to fourth embodiments or the data transmission method using the V. Jacobson's header compression method (refer to FIG. 31) may be employed.

What is claimed is:

1. A data transmission method for transmitting data in units of packets, said method including:
   a reception-side process of receiving an uncompressed packet in which transmission data is stored as uncompressed data, and receiving a compressed packet in which at least a portion of transmission data is compressed and stored as compressed data;
   wherein the transmission data corresponding to the compressed packet includes plural pieces of compression target data,
   the compressed packet contains additional information that indicates a position of the compressed packet, counted from the uncompressed packet, the additional information being referred to for restoration of the compressed packet,
   said reception-side process includes a restoration process of restoring the plural pieces of compression target data corresponding to the compressed packet, and
   said restoration process uses the transmission data included in the uncompressed packet and uses the additional information included in the compressed packet, for restoration of the plural pieces of compression target data corresponding to the compressed packet.

2. The data transmission method of claim 1, wherein
   the compression target data includes a packet ID of an IP packet and includes a sequence number of an RTP packet, and
   the packet ID of the IP packet is restored on the basis of the additional information which is used for restoration of the sequence number of the RTP packet.

3. The data transmission method of claim 2, wherein
   the additional information is equal to the compressed data of the sequence number of the RTP packet.

4. A data reception apparatus for receiving data in units of packets, said apparatus including:
   a packet reception unit for receiving an uncompressed packet in which transmission data is stored as uncompressed data, and receiving a compressed packet in which at least a portion of transmission data is compressed and stored as compressed data; and
   a packet restoration unit for subjecting the compressed packet to a restoration process to output transmission data corresponding to the compressed packet;
   wherein the transmission data corresponding to the compressed packet includes plural pieces of compression target data,
   the compressed packet contains additional information that indicates a position of the compressed packet, counted from the uncompressed packet, the additional information being referred to for restoration of the compressed packet, and
   said packet restoration unit uses the transmission data included in the uncompressed packet and uses the additional information included in the compressed packets, for restoration of the plural pieces of compression target data corresponding to the compressed packet.

5. The data reception apparatus of claim 4, wherein
   the compression target data includes a packet ID of an IP packet and includes a sequence number of an RTP packet, and
   said packet restoration unit restores the packet ID of the IP packet using the additional information which is used for restoration of the sequence number of the RTP packet.

6. The data reception apparatus of claim 5, wherein
   the additional information is equal to the compressed data of the sequence number of the RTP packet.

* * * * *